US012591033B2

(12) United States Patent
Halstaff Coles et al.

(10) Patent No.: US 12,591,033 B2
(45) Date of Patent: Mar. 31, 2026

(54) NOISE CAMERA, SERVER FOR PROCESSING DOCUMENTARY EVIDENCE FROM NOISE-CAMERAS AND METHODS

(71) Applicant: Intelligent Instruments Ltd, Southampton (GB)

(72) Inventors: David Geoffrey Halstaff Coles, Southampton (GB); Stephen James Gosling, Kings Worthy (GB); Michael Reuben Peckham, Winchester (GB)

(73) Assignee: Intelligent Instruments Ltd, Southampton (GB)

( * ) Notice: Subject to any disclaimer, the term of this patent is extended or adjusted under 35 U.S.C. 154(b) by 167 days.

(21) Appl. No.: 18/311,456

(22) Filed: May 3, 2023

(65) Prior Publication Data

US 2024/0369670 A1     Nov. 7, 2024

(51) Int. Cl.
*G01S 3/808* (2006.01)

(52) U.S. Cl.
CPC .................................. *G01S 3/8083* (2013.01)

(58) Field of Classification Search
CPC .................................................... G01S 3/8083
See application file for complete search history.

(56) References Cited

U.S. PATENT DOCUMENTS

| | | | |
|---|---|---|---|
| 3,661,224 A | 5/1972 | Allen et al. | |
| 4,257,273 A | 3/1981 | Knowd | |

(Continued)

FOREIGN PATENT DOCUMENTS

| | | |
|---|---|---|
| CN | 101577051 A | 11/2009 |
| CN | 102695043 A | 9/2012 |

(Continued)

OTHER PUBLICATIONS

"Combined Search and Examination Report under Sections 17 and 18(3)", dated Sep. 25, 2023, from the counterpart GB application 2306549.3.

(Continued)

*Primary Examiner* — Abdallah Abulaban
(74) *Attorney, Agent, or Firm* — John M. Rogitz; John L. Rogitz

(57)     ABSTRACT

A noise camera comprises a plurality of audio detectors such as microphones, which are spatially disposed with respect to a tracking camera. The plurality of audio detectors may be arranged to detect a location of a noise source in a field of view of the tracking camera, thereby allowing identification of a source of noise such as a vehicle emitting noise exceeding a predetermined threshold such as a legal limit. The noise camera may comprise one or more detection cameras for identifying a noise source by techniques such as number plate recognition for the example of a vehicle. A location of a noise source in the field of view of the tracking camera is determined from a time difference of arrival of the noise from the noise source detected by a plurality of the audio detectors. The time difference of arrival indicating an angle of the noise from the tracking camera may be mapped into video captured with the field of view of the tracking camera as one or more pixel location values. Documentary evidence generated from the noise camera can include the tracking video, noise source pixel location values comprising, for each of one or more tracking images of the tracking video, an indication of a location of a pixel of a dominant noise source in the tracking video. The documentary evidence may be processed to identify a path of the dominant noise source in the tracking video from the noise source pixel location values. From the path, a detection time at which the path of the dominant noise source in the tracking (Continued)

video is closest to a detection point in a field of view of a detection camera is determined. The noise source such as a vehicle is identified from images at the detection time.

12 Claims, 25 Drawing Sheets

(56) References Cited

U.S. PATENT DOCUMENTS

| | | | |
|---|---|---|---|
| 4,287,771 A | 9/1981 | Dugot | |
| 6,021,364 A | 2/2000 | Berliner et al. | |
| 6,094,150 A | 7/2000 | Ohnishi et al. | |
| 6,686,839 B2 | 2/2004 | Chou et al. | |
| 6,690,294 B1 | 2/2004 | Zierden | |
| 8,395,653 B2 | 3/2013 | Feng et al. | |
| 8,555,721 B2 | 10/2013 | Taillet | |
| 9,148,739 B1 | 9/2015 | Farahat | |
| 10,204,275 B2 | 2/2019 | Shin et al. | |
| 10,440,471 B2 | 10/2019 | Robbins et al. | |
| 2004/0194549 A1 | 10/2004 | Noel | |
| 2010/0220552 A1 | 9/2010 | Owaki et al. | |
| 2015/0104024 A1* | 4/2015 | Russell | G08G 1/0112 381/56 |
| 2015/0271613 A1 | 9/2015 | Farahat | |
| 2017/0305427 A1* | 10/2017 | Kim | B60Q 1/2603 |
| 2021/0055705 A1 | 2/2021 | Sendoda | |

FOREIGN PATENT DOCUMENTS

| | | | | | |
|---|---|---|---|---|---|
| CN | 103235287 A | | 8/2013 | | |
| CN | 105554443 A | | 5/2016 | | |
| CN | 107343160 A | | 11/2017 | | |
| CN | 107578626 A | | 1/2018 | | |
| EP | 4080177 A1 | | 10/2022 | | |
| FR | 3077886 A1 | * | 8/2019 | .......... | G01S 3/8083 |
| JP | 2002092789 A | | 3/2002 | | |
| JP | 2002344957 A | | 11/2002 | | |
| JP | 2007116666 A | * | 5/2007 | .......... | H04N 23/695 |
| JP | 2009200569 A | | 9/2009 | | |
| KR | 20110126377 A | * | 11/2011 | .......... | H04N 23/611 |
| WO | 2016019768 A1 | | 2/2016 | | |
| WO | 2019158839 A1 | | 8/2019 | | |

OTHER PUBLICATIONS

"International Search Report and Written Opinion", dated Apr. 11, 2024, from the counterpart PCT application PCT/USGB2023/052272.

Agha Apoorv et al: "Noisy vehicle surveillance camera: A system to deter noisy vehicle in smart city", Applied Acoustics, Elsevier Publishing, GB, vol. 117, Jun. 15, 2016 (Jun. 15, 2016), pp. 236-245.

Pinel Lamotte Lucille et al: "Accurate and controled vehicle pass-by noise emission quantification in real life traffic", Noise-Con Proceedings, vol. 263, No. 1, Aug. 1, 2021 (Aug. 1, 2021), pp. 5233-5245.

"Invitation to Pay Additional Fees", dated Jan. 24, 2024, from the counterpart PCT application PCT/GB2023/052272.

* cited by examiner

1200 — Start

1202 — Identification of pixel location

1204 — Identification of a path of a dominant noise source

1206 — Determine closest detection point

1208 — Determine detection time

1210 — Determine corresponding image(s)

1212 — Processing of corresponding images

1214 — End

1224 — Smoothing of pixel location path

1226 — Differentiate path of pixel location with respect to time

1228 — Extract vehicle path

1230 — Identify direction of vehicle travel

1232 — Processing of extracted path

1234 — Extend path to edge of scene

Figure 15:
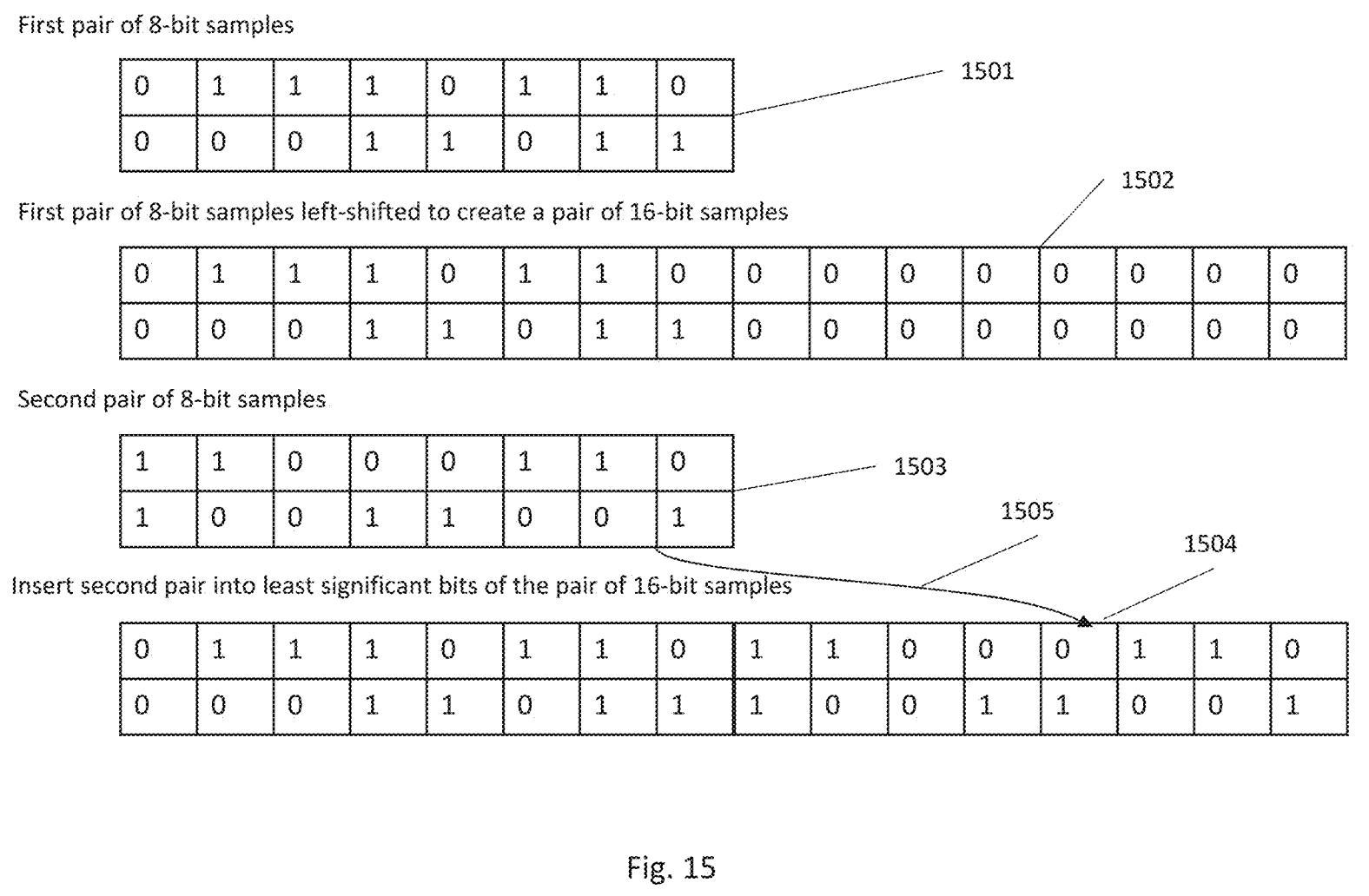

First pair of 8-bit samples

1501

First pair of 8-bit samples left-shifted to create a pair of 16-bit samples

1502

Second pair of 8-bit samples

1503

Insert second pair into least significant bits of the pair of 16-bit samples

1600 —— Process begins

1602 —— Define point and calculate coordinates

1604 —— Calculation of path lengths

1606 —— Calculation of path length difference

1608 —— Calculation of sample delay

1610 —— Sample delay and angles added to lookup table

1612 —— Process terminates

NOISE CAMERA, SERVER FOR PROCESSING DOCUMENTARY EVIDENCE FROM NOISE-CAMERAS AND METHODS

FIELD OF DISCLOSURE

The present disclosure relates to noise cameras, servers for processing documentary evidence generated by noise cameras, systems for monitoring noise, and methods of processing documentary evidence and operating noise cameras.

BACKGROUND

Powered devices are known to emit noise as a result of engines which power such devices. In the case of motor vehicles, an internal combustion engine, which powers the vehicles, emits noise mostly from an exhaust.

Noise emitted by motor vehicles has been regulated for some years. New vehicles are required to comply with strict noise emission limits. These have been progressively reduced from 82 dB in 1978 to a current limit of 72 dB established in 2016. A new EU regulation has been introduced from July 2016 (EU Regulation number 5404/2014) which phases in tighter noise control limits over 10 years together with a revised more restrictive representative test procedure (https://www.vehicle-certification-agency.gov.uk/fuel-consumption-co2/fuel-consumption-guide/cars-and-noise). However, whilst manufacturers of motor vehicles introduce measures in order, as far as possible, to reduce noise emissions to comply with a legal requirement, malfunction or adaptation from an original specification, particularly from older vehicles or other customisation can result in a motor vehicle exceeding an allowed legal limit. Furthermore, whilst some noise emissions can be regarded as legitimate such as those emitted by a siren of emergency vehicles, noise emissions can be classified as nuisance noise, which for example may be created by high-performance sports cars, motorbikes, vehicles with tuned exhaust systems and the like, which exceed a legal limit. Such noise emissions can be considered to be nuisance noise especially in urban and residential areas, and often considered to be anti-social. It is therefore desirable to identify vehicles and their drivers, when the vehicle exceeds the legal limit for noise emissions.

Furthermore, the operation of vehicles is subject to legal restrictions on noise emissions, which may be addressed through a number of legal measures that differ depending on jurisdiction. For example, the UK Anti-social Behaviour, Crime and Policing Act 2014 provides in Section 59 for Public Spaces Protection Orders (PSPOs), which allows a local authority to impose restrictions on certain acts within a restricted area. As an example, in 2021 the Royal Borough of Kensington and Chelsea implemented a PSPO restricting, among other things, "[r]evving of engine(s) . . . [and s]udden and/or rapid acceleration" where it was likely to cause a public nuisance, with the ability to impose a Fixed Penalty Notice, or a fine, on the driver of such a vehicle.

Other jurisdictions have different legal measures. For example, in New York, Senate Bill S9009 introduced limits on the "maximum allowable sound levels . . . measured at, or adjusted to, a distance of fifty feet" with sound levels defined for vehicles travelling at a speed of, or below, 35 miles per hour, and vehicles travelling at a speed above 35 miles per hour.

So-called "noise cameras" have been developed to detect and identify vehicles which emit noise exceeding a legal limit. Such noise cameras are analogous to speed cameras in that they are located at a roadside, and are configured to detect when a threshold noise emission event occurs causing sound, video and/or images to be recorded of an infringing event. Documentary evidence, such as sound records, images and/or video can be automatically uploaded to a server which allows an investigating authority to review the evidence collected by the noise camera and to determine what action should be taken. However, on some occasions several vehicles may be present in the documentary evidence resulting from a threshold noise event where only one of the vehicles may have caused the event. Improving a detection accuracy in noise camera systems is therefore desirable in order to separate vehicles which emits noise above a desired threshold/legal threshold from those which do not.

SUMMARY OF THE DISCLOSURE

Embodiments of the present technique can provide a noise or sound camera comprising a plurality of audio detectors such as microphones which are spatially disposed with respect to an imaging device such as a camera, preferably a video camera, as well as related processing methods. In the following description, the imaging device or camera which is used to track a noise emitting source such as a vehicle is referred to as a tracking camera. The plurality of audio detectors may be arranged to detect a location of a noise source in a noise space corresponding to a field of view of the imaging device, thereby allowing identification of a source of noise such as a vehicle emitting noise exceeding a predetermined threshold such as a legal limit. The noise camera may comprise a plurality of other imaging devices in addition to the imaging device used for tracking (tracking camera), the output of which may be used for identification of a noise source by techniques such as number plate recognition for the example of a vehicle.

According to example embodiments, the detection of a location of a noise source in a noise space corresponding to a field of view of the imaging device may be performed using time difference of arrival of the sound by the noise source as detected by a plurality of the audio detectors, the time difference of arrival indicating an angle from the noise camera of noise or sound, which may be mapped onto an image/video as detected by the imaging device, following a noise threshold being exceeded.

If such a noise camera detects a threshold noise emission event, it may be that a source of the noise emission is a source against which an investigating authority determines action should be taken. Alternatively, the source of the noise emission may be a source against which an investigating authority determines no action should be taken. Embodiments of the present disclosure can improve discernment of a source of noise emissions, to determine whether or not action should be taken against the noise source by an investigating authority.

According to another aspect, example embodiments can provide a server and processing methods for receiving documentary evidence from a noise camera following a triggering event, the documentary evidence comprising tracking video, noise source pixel location values comprising, for each of one or more tracking images of the tracking video, an indication of at least one pixel of a location of a dominant noise source in the tracking image of the tracking video, detection video, and a sound recording of sound associated with the triggering event, for example, which may be captured by a detection microphone. The detection video may be the same as the tracking video. The method then proceeds to identify a path of a dominant noise source in the tracking video from the noise source pixel location values, to determine a detection time at which the path of the dominant noise source in the tracking video is closest to a detection point in a field of view of a camera which captured the tracking video, and to identify the dominant noise source from one or more images corresponding to the detection time.

Embodiments of the present technique can also provide a noise camera, noise monitoring system, a server and a method of processing documentary evidence, a method of operating a noise camera, and a method of calibration for a noise camera.

Various example aspects and features of the present technique are defined in the appended claims.

BRIEF DESCRIPTION OF THE FIGURES

FIG. 15 shows a representation of converting two 16-bit data streams into a single 32-bit data stream, in accordance with certain embodiments of the present technique;

DETAILED DESCRIPTION

Figure 1:
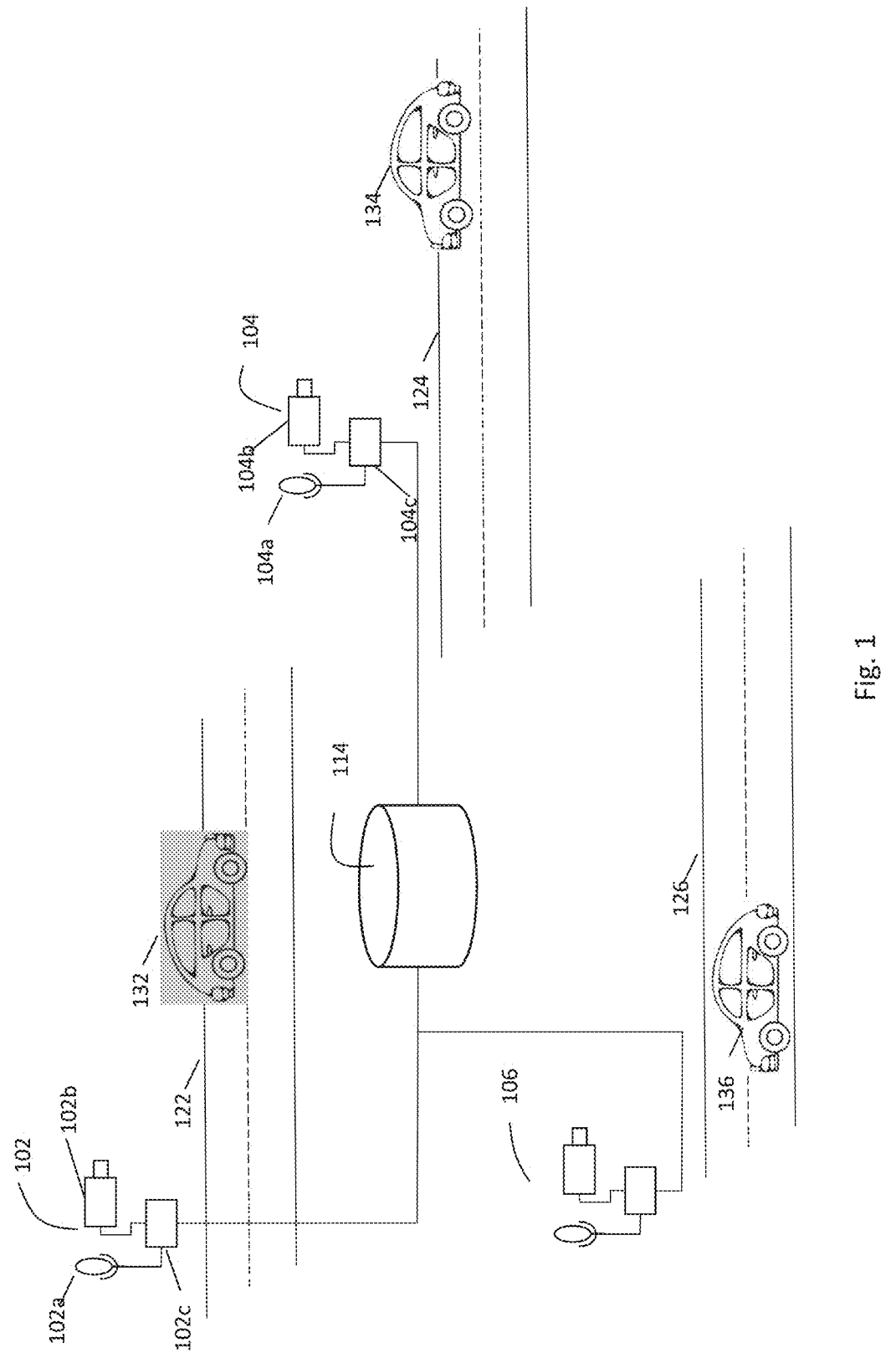
FIG. 1 shows schematically an overview of a noise monitoring system, showing a plurality of noise cameras and road scenes.

FIG. 1 depicts a system for monitoring noise, which can be used to detect sources of noise emissions exceeding a predetermined limit. For the example shown in FIG. 1 the system is monitoring noise at three different locations. The predetermined limit on noise emissions being monitored may be a legal limit. Three microphone and camera apparatus 102, 104, 106, referred to as noise cameras are shown, each comprising a microphone 102a, a camera 102b, and processing circuitry 102c. Each noise camera 102, 104, 106 monitors sound at the different locations where they are disposed and when a trigger event occurs, noise camera 102, 104, 106 is configured to transmit information representing documentary evidence by a wired or wireless connection to a server 114. The information representing the documentary evidence may be stored at the server 114 for reviewing by an investigating authority.

Noise cameras 102, 104, 106 respectively monitor road scenes 122, 124, 126 where motor vehicles may be observed, such as cars 132, 134, 136. Each of the noise cameras 102, 104, 106 is configured to monitor noise emitted by vehicles within a field of view of the camera. As indicated above, if a vehicle, such as a car 134, creates excessive noise, that is, in excess of the predetermined limit, as detected by a microphone 104a, then this causes a trigger event resulting in documentary evidence to be captured by the noise camera 104, such as a camera 104b which may record images or video as documentary evidence with a recording of the noise emitted by the vehicle so that the vehicle can be identified. Following the trigger event, the processing circuitry 104c may store information representing the documentary evidence such as a video feed from the camera 104b. In some examples the trigger event causes a processing apparatus 104c to store information representing sound and images and a video as the documentary evidence of a predetermined duration, such as 5 seconds, which may follow in time the triggering event i.e. be later in time than the triggering event (after), or in other examples may precede the triggering event i.e. be earlier in time than the triggering event (before) or both. The processing circuitry 104c may access a rolling buffer of camera data, and transfer information from the rolling buffer of a predetermined duration to a permanent storage medium. In yet further examples, the processing apparatus may transfer to a permanent storage medium a duration of camera information and audio information that precedes and follows the triggering event of the camera. That is, the processing apparatus may record permanently in some examples information that covers an occasion of the triggering event, beginning before the triggering event and ceasing after the triggering event. This may form part of the documentary evidence transferred to the server 114 processing.

The trigger event may be that noise exceeding the predetermined limit or threshold has been detected by a microphone (audio detector) such as the microphone 104a. This limit or threshold, the breach of which indicates a trigger event for the noise camera and resulting in recording and/or transmission of information, will be referred to below as a trigger threshold. This trigger may be predetermined, and may be alterable as to the specific level of noise at which the system is triggered. In some instances, the microphone 104a, or processing circuitry 104c, may perform "A-weighting" of recorded noise levels to account for a perceived loudness to human hearing of different frequencies before comparison of noise levels with the predetermined trigger threshold.

In some scenarios audio signals recorded as part of the trigger event may be recorded across a wide range of frequencies, or only over a narrow range of frequencies. In some scenarios, it may be set as a fractional octave band or narrow band, for example a one third octave band for triggering of the camera 102, 104, 106 and transmission of the information to the server 114. A band pass filter, or in other examples a plurality of band pass filters, may be used to select a range of frequencies for monitoring and/or recording.

Embodiments of the present technique can provide a noise or sound camera comprising a plurality of audio detectors such as microphones which are spatially disposed with respect to an imaging device such as a camera, preferably a video camera. Although the imaging device in some embodiments is a video camera, in some examples, the imaging device may be a stills camera. The imaging device/video camera is referred to in the following description as a tracking camera, because according to example embodiments the plurality of audio detectors of the microphone array are arranged to detect a location of a sound source within a field of view of the tracking camera. The sound source may be a noise source such as a noisy vehicle, which is emitting sound, which exceeds a predetermined limit such as a legal threshold for noise emissions from a vehicle. The tracking camera may therefore be different from a detection camera, which captures an image of the noise or sound source for identifying the noise or sound source from images captured by the detection camera. For the example of detecting a vehicle emitting noise which exceeds a threshold, the image captured by the detection camera may be used for number plate recognition (ANPR).

As will be appreciated in the following description the terms sound and noise may be used interchangeably. Embodiments of the present technique can provide a system for detection and processing of information (documentary evidence) related a dominant noise source for a more accurate detection and identification of the dominant noise source, as will be apparent from the description below. However, the present technique is not limited by the examples given to an application in the field of detecting vehicle noise, and applications of the example embodiments for other purposes may be possible. For example, the present technique may be adapted for use in a security capacity to detect an intruder for example from sound emissions.

By using a detection camera for identifying the noise source, which is separate from the tracking camera, the field of view of the tracking camera may be adapted for tracking the sound/noise source across a scene, such as a section of road in the case of a vehicle and so configured to capture a wider angle view. In some examples, the tracking camera may have a fish eye lens or form a fish eye view. In contrast, the detection camera may have a narrower field of view and focus on a region within the scene such as a section of the road in order to have a greater possibility of identifying the vehicle from its number plate for example. The detection camera may be positioned such that a field of view of the detection camera overlaps, at least in part, with a field of view of the tracking camera.

As will be explained in the following paragraphs, the audio detecting array, for example a plurality of microphones, may be disposed with respect to a position of the tracking camera so as to be spatially separated with respect to a position of the tracking camera, so that a location of the noise source may be detected from a time difference of arrival of sounds emitted by the noise source. The microphone array for identifying and tracking the noise source as a dominant noise source within a scene will be referred to a Halo device, because a mounting of the microphone array can be on an elliptical structure, so that the microphones can be positioned on orthogonal axes with respect to the tracking camera. As such, an audio detector such as a microphone for detecting that noise emitted by the noise source has exceeded a predetermined threshold, may be separate from the Halo device. For this reason, a higher quality/more expensive microphone can be deployed for accurately detecting an infringing noise source. In the following description, the microphone, which is used to detect an infringing noise source will be referred to as a detection microphone. This detection microphone may be a Class-1 microphone that meets the relevant international standard, IEC 61672-1. In other examples, the audio detector may be equipment employing a laser or radar technology to detect sound at a distance. The term audio detector can be any detector for converting sound into an electrical signal representative of the sound.

As indicated above, embodiments of the present technique can provide an improvement in generating documentary evidence which can be used to identify more accurately a vehicle which is emitting noise above predetermined limit such as a legal limit (infringing noise source), or which is emitting noise likely to cause a public nuisance. The predetermined detection threshold may therefore be the legal limit.

Embodiments of the present technique can provide a noise monitoring system which includes one or more noise cameras, each of the noise cameras comprising a tracking camera/imaging devices for recording images and/or video within a field of view of the tracking camera, an audio detector array comprising a plurality of tracking audio detectors, each of the plurality of tracking audio detectors being spatially separately disposed with respect to the tracking camera and each being configured to detect noise from a noise source within a field of view of the tracking camera, and a processing circuitry. The processing circuitry of the noise camera is configured to receive signals representative of the noise detected by each of the tracking microphones of the microphone array, to determine based on a time difference of arrival of the noise received by each of the tracking microphones, from the received signals representative of the noise, a location of the noise source within the field of view of the tracking camera, and to map the determined location of the noise source in the field of view of the tracking camera into images and/or video captured within the field of view of the tracking camera from which the noise source can be tracked. According to some examples, for each of a sequence of image frames of tracking video, a pixel location value identifies one or more pixels. The pixel location values may therefore identify the noise source in successive frames, although there may be some discontinuity in that some frames may not have a pixel location value because there is no noise source which exceeds a minimum value.

Certain embodiments of the present disclosure can track a location of a noise source within a field of view of a tracking camera, which may be considered as a noise space. This allows an observer to track a noise source in both a noise space and a corresponding image of a tracking camera simultaneously, which may assist in identifying a source of noise in excess of a predetermined threshold. For example, embodiments of the present disclosure may assist in a scenario such as two vehicles passing a noise camera at the same time, when at least one of them is producing noise in excess of a predetermined threshold, since the tracking of location of a noise source in noise space overlapping with or corresponding to a field of view of a tracking camera may enable an investigating authority to distinguish between the two different vehicles in this scenario. Such a noise source exceeding a threshold in the field of view can be referred to as a dominant noise source.

Figure 2B:
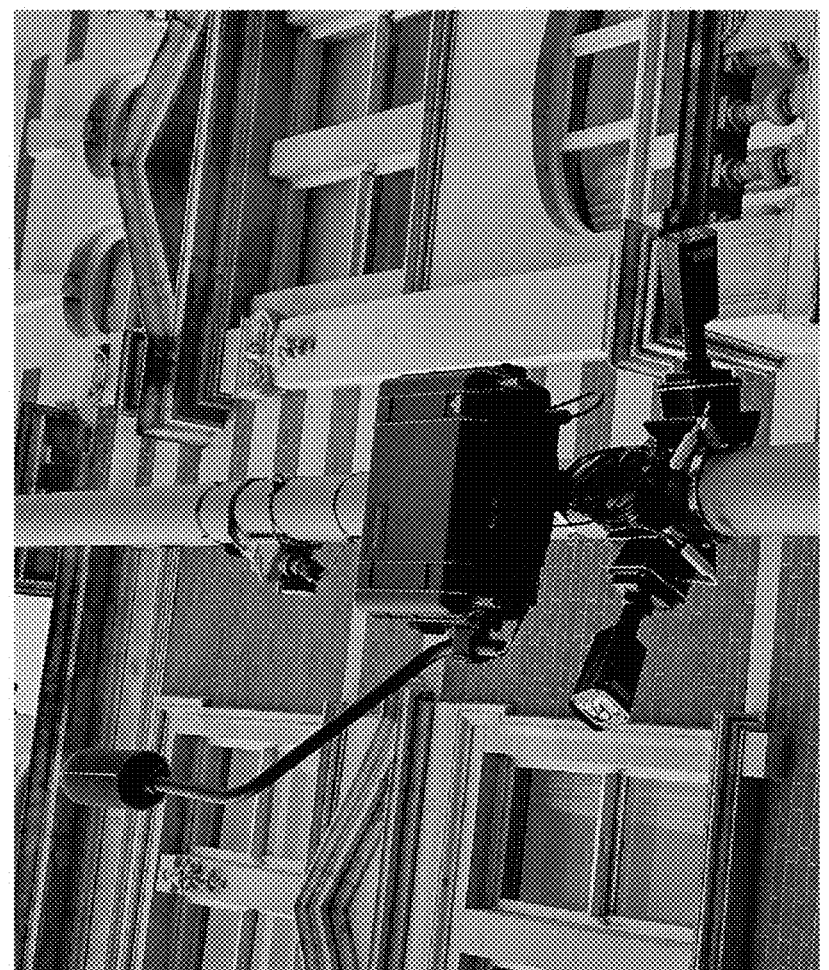
FIG. 2B shows a view of a noise camera and component parts thereof as installed in a roadside location.
Figure 2A:
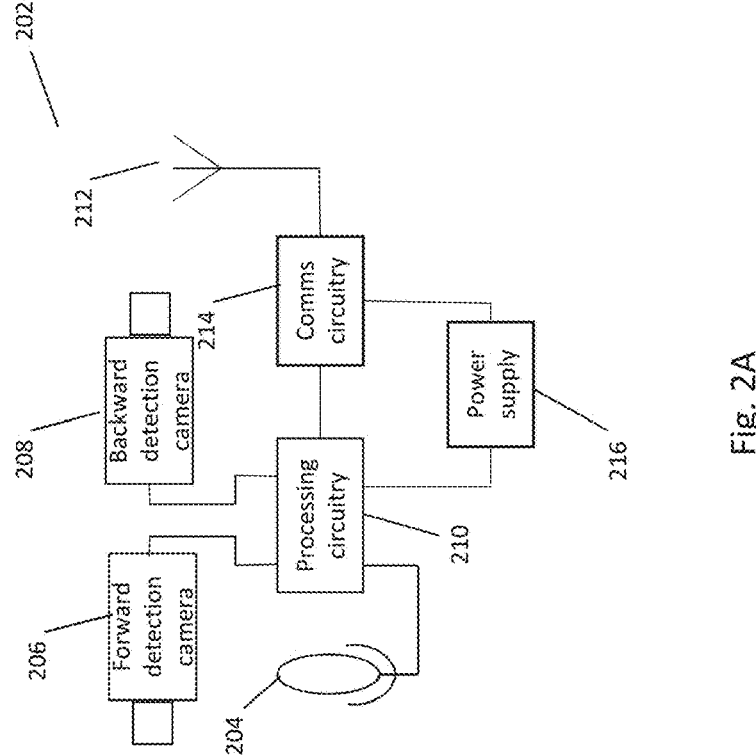
FIG. 2A shows schematically a noise camera and component parts thereof.

FIG. 2A depicts schematically a noise camera 202 similar to the noise cameras 102, 104, 106 of FIG. 1, according to example embodiments with FIG. 2B representing an example implementation. The noise camera 202 is depicted comprising a microphone 204, two detection cameras 206, 208, processing circuitry 210, antenna 212, communications circuitry 214, and a power supply 216. This is an example of the noise camera of FIG. 1 employing a different method of communication with the server 114, as can be seen by the inclusion of the communications circuitry elements that are present in FIG. 2 but not present in FIG. 1. FIG. 2B shows an example implementation of the schematic noise camera of FIG. 2A, showing the noise camera as installed at a roadside location.

Figure 2C:
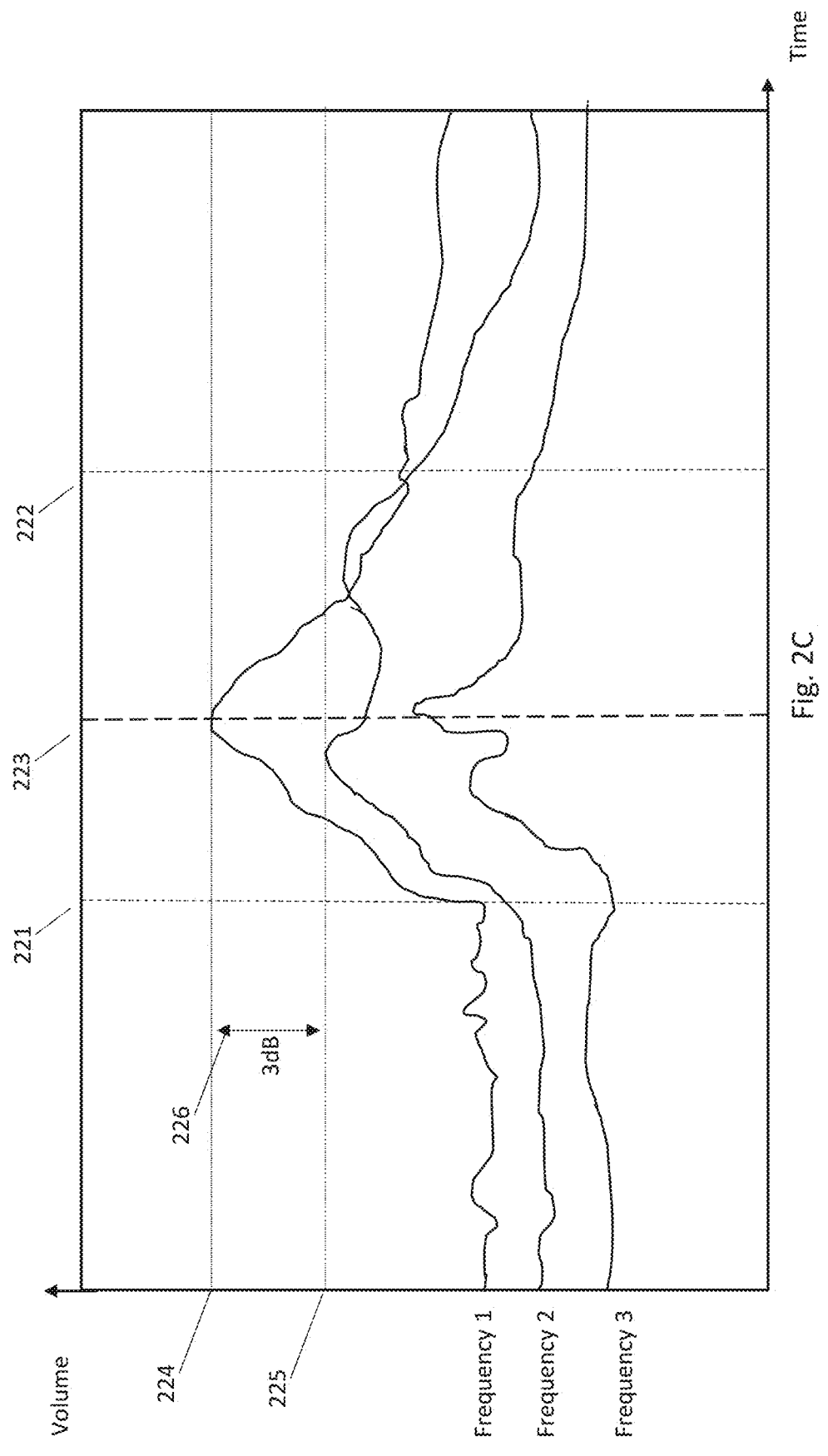
FIG. 2C shows a graphical representation of a plot of volume against time for certain frequencies, illustrating aspects of a noise camera according to an example embodiment.

FIG. 2C shows an example of recorded noise by a microphone such as a detection microphone 204. This noise is detected by the microphone and, in the example shown, sound is filtered by three bandpass filters, generating data for a volume with respect to time of an electrical signal representing sound of each frequency, frequency 1, frequency 2, frequency 3. These are plotted here as frequency 1, frequency 2 and frequency 3, but in other examples a different number of bandpass filters may be used, and hence a different corresponding number of plots of volume or amplitude against time may be generated. In some examples, a single bandpass filter may be used to filter the noise/sound, and a single plot of volume or amplitude against time generated, such as a bandpass filter passing frequencies in a narrow band centred on 400 Hz. In yet further examples, other types of filter may be used, such as low pass or high pass filters but it may be preferable to employ a bandpass filter.

Dotted lines 221 and 222 designate boundaries of a start and an end of a region around a peak of volume for the frequencies plotted in FIG. 2C. The volume peak for frequencies may be determined by reference to a threshold volume. For example, a peak may be determined by the highest volume of a first frequency, and there may also be a condition that a second frequency is above a threshold volume in addition to the highest volume of the first frequency. This may be extended to multiple frequency plots, as in FIG. 2C. In FIG. 2C, a peak volume may be determined as a long dashed line 223. This may be determined by the processing circuitry 210 as the highest volume recorded in frequency band 1, while frequency band 2 and frequency band 3 are above a predetermined volume threshold. A region around the volume peak may then be determined by identifying time resources for which the volume of one of, more than one of, or all of, the frequency bands is greater than a threshold, where the threshold may be the same threshold that was used as a precondition for determining the peak volume. Alternatively, a region around a peak volume may be determined as a preset amount of time resources to either side of the peak volume, for example 5 seconds. In some implementations, the region around a peak volume may be determined as an offset preset amount of time resources to either side of the peak volume, that is, the amount of time resources included in the region around a peak volume may be different before the peak as opposed to after the peak. For example, it may be decided that a period of 3 seconds before a peak volume and 7 seconds after a peak volume should be designated as the region around a peak volume. In yet another example, a region around a volume peak may be determined with reference to a volume peak, for example the region being defined as time resources for which the volume of a particular frequency band is within a certain offset from the volume peak. For example, with reference to FIG. 2C, the volume peak 223 may register a volume of 80 dB, as indicated by a first volume reading 224. The region around a volume peak may then be determined as continuous (or in other instances, non-continuous) time resources which are within a certain offset of the volume peak. In the example of FIG. 2C, the certain offset is 3 dB, as indicated by arrow 226, and the corresponding time resources are those indicated by second volume reading 225.

In some examples, a single bandpass filter is used, which may pass frequencies between 300 and 500 Hz. Samples may be taken at different rates. In some examples, a volume sample may be taken at a rate of one sample per second, or a sample rate may be more or less frequent such as ten times per second. In some examples, such as where a Class-1 microphone is used to record the sound, it may be that a system is triggered not across a wide spectrum such as between 300-500 Hz, but specifically at a frequency of 400 Hz. Other frequencies may be chosen, but it may be preferable to select a frequency of 400 Hz to use as a trigger frequency, since this may correspond to a dominant frequency emitted by an exhaust system of a vehicle.

In one example, the processing circuitry may implement a counter to determine whether two exceedances of a threshold are to be considered as a single trigger event or as two separate trigger events. In this example, a sample rate of volume is one sample per second. A counter increments for each sample where the volume is recorded as below the threshold, i.e. one integer increment per sample recorded below the threshold. If a sample is recorded and the volume is greater than the threshold, then the counter may be reset to zero. For a sample volume recorded as greater than the threshold, the processing circuitry 210 may check a value of the counter, and determine whether the sample should be classified as a separate trigger event or a continuation of a previous trigger event. In this example, the processing circuitry checks whether the value of the counter is greater than or equal to a value of two. If the value of the counter is greater than or equal to the value of two, then the processing circuitry may determine that the sample belongs to a separate trigger event and not classify it as a continuation of a previous trigger event. However, if the value of the counter is equal to zero or one, that is, the value of the counter is not greater than or equal to a value of two, then the processing circuitry may determine that the sample indicates a continuation of a previous trigger event. In this example, there may be a gap of up to two seconds between exceedances of a threshold that may still be considered to be part of the same trigger event. If two exceedances are separated by a gap of three or more seconds, the processing circuitry may determine that these correspond to different trigger events.

It should be noted that the time values of the above example may be adapted. For instance, it may be determined that in some cases two trigger events are being recorded for a single vehicle passing the noise camera in a single pass, and a value which the processing circuitry compares the value of the counter to may be increased, for example to three. This may result in exceedances of up to three seconds being classified as a single trigger event. In other examples, the value which the processing circuitry uses to compare with the value of the counter may be reduced to one, which may result in exceedances separated by two seconds being classified as separate trigger events.

Camera and Microphone Array System (Halo)

Figure 3:
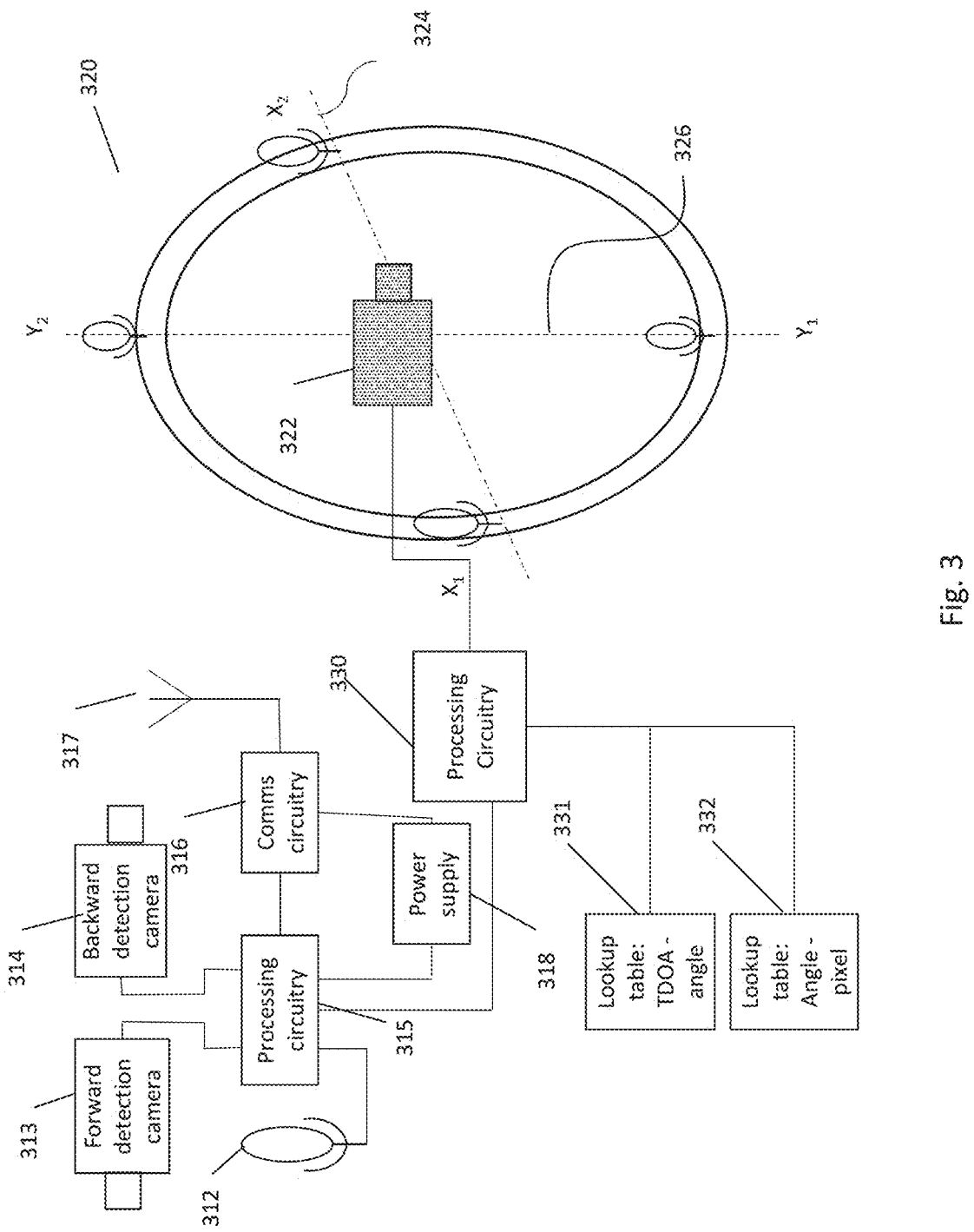
FIG. 3 shows schematically a noise camera and component parts thereof, in accordance with FIGS. 2A and 2B, and a camera and microphone array connected to the noise camera according to an example embodiment.

FIG. 3 depicts schematically a noise camera of FIGS. 2A and 2B, according to an example embodiment. Similar features shown in FIG. 2A are identified with the same references and so an explanation of these features will not be repeated for the sake of brevity. As shown in FIG. 3, the noise camera includes an audio detector array, such as microphone array 320. The microphone array 320 includes a plurality of tracking microphones (tracking audio detectors), which are spatially separately disposed with respect to the tracking camera 322. For the example shown in FIG. 3 there are four tracking microphones in the microphone array $X_1$, $X_2$, $Y_1$, and $Y_2$. In this example, each of respective pairs of tracking microphones $X_1$, $X_2$ and $Y_1$, $Y_2$ are arranged respectively on axes 324 and 326 which, in this example although not in all embodiments of the technique, are perpendicular to each other so that each respective pair of tracking microphones $X_1$, $X_2$ and $Y_1$, $Y_2$ is configured to detect sound with respect to a plane formed with respect to each of the orthogonal axes. In one example the first plane formed by the first pair of tracking microphones $X_1$, $X_2$ is a horizontal plane and the second plane formed by the second pair of tracking microphones $Y_1$, $Y_2$ is a vertical plane. It will be apparent to the skilled person that the same technical effect of a determination of a noise source location in a noise space corresponding to the field of view of a tracking camera may be achieved by a different number of tracking microphones arranged in an array. For example, in some arrangements 3, 6, or 8 tracking microphones may be used, and tracking microphones may be grouped in different ways than set out in the present disclosure. For example, three microphones may be arranged in a triangular arrangement, with a microphone situated at each vertex of the triangle, while in other examples the microphones may be situated in self-contained pairs. In these and other examples, the planes formed by a pair of tracking microphones may be intersecting but not orthogonal. In the example of FIG. 3, tracking microphones $X_1$ and $X_2$ are arranged on a first, horizontal axis of an array structure, and tracking microphones $Y_1$ and $Y_2$ are arranged on a second, vertical axis of an array structure. The audio detectors, in this case tracking microphones, are configured to detect sound/noise in a noise space corresponding to a field of view of the tracking camera, the noise originating at a dominant noise source such as a vehicle.

According to the example embodiment shown in FIG. 3, the tracking camera 322 and the microphone array 320 are arranged to provide additional signals from which a noise source can be tracked within a field of view of a tracking camera determined with respect to a time difference of arrival of sound detected by the respective tracking microphones in the array. Together the tracking camera and microphone array may be referred to as a Halo system in the disclosure since the pairs of tracking microphones are disposed with respect to a supporting frame around the tracking camera in the form of an oval or Halo.

The tracking camera 322 captures within a field of view of the tracking camera a part of the road scene, similar to road scene 122, 124, or 126, which allows for correlation of audio information related to a road scene detected by the tracking microphones $X_1$, $X_2$, $Y_1$, and $Y_2$ with image and/or video information of the same scene. A separation of two tracking microphones (audio detectors) acting as a pair of tracking microphones may be between 0.1 m and 1.5 m, preferably between 0.4 m and 0.6 m, and may differ depending on an orientation of the pair of tracking microphones. For example, a separation of a first pair of tracking microphones in a first direction, such as a horizontal direction, may be greater than a separation of a second pair of tracking microphones in a second direction, such as a vertical direction. In one example embodiment, a separation of a first pair of tracking microphones in a horizontal direction is 0.6 m and a separation of a second pair of tracking microphones in a vertical direction is 0.4 m.

As will be explained, sound signals detected by the tracking microphones are used to identify a location of a noise source within the field of view of the tracking camera. Accordingly, in some embodiments the tracking camera may include a wide angled lens such as a fish-eye lens so that a field of view of the tracking camera can include an entire section of a road within which a noise source can be tracked in order to provide additional evidence of an infringing activity. The tracking camera may therefore differ from detection cameras 313, 314 which may be positioned and configured to capture a narrower view within the road scene and within the field of view of the tracking camera in order to identify for example a number plate/license plate of the vehicle which may be infringing a noise restriction. However, as will be appreciated, advantageously a detection point of a noise source can be within a tracking path identified by the tracking camera field of view and a noise space corresponding to the field of view of the tracking camera and tracked by the tracking audio detector (tracking microphone) array.

Figure 4:
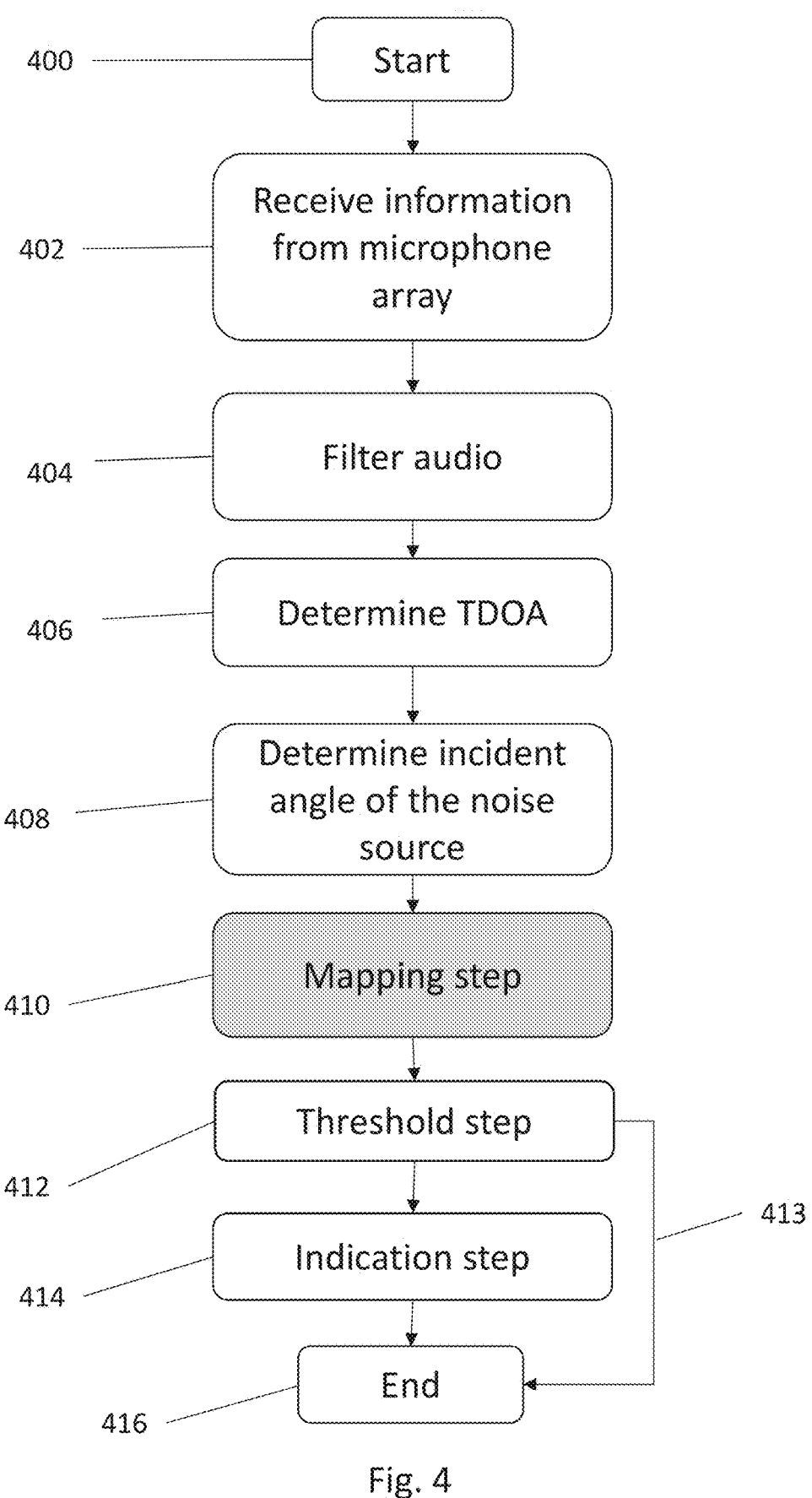
FIG. 4 shows a flow diagram of processing steps in accordance with operation of a camera and microphone array such as that of FIG. 3 in accordance with certain embodiments of the technique.

Processing steps in relation to the tracking camera and microphone array are performed by processing circuitry 330, formed as part of the tracking camera and microphone array (Halo). Also shown in the example of FIG. 3 are two lookup tables 331 and 332, which are respectively lookup tables associating time differences of arrival with a pair of angles and associating a pair of angles with a pixel in a view of the tracking camera. These processing steps will now be described with relation to FIG. 4. FIG. 4 shows a flow diagram of processing steps carried out by the processing circuitry 330 on information gathered by the microphone array, although it will be apparent to the skilled person that certain steps of the process described below may be omitted or performed in a different order without departing from the subject of the disclosure.

A process depicted in FIG. 4 begins with step 400 before processing passes to step 402.

During operation, a step 402 includes a tracking camera and a microphone array sending information including, but not limited to, audio information and video information gathered by tracking microphones and the tracking camera 322 to the processing circuitry 330. That is, signals representative of the noise detected by the tracking audio detectors $X_1$, $X_2$ and $Y_1$, $Y_2$ are sent by the audio detector array 320 and tracking camera 322, and received by the processing circuitry 330. The sent information is received by the processing circuitry 330, before processing passes to step 404.

In step 404 the processing circuitry performs filtering of audio, for example using a bandpass filter or plurality of bandpass filters, thereby excluding certain frequencies of the audio information and passing other frequencies. In other examples, different filters may be used, such as a high-pass filter, or a low-pass filter. In some examples, a plurality of filters may be used so that a wide range of frequencies are passed through the filter, which may give a greater sense of the character of the noise received by the tracking microphones. For example, noise created by a large vehicle such as a bus, HGV or the like may have a particular profile of volume with respect to frequency, and a vehicle such as an emergency vehicle with a siren enabled may have a different profile of volume with respect to frequency, for example being dominated by a peak in volume at the frequency of the siren in use. In contrast, a noise received by the tracking microphones generated by a motorbike, sports car, a tuned exhaust system and so on may have a different profile of volume with respect to frequency. Using multiple filters may enable a more precise profile of the noise to be collected, and consequently a more accurate determination of the source of the noise to be made as it allows the tracking to be focused toward a source of a particular type of noise. For example, filtering of the noise may allow selection of frequencies not including a frequency of an emergency vehicle siren, with the result that emergency vehicle sirens are not registered as a dominant noise source in a part of a road scene, since it may not be an object of an investigating authority to investigate such events.

In step 406, the processing circuitry 330 performs processing on the audio signals received in order to determine a time difference of arrival (TDOA) of the audio signals at the tracking microphones of the microphone array. This may be done by processing audio signals containing a volume peak with a generalised cross correlation using Fourier Transforms between pairs of the audio signals, for example comparing two tracking microphones arranged on a horizontal axis of the microphone array, and separately comparing two tracking microphones arranged on the vertical axis of the microphone array. This produces a TDOA for a first (horizontal) plane and for a second (vertical) plane, which define intersecting planes in a noise space, and hence a single line of points in noise space where the source of the noise may be located. It is envisaged that the microphone array herein described will be mounted at a height above the vehicles of the road, in some examples at a height of between 4 m and 8 m, for example approximately 6 m, to allow for identification of vehicles on the road from images within the field of view of the tracking camera and within a noise or sound space corresponding to the field of view of the tracking camera. A greater height allows for a larger section of road to be covered by the field of view of the tracking camera, but results in a greater length of road being covered by an edge of a view of the tracking camera, where distortion caused by the lens may be greatest.

Following the processing of the TDOA of audio signals in step 406, processing proceeds to step 408 wherein angles of the noise source are obtained from the TDOA of the noise generated by the noise source. As part of reception of noise by the tracking microphones, analogue sound is sampled at a certain rate, for example 48,000 times per second. When a single noise source produces sound that is received at two spatially separated microphones, a difference in path length between the noise source and individual tracking microphones leads to a TDOA, which may be expressed in terms of a number of samples. For example, if a volume peak is found to have been received at one microphone a certain period of time before it is received at a second microphone, the certain period of time, based on the digital recording of it, is always expressible as an integer number of samples. In one example this may be 5 samples, which would correspond, in the above example of 48,000 samples per second, to a TDOA of approximately $\frac{1}{10000}^{th}$ of a second.

As part of a setup and calibration procedure (described below), the processing circuitry 330 may be provided with a lookup table 331 for each of the planes in which the microphone array records a TDOA; a first vertical TDOA lookup table and a first horizontal TDOA lookup table (collectively referred to as a first lookup table), in the example of FIGS. 3, 4 and 5. This lookup table may have associated with a particular value of TDOA for each of the planes an incident angle of dominant noise at the microphone array. For example, it may be that a TDOA of 5 samples corresponds to an incident angle of 10° from a coordinate axis centred on the microphone array. It should be noted that the first lookup table has values for TDOA with respect to a first and a second plane, which are interdependent. The two TDOA values for the two planes are related to each other by a location of the noise source when considered in the first (horizontal) and second (vertical) planes, because they are generated from sampling the same noise source. This may be more readily understood with reference to FIGS. 5 and 6.

As will be appreciated, implementing a conversion of the TDOA values for the two planes into a pair of angles and a pair of angles into a pixel values can be implemented using other techniques. Using a lookup table provides a computationally efficient technique for implementing the conversion, although other embodiments may not use a lookup table but instead use a direct calculation mathematically for each sample of the TDOA values.

For each image recorded by the tracking camera, an angle is determined for each plane from the camera to the noise source. FIG. 5 shows the Halo array 320 of FIG. 3, and a noise source represented by the car 510. From the car 510 there are depicted dashed lines, 521, 522, 523, 524, indicating a direct path between the car 510 and each of the tracking microphones of the Halo array 320. These direct paths are indicative of, for example, a path traversed by sound from the car 510 to the tracking microphones of the Halo array.

Figure 5:
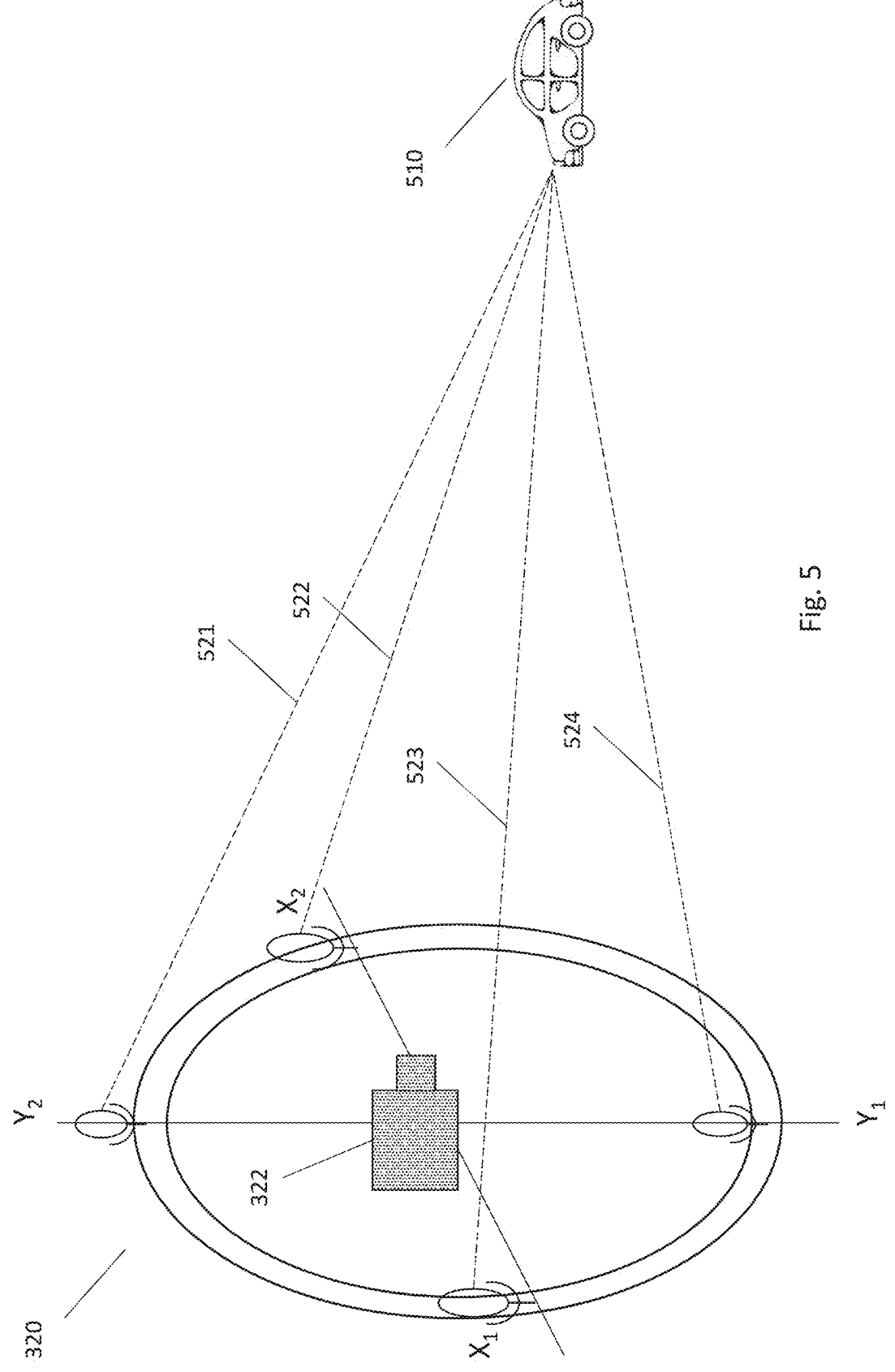
FIG. 5 shows a schematic diagram of a source of noise emission and a camera and microphone array in accordance with certain embodiments of the technique.
Figure 6:
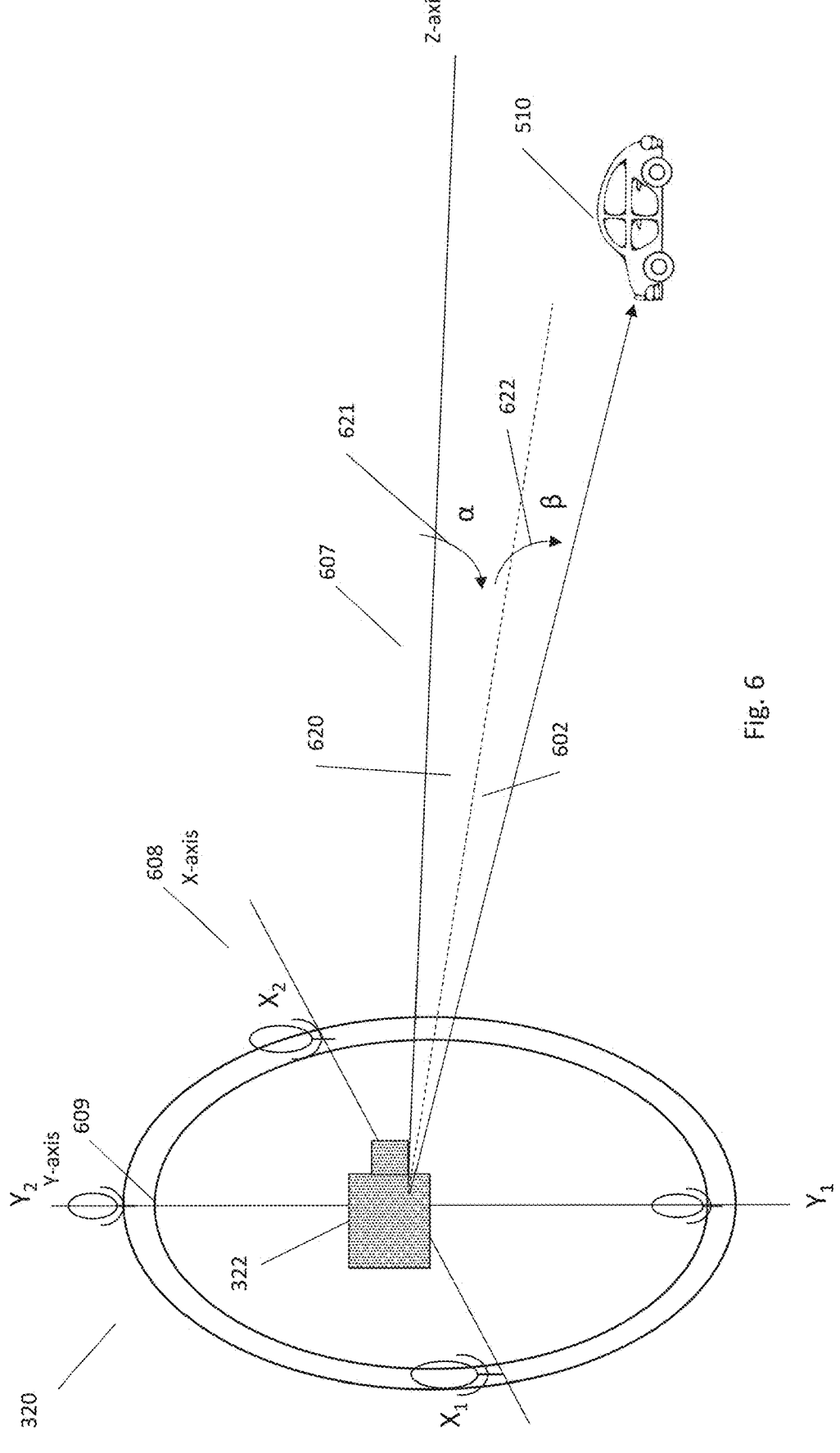
FIG. 6 also shows a schematic diagram of a source of noise emission and a camera and microphone array, displaying an incident angle of noise at the camera and microphone array in accordance with certain embodiments of the technique.

FIG. 6 shows a similar view of the microphone array to FIGS. 3 and 5, but with a set of axes imposed. That is, there is imposed on the view of the Halo array and the source of the noise, the car 510, a set of axes defined as a first axis, x-axis 608, a second axis, y-axis 609, and a third axis, z-axis 607. These axes are mutually orthogonal and define a three dimensional noise space centred on the origin of the axes, which in this example is chosen to correspond to the location of the tracking camera 322. The x-axis 608 lies in the plane of a Halo array 320, and both $X_1$ and $X_2$ tracking microphones lie on the axis. Similarly, the y-axis 609 also lies in the plane of the Halo array 320, with tracking microphones $Y_1$ and $Y_2$ on the axis. The Halo array 320 therefore lies on the x and y axes 608, 609 of the set of axes. The z-axis 607 lies directly out of the plane of the Halo array 320 toward the source of the noise, the car 510. The direction of the car 510 from the centre of the Halo array 320 is indicated by arrow 602. Since the car 510 in this example is a source of noise detected at the Halo array 320, the arrow 602 is an incident direction of the noise produced by the dominant noise source at the Halo array 320. The direction of the arrow 602 with respect to the axes can be defined in a number of ways, as the skilled person would appreciate. In the example of FIG. 6, the direction of the noise source 510 is defined with respect to the z-axis 607. That is, the direction is defined by two angles represented by arrows 621 and 622 defining the displacement from the z-axis 607. A first azimuth angle in the direction of the x-axis 608, also represented in FIG. 6 by the quantity, α, is represented by the first arrow 621, and the result of the transformation by this angle is the dashed line of 620. A second vertical angle in the direction of the y-axis 609 is represented in FIG. 6 by the quantity β and by the second arrow 622, and the transformation from the dashed line of 620 to the arrow 602 in the direction of the noise source 510 is defined by the second angle.

In other words, in an example where the first arrow 621 represents an angle of 20° and the second arrow 622 represents an angle of 10°, the direction of the dashed line 621 is defined by being displaced 20° in the positive x direction from the z axis 607, and 10° in the positive y direction from the z axis 607. That is, in the example of FIG. 6, α=200 and β=10°. As described above, there are other methods of defining these angles that could be implemented by the skilled person. For example, the angles might be defined from the y axis or from the x axis, or from another predetermined line, which may be set with respect to a road scene as viewed by the tracking camera, for example centred on the middle of a road observed by the system.

Returning to FIG. 4, and processing step 408, an incident angle of the noise source at the microphone array with respect to a predetermined reference line is determined. In the example of FIG. 6, z-axis 607 is the predetermined reference line. This determination is performed by the processing circuitry 330 of the microphone array, or in some examples, by the processing circuitry of the noise camera, with reference to the above-mentioned first lookup table 331. This gives a measurement for the angles of, in this case, an azimuth angle and a vertical angle defining the direction of the noise source with respect to the predetermined reference angle, which as described above in the example of FIG. 6 may be the z-axis.

Following this processing step 408, the processing proceeds to a mapping step 410, in which an incident angle, that is angles determined in the previous step 408, of a noise source in a noise space corresponding to a field of view of the tracking camera is mapped to a pixel of a scene captured by the tracking camera. This step of mapping a pair of angles to a pixel may be computed for each pair of angles, or it may comprise use of a lookup table such as second lookup table 332. This step may be altered and simplified in certain scenarios, for example if the output of the tracking camera is a rectilinear image. However, this mapping step may be necessary in this form if the output of the camera is a distorted image, such as the output of a wide angle camera, one which uses a fish-eye lens or equivalent. The mapping step 410 may map the angles determined in step 408 to a pixel of an image captured by the tracking camera 322, within a field of view of the tracking camera 322, which corresponds to a noise space, which is a space formed by possible values of the pairs of angles determined by the microphone array. The image captured by the tracking camera may be, for example a frame of a video such as that recorded from the tracking camera 322 situated as part of the Halo (tracking camera and microphone array).

In other examples more than two angles may be determined, one for each of more than two planes which map a noise source into a noise/sound space. Thus the angles may be a group of angles, a pair being one example. Another example configuration of a noise camera is described below with reference to FIG. 21.

As will be explained below, the second lookup table 332 is preconfigured with a mapping between pairs or groups of angles and pixels in the field of view of the tracking camera 322. This pre-configuration of the second lookup table 332 is performed by a calibration process explained below which involves positioning the tracking camera 322 so that within the field of view of the tracking camera 322 is calibration image which is a grid of lines such as in FIG. 7A, with marked grid intersections, providing intersections between the lines of the grid. For each intersection, a pixel representing that intersection is identified and added to the lookup table 332. Further detail on a calibration and setup process are outlined below.

Figure 7B:
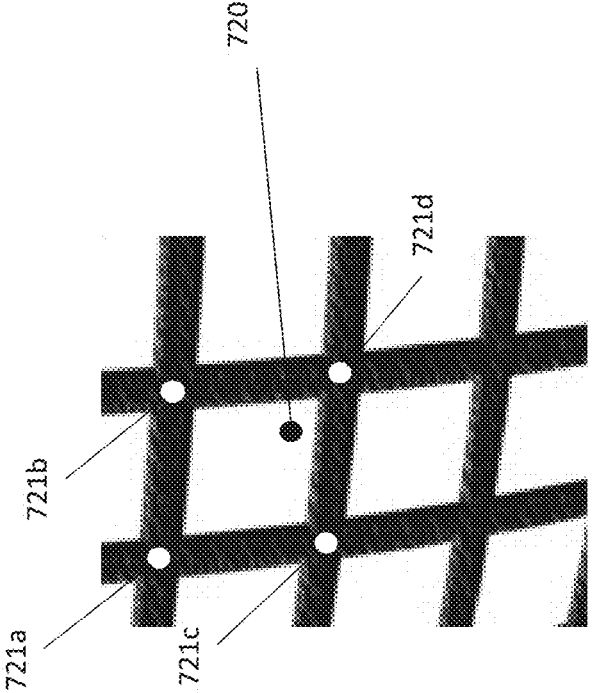
FIG. 7B shows a representation of an interpolation step, in accordance with certain embodiments of the technique.
Figure 7A:
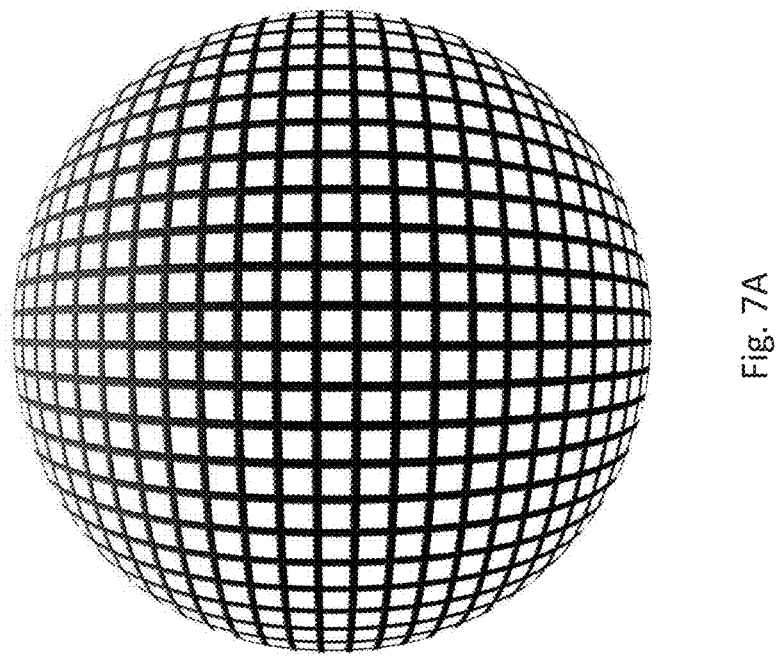
FIG. 7A shows a representation of a field of view of a wide angle, specifically a fish eye lens, camera.

During the mapping step 410, the processing circuitry 330 may perform a search of the marked intersections for the four intersections closest in angle to the angles determined in step 408 of FIG. 4 and thus the surrounding area of line 602 can be determined. In the representation of FIG. 7B, a black dot 720 represents the line 602 as seen from the camera 322 of the camera and microphone array, and white dots 721*a-d* represent the intersections of the grid lines.

Following the determination of the four closest intersections of the grid to the line 602 as represented in FIG. 7B by the four white dots, the processing circuitry 330 may perform a step of linear interpolation between the four grid points to provide an accurate determination of the location of the line 602 represented by the black dot 720 in terms of the pixel representing the direction of the line 602, and hence of the direction of the noise source from the noise camera. An example calibration/setup procedure is described in greater detail below.

Following the mapping step of 410, processing passes to step 412. In this step 412, the processing circuitry 330 of the tracking camera 322 and microphone array 320 may apply a threshold to determine whether an indication of an incident direction of noise from a dominant noise source should be added to information recorded by the tracking camera before the information is transmitted to the processing circuitry 210, 315. That is, noise levels of the tracking microphones may be averaged, or in some examples, noise levels of only some of the tracking microphones may be averaged, to give a general noise level. This may be compared to a threshold, such as, for example, a threshold corresponding to approximately 45 decibels (dB). The processing circuitry 330 may determine that if the noise level exceeds the threshold, that a pixel location value should be added to information collected by the tracking camera and the information then transmitted to the processing circuitry 315, 210, and processing proceeds to step 414. However, the processing circuitry 330 may determine that, if the noise level does not exceed the threshold, the pixel location value should not be added to information collected by the tracking camera and only information collected by the tracking camera should be transmitted to the processing circuitry 210, 315, processing proceeding to step 416 directly as indicated by arrow 413. The level of the threshold applied may be predetermined during a setup procedure, and may be adapted based on an average volume of a period of recorded noise by the tracking microphones.

As described above, if the processing circuitry 330 determines that a pixel location value should be added to the information recorded by the tracking camera, processing proceeds to step 414, where the indication is added. In this step 414 an indication of a location of a pixel representing a direction of the noise source may be provided in combination with an image, which may be a frame of a video. For example, the indication of a pixel may be a representation of a marker overlaid on the pixel, such as a red dot to indicate the noise source, and the image may be a frame of a video captured by the camera 322 of the noise camera. In this example, a single output is produced combining the information of the microphone array and the tracking camera (Halo system), which can be subsequently used for further processing (explained below). In other examples, a pixel coordinate may be provided instead of a visual marker, such as pixel (100, 100) of the image, or a pixel number may be provided. This could be displayed or not displayed on the image, as the case may be, and the information may be added to the image file forming the documentary evidence associated with a trigger event. In an example embodiment, the image to which the indicated pixel belongs is an image from the tracking camera forming one frame of a video recorded by the tracking camera. In this example, the process of FIG. 4 may be performed with respect to each frame of the video, providing an indication of the dominant noise source in a noise space corresponding to the field of view of the tracking camera for each frame of a video recorded by the tracking camera 322. In some examples, it may be that not every frame of a video has an individually calculated marker. In the case where the image is a frame of the video captured by the camera 322, a single marker may be used for multiple frames. For example, a marker may be calculated for every second frame of the video captured, or every third frame of the video, or so on. This has obvious benefits in reducing an amount of processing required by the processing circuitry 330 and may still allow the noise source to be identified from the image, as necessary.

Following processing step 414, processing proceeds to processing step 416, where the process terminates. In other examples, processing may proceed to step 416 and terminate without performing and passing through step 414, as shown in FIG. 4 by arrow 413.

The example embodiments described above with reference to FIGS. 3 to 7 provide a process by which audio information may be used to provide information as to a dominant noise source in a scene, which may be concurrently imaged by a camera, thereby providing both visual and auditory information, collectively referred to as documentary evidence, as to a dominant noise source in a scene such as a road scene. This has benefits in enabling the identification of a dominant source of noise if noise in excess of a predetermined threshold is recorded in a scene, which may assist an investigating authority in determining if action needs to be taken against the controller of the dominant source of the noise.

Certain steps in the process performed by the processing circuitry 330 may be performed in an order other than the order presented above, may include certain steps omitted above, and/or may include certain altered steps of the process, such as the mapping step 410. For example, the mapping step 410 may be altered if an incident angle of a dominant noise source does not require mapping to correct for distortion of a tracking camera, such as if the tracking camera uses a wide angle, but not a fish eye, lens. In other example embodiments, step 404 of the process representing a filtering of audio information may be omitted, for example if audio information received by the processing circuitry 330 in step 402 has already been filtered by the tracking microphones.

According to the above example two separate lookup tables 331, 332 are used in the steps of mapping the TDOA measurement to the pairs or groups of angles and a separate step of mapping the groups of angles into one or more pixels identifying the dominant noise source in each video frame. This corresponds to the operations performed above in the flow diagram of FIG. 4 with reference to steps 408, 410. However, as will be appreciated, other implementations are possible. For example instead of using two lookup tables, a single lookup table can be used to map the TDOA values into the one or more pixel values identifying the location of the dominant noise source in each tracking image, which may be video frames.

In some embodiments of the above process, the tracking camera may be an IP, internet protocol, camera, and there may be a latency associated with such a tracking camera. In this example, the latency may be approximately 2.5 seconds, whereas a latency associated with audio information may be significantly less. In this example, the processing circuitry 330 may add blocks of audio information received from the tracking microphones to a buffer, and associate each block of audio information with a timestamp according to a time of a recording of the audio information. Then, the processing circuitry 330 may perform processing on the audio information in accordance with the above-described process. At a time when the latency associated with the information recorded by the tracking camera has elapsed, the processing circuitry 330 may receive the information recorded by the tracking camera, which may also have a timestamp associated with it. The processing circuitry 330 may then call from a buffer audio information with an associated timestamp, which may, in between being recorded by the tracking microphones and calling by the processing circuitry 330, have been processed by the processing circuitry 330. Thus, the audio information may be in a number of different forms. It may be in the form of raw audio information as recorded by the tracking microphones, or it may be in the form of a number of samples denoting a TDOA for each pair/group of tracking microphones, or it may be in the form of a pair of angles associated with the corresponding TDOAs, or it may be in the form of an indication of a location of a pixel of a view as recorded by the tracking camera, or another form. Following calling of the audio information, the processing circuitry 330 may proceed to complete processing of the audio information, if processing has not already completed, and a resulting, or called, pixel location value may then proceed to be added or not added to the information recorded by the tracking camera. That is, the processing circuitry 330 may receive the information recorded by the tracking camera before step 414 of FIG. 4. If the information recorded by the tracking camera is received by the processing circuitry 330 before completing step 412, then the processing circuitry 330 may proceed to complete steps up to step 412 before adding or not adding a pixel location value to the information recorded by the tracking camera.

Example Deployment of Noise Camera

The processing circuitry 315 of the system is capable of receiving information from a tracking camera 322 and a microphone array 320 as a single information input, similar to inputs from detection cameras 313 and 314, or microphone 312. As described above, the processing circuitry 315 may then transmit this information, along with information from the detection cameras 313 and 314 or detection microphone 312 as documentary evidence to a server, such as server 114. As explained above, packages of information generated by the noise camera, including tracking and detection cameras and microphones may be referred to as documentary evidence, for example, where there has been a possible infringement of noise emission limits.

Figure 8:
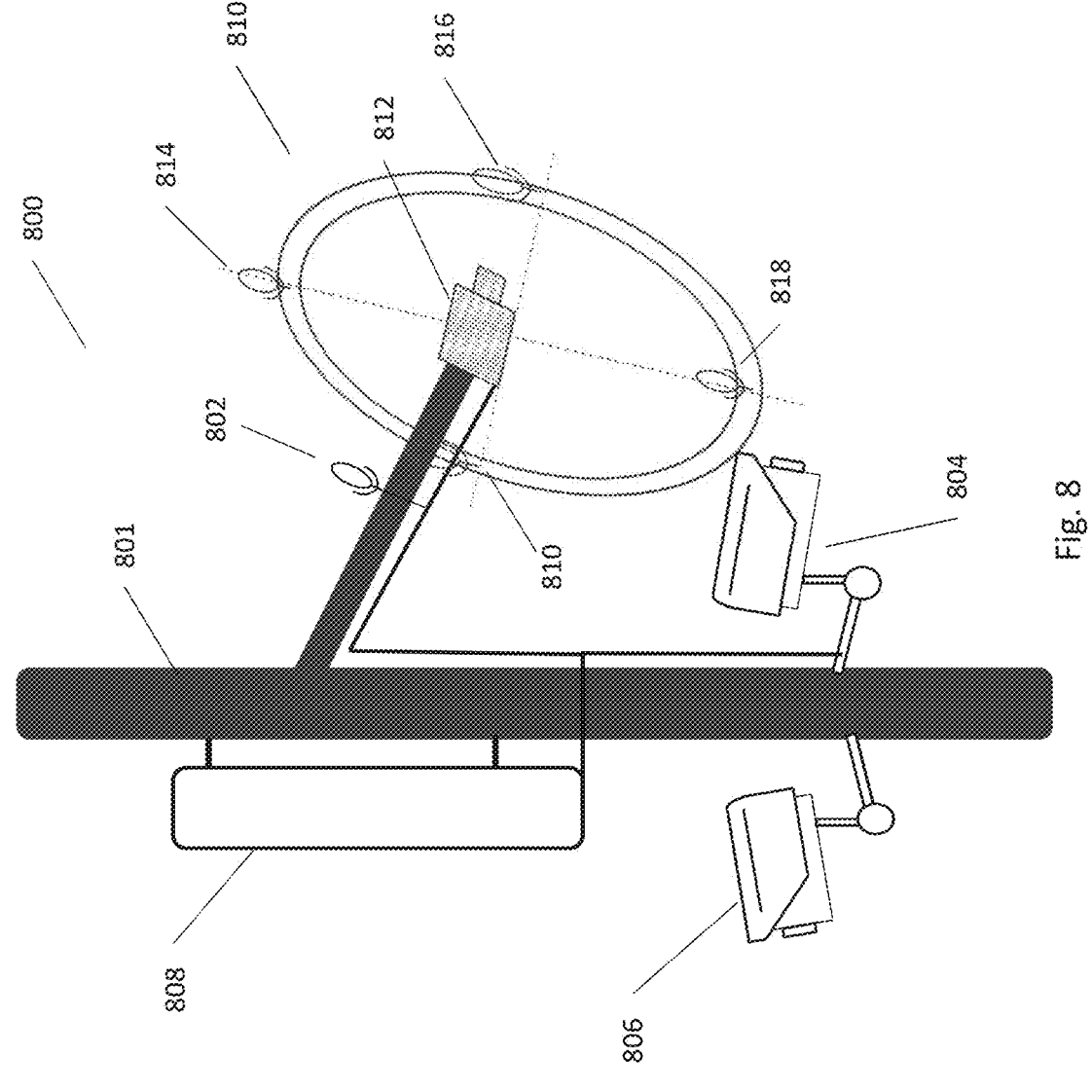
FIG. 8 shows a representation of a noise camera in accordance with certain embodiments of the technique.

An example embodiment of a noise camera is shown in FIG. 8. FIG. 8 shows a system 800 mounted on a piece of road furniture 801, with a detection microphone 802, detection camera housings 804, 806, processing circuitry 808, and a Halo system 810 made up of a tracking camera 812 and four tracking microphones 814, 816, 818, 820 forming a microphone array. This system, in transmitting information to the server 114 of FIG. 1, may report multiple pieces of information as documentary evidence at the same time. For example, the system 800 might report video information gathered from cameras housed within one or both of the detection camera housings 804 and 806. In addition, the system 800 could report information gathered from the tracking camera 812 and microphone array 810, and/or information gathered from the microphone 802. As indicated above, following a trigger event, information is generated as part of the documentary evidence and sent to the server for processing.

Although detection camera housings 804 and 806 are each pictured in FIG. 8 as a single camera housing, there may be instances where a single detection camera housing contains a plurality of cameras, for example, two detection cameras. That is, the detection camera housing 804 may contain two detection cameras, providing two views of a same area of road scene. In a similar manner, the detection camera housing 806 may also provide for housing a plurality of cameras, for example two detection cameras providing a view of a different part of a road scene to detection camera housing 804. In some scenarios, two cameras within the same housing may image the same section of the road scene. The cameras contained within the same housing may be differentiated by having a different purpose, for which they may have set different physical parameters. For example, a first camera within the housing may provide a magnified version of the same view provided by a second camera, or a view with a restricted field of view in comparison to the second camera. In other examples, the first camera may also have a filter applied to it, or may have different processing applied to data that it collects.

Figure 9:
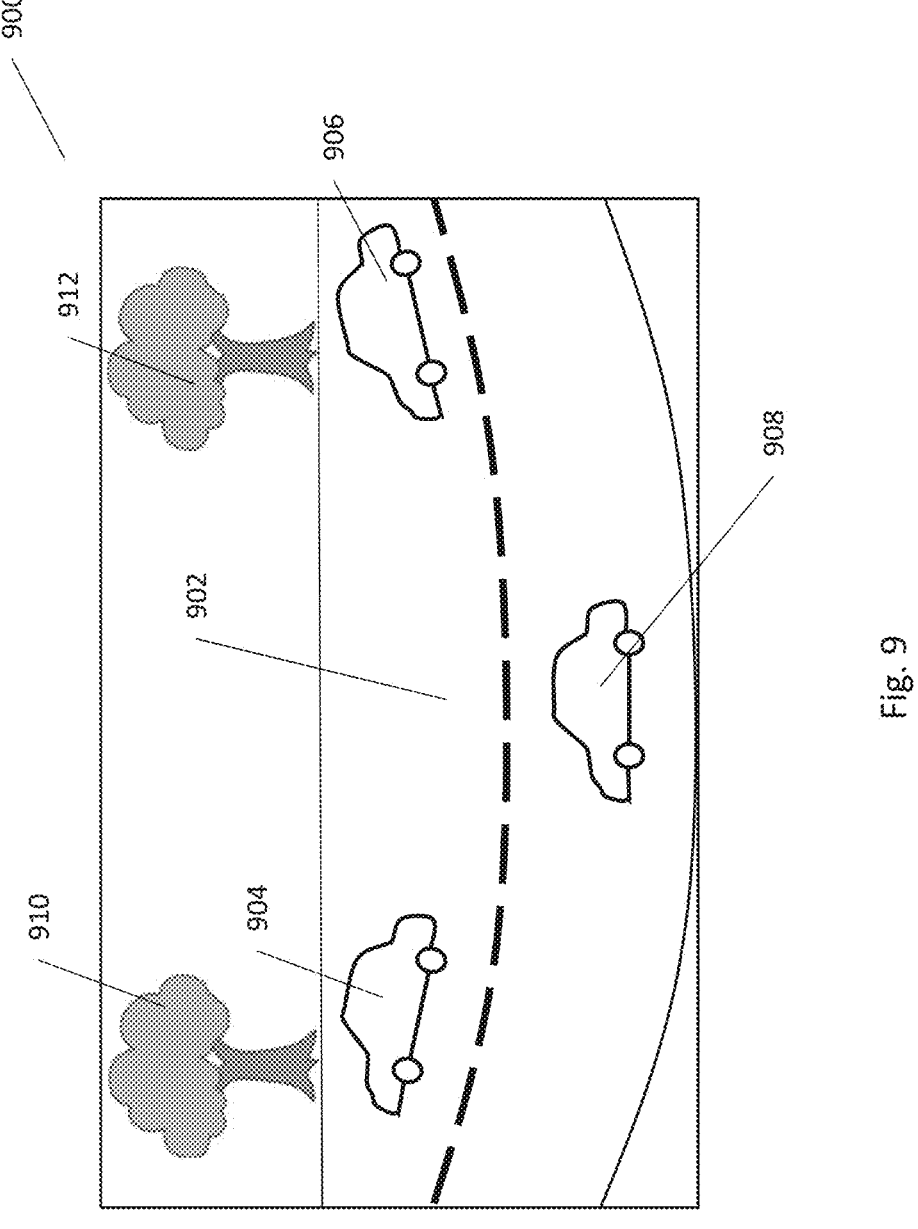
FIG. 9 shows a representation of a road scene within a field of view, as recorded by a noise camera in accordance with certain embodiments.

In an example depicted in FIG. 9, a view of a road scene 900 is shown as imaged by a wide angle lens on a camera, such as may be achieved by tracking camera 322 described above if fitted with a wide angle lens. This imaging process causes a distortion of the image, and a road 902 in the road scene 900 is seen to be wider at the centre of an image than at the edges of the image. As part of the road scene, vehicles such as cars 904, 906 and 908 are imaged and depicted as part of the scene and background elements such as trees 910 and 912 are visible. One of the vehicles imaged in the road scene may be producing noise in excess of a predetermined limit or threshold and it may be an object of a noise camera installation to identify which of the vehicles is producing such noise.

As described above, an installation of a noise camera, tracking camera and microphone array may assist in identifying which of the cars is producing noise in excess of a threshold. The installation may be similar to the system described above in relation to FIG. 8, and may include several cameras in each of the camera housings 804 and 806 to image the road scene 900. The view of these cameras may be separated from each other and they may be directed at different parts of the road scene to provide greater detail on particular areas of the road scene 900.

Figures 10A, 10B:
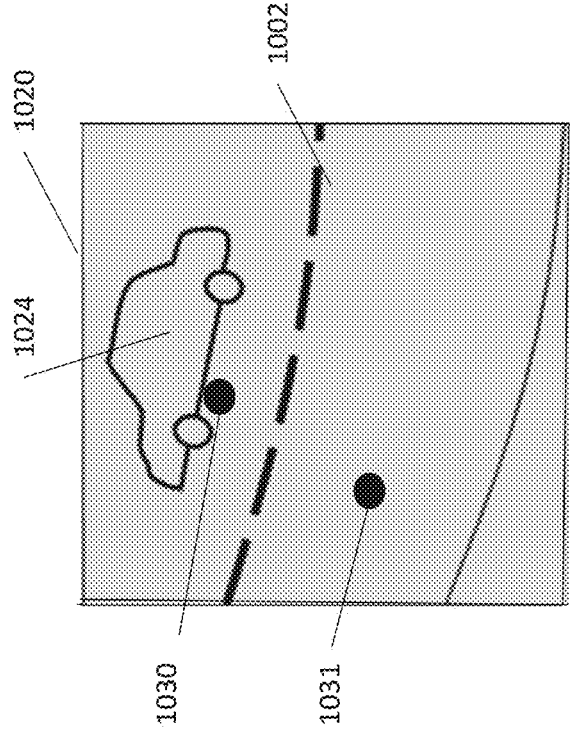
FIG. 10A shows a representation of a part of the road scene of FIG. 9 as recorded by the noise camera in accordance with certain embodiments.
FIG. 10B shows a representation of a part of the road scene of FIG. 9 as recorded by the noise camera in accordance with certain embodiments.
Figure 11B:
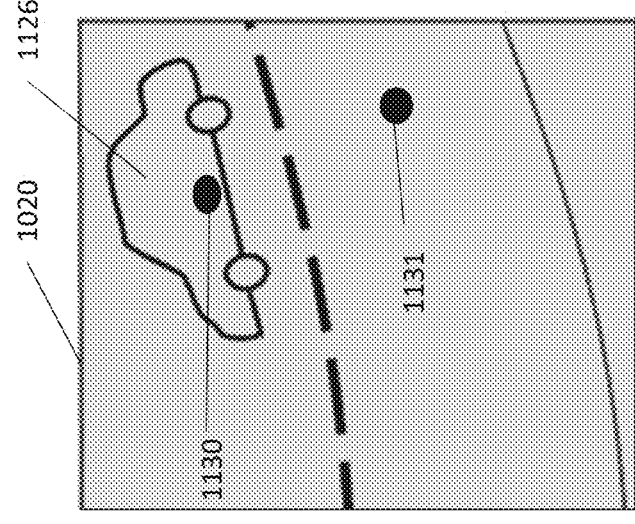
FIG. 11B shows a representation of a part of the road scene of FIG. 9 as recorded by a noise camera in accordance with certain embodiments.
Figure 11A:
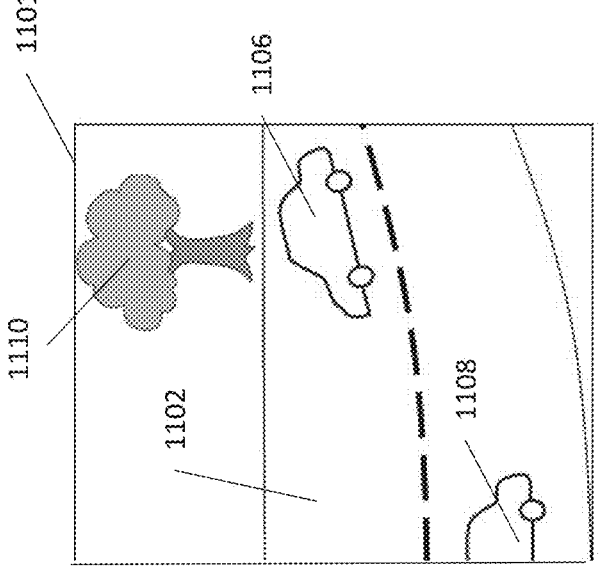
FIG. 11A shows a representation of a part of the road scene of FIG. 9 as recorded by the noise camera in accordance with certain embodiments.

As shown in FIGS. 10 and 11, two such views are depicted. FIGS. 10A and 10B depict a view of the road scene similar to that viewed from a camera within camera housing 804, while FIGS. 11A and 11B may depict a view of the road scene similar to that viewed by a camera within camera housing 806, where each of the camera housings 804 and 806 comprise two cameras as shown in FIGS. 10A and 10B, and 11A and 11B.

FIG. 10A shows a first view from a first camera within camera housing 804. As will be seen from a simple comparison of FIGS. 9 and 10A, camera housing 804 and the cameras therein are directed toward a left hand portion 1001 of road scene 900. This is apparent due to the inclusion of the image of the car 1004 and a front portion of car 1008 which correspond to cars 904 and 908 on the left hand side of the road scene 900 as well as tree 1010 corresponding to tree 910 of FIG. 9. In addition to this view depicted in FIG. 10A, FIG. 10B also shows a magnified version 1020 of the same view, as captured by a second camera within camera housing 804, with a reduced field of view still showing cars 1004, now 1024, but without showing the front half of car 1008, due to the reduced field of view.

Road 1002 is shown in FIG. 10B, but less of the surroundings, such as tree 1010, is visible. In addition, in some examples, as shown here, a filter may be applied to the image by the camera, as can be seen by the darker colour of the image. Other features, such as additional processing, may be applied to the information captured by the second camera within camera housing 804, such as Automatic Number Plate Recognition (ANPR).

Similar to the views presented in FIGS. 10A and 10B are the views presented in FIGS. 11A and 11B. In terms of the road installation of FIG. 9, these two views may be taken from the view of a camera situated within camera housing 806. Camera housing 806 may contain two cameras, as camera 804 detailed above has in this example, and may therefore provide two views of a same region of the road scene. It will be apparent from a comparison of FIGS. 9 and 11A that the view of camera within camera housing 806 depicted in FIG. 11A is a right hand portion of the view of the road scene of FIG. 9, and contains road 1102, car 1106, car 1108, and tree 1110, each of which correspond to features of the former FIG. 9. Furthermore, FIG. 11B shows a magnified and filtered version of the same view as FIG. 11A, as may be captured by a second camera situated within camera housing 806, where the field of view of the camera is restricted to showing only car 1126, corresponding to car 1106 and 906, but not car 908 or 1108, and background elements of the view of FIG. 11A are therefore removed from the image, for example tree 1110.

In FIGS. 10B and 11B there are also several predetermined detection points 1030, 1031, 1130 and 1131 as indicated in the relevant Figures by spots. These detection points are predetermined during a setup process of an example of the current system in such a way that they are, as per the example of FIGS. 10B and 11B, in an approximate position occupied by a number plate of a vehicle as it enters or exits a field of view of a camera of the present system. As will be apparent from a comparison of the FIGS. 10A-11B, locations of the detection points are within a field of view of the detection cameras, and within a field of view of the tracking camera. Their significance will be further explained later.

Processing to Identify a Dominant Noise Source

As explained above, example embodiments can provide a noise camera, which generates documentary evidence after detecting a trigger event. In response to detecting a trigger event, the documentary evidence generated by the noise camera is transmitted to a server, for example the server 114 shown in FIG. 1. According to example embodiments, the documentary evidence generated by a noise camera according to the present technique may comprise video generated by the tracking camera, pixel identification information identifying for frames of the video a location of a dominant noise source (pixel location values), representation of the noise signal as detected by the detection microphone, and video from the detection cameras.

Example embodiments can therefore provide a server and processing methods for receiving documentary evidence from the noise camera following a trigger event, the documentary evidence comprising tracking video, noise source pixel location values comprising, for each of one or more frames of the tracking video, an indication of at least one pixel of a location of a dominant noise source in the frame of the tracking video, and a sound recording of sound associated with the trigger event. The method then proceeds to identify a path of a dominant noise source in the tracking video from the noise source pixel location values, determine a detection time at which the path of the dominant noise source in the tracking video is closest to a detection point in a field of view of a camera which captured the tracking video, and identify the dominant noise source from one or more image frames corresponding to the detection time.

According to example embodiments a dominant noise source is identified by a process, which is carried out by processing circuitry such as by a server 114 on received documentary evidence gathered from a noise camera, which includes detection cameras 206 and 208, and tracking camera 322, and microphones such as microphone 204, or 312, or tracking microphones $X_1$, $X_2$, $Y_1$, $Y_2$. This process will now be described. As explained, the server 114, with noise cameras 102, 104, 106 form a system as described above. The server 114 may perform a process according to example embodiments which can be used in the identification of a dominant source of noise exceeding a predetermined threshold, such as a vehicle. This may be readily understood with reference to FIGS. 12A and 12B, which shows a flow diagram of processing steps carried out by processing circuitry such as server 114 of FIG. 1, with the aim of identifying vehicles, in combination with graphical plots of examples shown in FIGS. 13A and 13B. The process begins at step 1200, before processing passes to step 1202.

In step 1202, an indication of a dominant noise source location may be identified in each of a plurality of successive image frames of the tracking video for display. The indication may, in some examples, be a dot overlaid on the image, centred on the pixel indicated by the pixel location value for that image frame of the tracking video. As such when a sequence of the tracking video is displayed, the dominant noise source, which triggered the events which generated the documentary evidence may be presented to a viewer. However, the pixel location values are also used to identify the noise source as explained below. In other examples, the indication may be a pixel number or coordinates of a pixel forming part of the image frame, or other appropriate indication of a pixel. Processing then proceeds to step 1204.

In step 1204, processing is performed to identify a path of the dominant noise source which triggered the event associated with the documentary evidence from which the noise source can be identified. The path of the pixel location, representative of a path of a dominant noise source is identified from the received pixel location values forming part of the documentary evidence. The path of the pixel location is represented by movement of an indicated pixel across a plurality of image frames of the tracking video captured by a tracking camera such as tracking camera 322. As explained in step 1202, the pixel location of the dominant noise source may be represented as a dot overlaid on a sequence of successive image frames of the tracking video. In this example, the path of the pixel location can be represented as a path traced by the dot in successive frames of the tracking video captured by the tracking camera. However, as well as providing a visual presentation of a path of the dominant noise source, the pixel location values of the noise source are also used to verify that the noise source identified is the noise source which was the cause of the trigger event caused by noise exceeding a predetermined threshold. An example embodiment of this processing step 1204, in greater detail, is shown in FIG. 12B and explained below. Following step 1204, processing passes to step 1206.

In step 1206, the identified path is compared to one or more detection points, which are within a field of view of the tracking camera and a detection camera. That is, the identified path, which may extend to the edge of the viewed scene, may be compared to detection points such as 1030 and 1031 of FIGS. 10 and 1130 and 1131 of FIG. 11. A determination may be made of a detection point that is closest to the identified path of the dominant noise source within the scene. This may be performed by determining a detection point to which the identified path of the indication of the pixel is close to a point or closest to at any point in the identified path. Using the example of FIGS. 9 and 10, vehicle 904, which was in a previous image to the right of its present location and has travelled along the road from right to left, has a path substantially following a middle line of an upper lane of FIG. 9. It may be determined, as seen in FIG. 10, that the detection point that this path approaches nearest is detection point 1030, as seen in FIG. 10B in an upper portion of the Figure. Processing then passes to step 1208.

In step 1208, a detection time is determined which is a time (or image number, or frame number etc.) at which the identified path of the dominant noise source passes closest to the determined detection point. The detection time may be an absolute time, or correspond to an image/frame number. Processing then passes to step 1210.

In the processing as explained with reference to FIG. 12A, up until step 1210, the processing has involved primarily the input as received from the tracking camera and microphone array, and processing data thereof. In step 1210, a corresponding time (or image number or frame number) of a view from a different camera may be identified. For example, an identified view in the above example may be a view as depicted in FIG. 10B, recorded by a second camera housed within camera housing 804 (detection camera). It should be noted that the determined time, frame or image is not restricted to only the nearest image, time, or frame of the corresponding camera. In some examples a number of images either side of the closest image/frame/time are recorded and processed. That is, having identified a time at which a vehicle that is a dominant source of noise passes a detection point, the system may retrieve information corresponding to that image/frame/time and its neighbouring images captured by the detection camera in order to identify a vehicle acting as a dominant noise source and an owner of the vehicle. In some embodiments, a single camera is used, which may be the tracking camera 322, and so the identification of a detection time may be the identification of tracking image/video frame where the identified path of the dominant noise source passes closest to the detection point. Processing then passes to step 1212.

In step 1212, processing, such as optical character recognition, OCR, may be performed on the images identified in step 1210 to identify the vehicle acting as a dominant noise source. That is, OCR may be performed in order to identify and process a license or number plate of the vehicle, which may assist an investigating authority in directing an investigation into use of the vehicle to a person responsible for the vehicle. This OCR may be part of, or replaced by a step of performing automatic number plate recognition on one or more images corresponding to the detection time. Generally, however the process step 1212 involves performing a computer vision processing on an image to identify the location of a license plate within the image. In a second part of the process, OCR is performed on the license plate to identify characters on the license plate to identify the vehicle. Processing may then pass to step 1214 where the process terminates.

As would be apparent to the skilled person, certain steps of the above technique may be performed in a different order to the order presented as above, or certain steps may be omitted from the technique as described above.

In addition, if, in step 1210, multiple images are recorded of a vehicle in a vicinity of a detection point, a further step may be performed providing a check of a travel direction of a vehicle. In this further step, multiple, for example three, images are processed by computer vision to determine an identifying feature of a vehicle such as a license plate (number plate). These images may be a closest image where a dominant noise source is closest of any image to a detection point, and an image immediately preceding the closest image and an image immediately following the closest image. Processing of the images may allow detection and recognition of a number plate, including a registration number of a vehicle, and a location of a registration number within the images. A comparison may be made between the images, determining a direction of movement of a registration number. This may take the form of determining a horizontal coordinate of a pixel corresponding to a centre of the license plate, or a pixel corresponding to an upper right-hand corner of a number plate, although it is clear that other methods of comparison are possible to determine a direction of movement of the registration number, and a number plate bearing that registration number. This comparison may be to determine whether a horizontal coordinate of the pixel corresponding to the centre of the license plate has increased with images taken in a time-order, or if the horizontal coordinate has decreased. This direction may then be compared to a direction of travel of a dominant noise source, such as determined in step 1230 of FIG. 12B as explained below, specifically a sign of a direction may be compared rather than a magnitude of a velocity of the dominant noise source. If a comparison between a computer-vision determined direction of travel and a direction of travel of a dominant noise source such as determined in step 1230 finds that a direction of travel is the same, then the processing may proceed. If the comparison finds that a computer-vision determined direction of travel and a direction of travel of a dominant noise source as determined by step 1230 is different, then processing may terminate and the documentary evidence of which the tracking video, images, pixel location values and sound recording may be rejected. This may have an effect of ensuring that a determined vehicle, and corresponding registration number, near a detection point has a direction of travel matching a dominant noise source identified in a field of view of a tracking camera, which may be desired by investigating authorities.

Figure 12A:
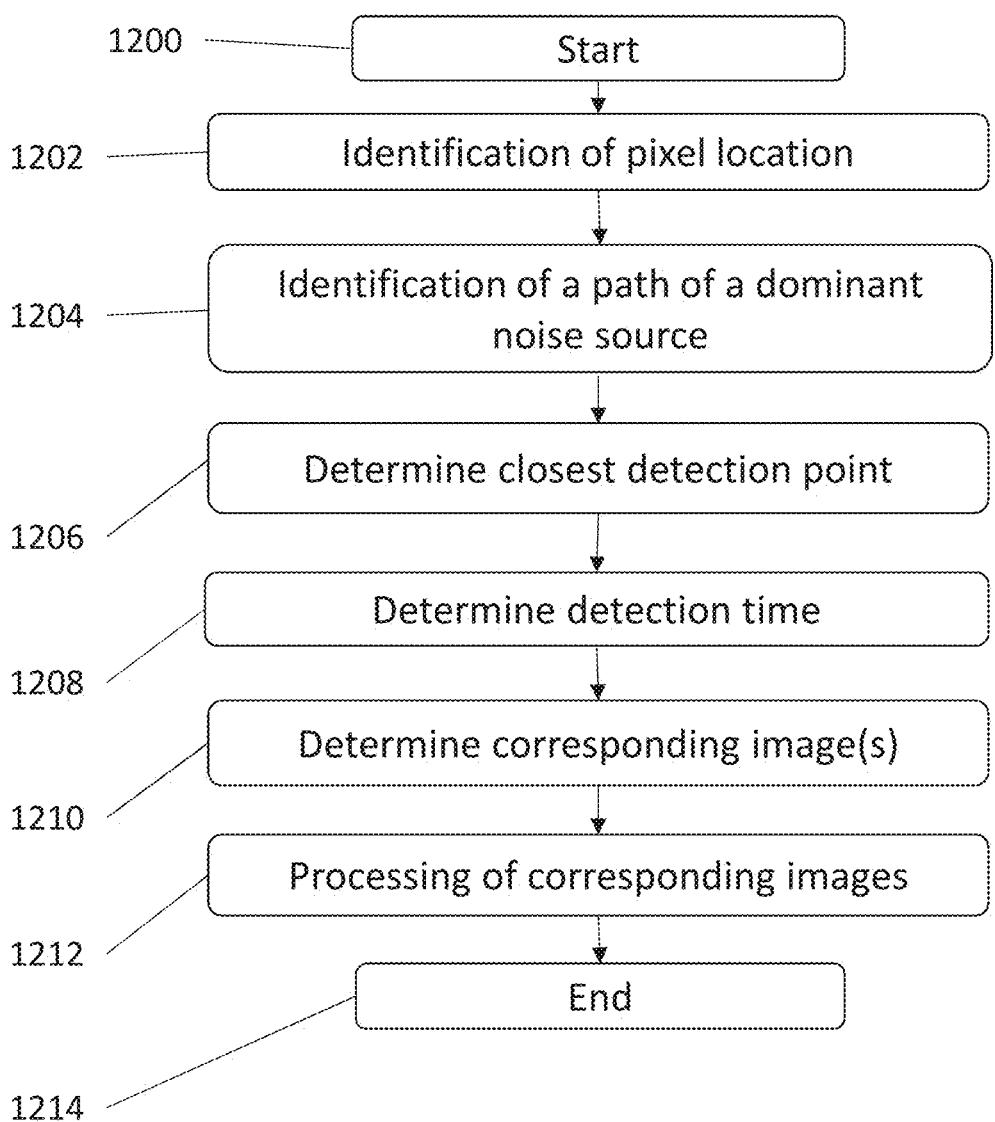
FIG. 12A shows a representation of processing steps performed on documentary evidence generated by a noise camera according to certain embodiments of the present technique.
Figure 12B:
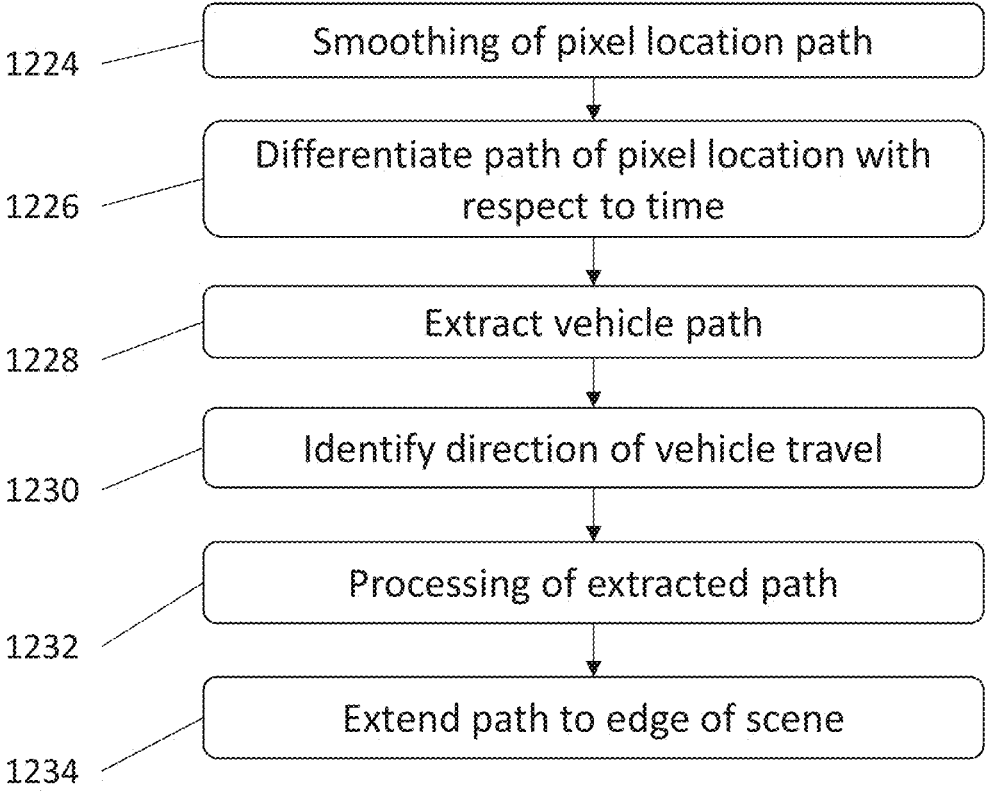
FIG. 12B shows a representation of processing steps to identify a path of a dominant noise source from the documentary evidence according to certain embodiments of the present technique.

In some embodiments, FIG. 12B shows in greater detail a process of the step 1204 of FIG. 12A, which identifies the path of a dominant noise source. The process of FIG. 12B has an effect of increasing a likelihood that the identified path identifies the noise source which triggered the event reporting the documentary evidence. FIG. 12B starts with step 1224.

In some embodiments, as part of identification processing step 1204, a smoothing may be performed on the pixel location values in order to decrease an effect of random variations on the identified path of the location of pixels. The pixel location values identify a location of a dominant noise source in each frame and for a sequence of image frames, moving within the scene imaged by the tracking camera 322 and monitored by the tracking microphones (audio detectors) of the microphone array of the system. Reflections of sound from objects within the scene can cause the pixel location values in some frames to identify places or objects within the scene which do not represent a source of the noise, which triggered the generation of the documentary evidence as a result of the predetermined noise threshold being exceeded. A smoothing process may be applied to the pixel location values so that in successive frames a path of the dominant noise source can be more accurately tracked. For example, a low pass filter may be applied to components of the pixel location values over successive image frames of the tracking video, which has an effect of smoothing the path of the pixel location. The components of the pixel location values may be the horizontal, the vertical and the time components. Alternatively, a moving averaging filter or an exponentially weighted moving average filter may be applied to the components of the pixel location values, again smoothing the path of the pixel location.

Figure 12C:
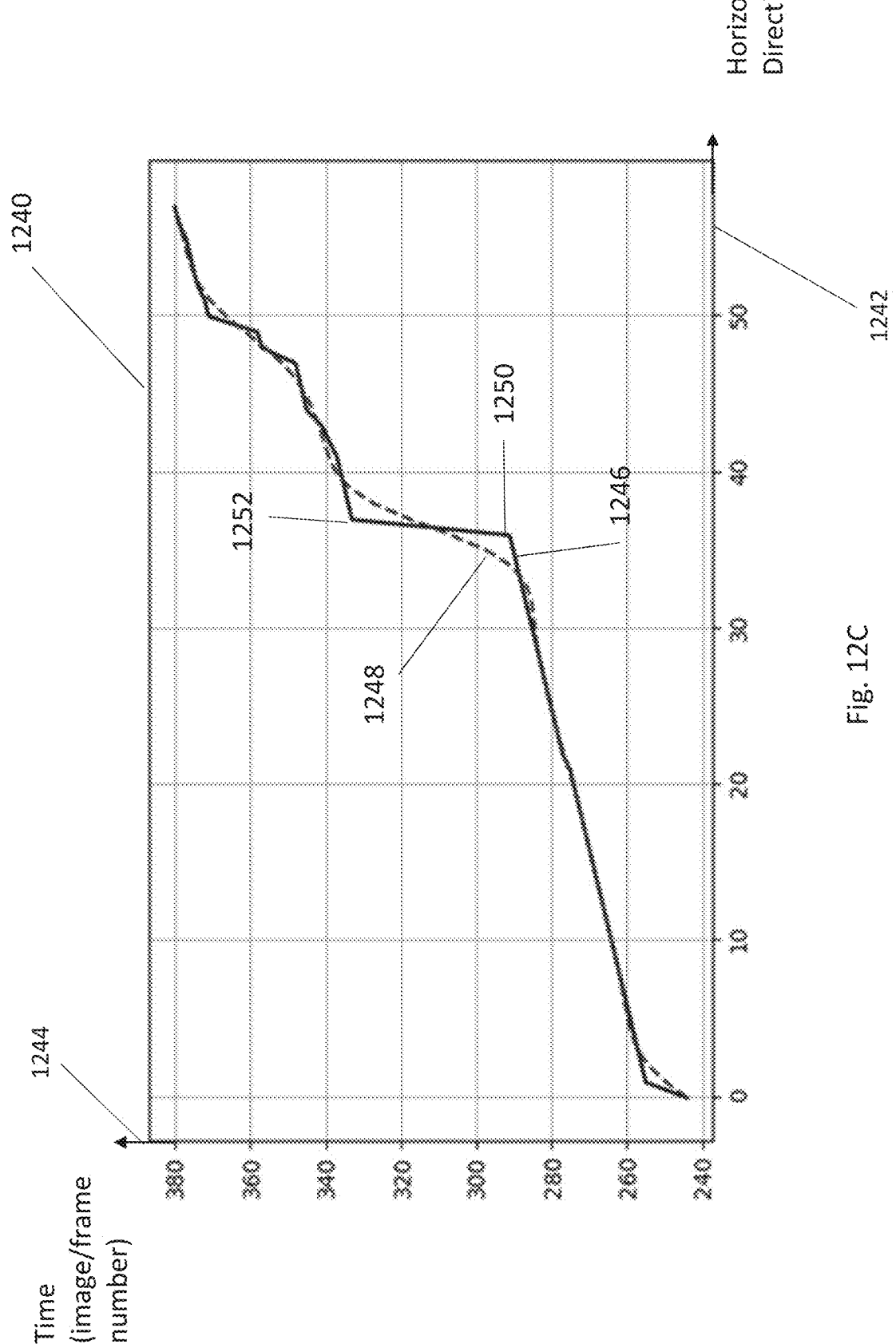
FIG. 12C shows a graphical plot representing smoothing of pixel indication values in accordance with certain embodiments of the present technique.

Processing step 1224 of smoothing may be more readily understood with relation to FIG. 12C. FIG. 12C shows a graphical plot 1240 of a horizontal direction 1242 against a time direction 1244, measured by image/frame number, graphical plot representing smoothing applied to a plot of pixel location values. Although FIG. 12C shows smoothing in only a horizontal direction 1242 and a time direction 1240 for ease of representation, the same smoothing process may be applied in a vertical direction, or both a horizontal direction 1242 and a vertical direction, as well as the time direction 1244. In FIG. 12C, a solid line 1246 connects plotted pixel location values, and a dashed line 1248 shows an effect of smoothing on the pixel location values. This effect may be seen with reference to points 1250 and 1252, where the pixel location values are located the furthest from dashed line 1248. This may relate to an example where, for a number of frames of a tracking video i.e. between frame numbers relating to points 1250 and 1252, pixel location values have not been available as part of the documentary evidence. Following processing step 1224, processing then passes to step 1226.

Figures 13A, 13B:
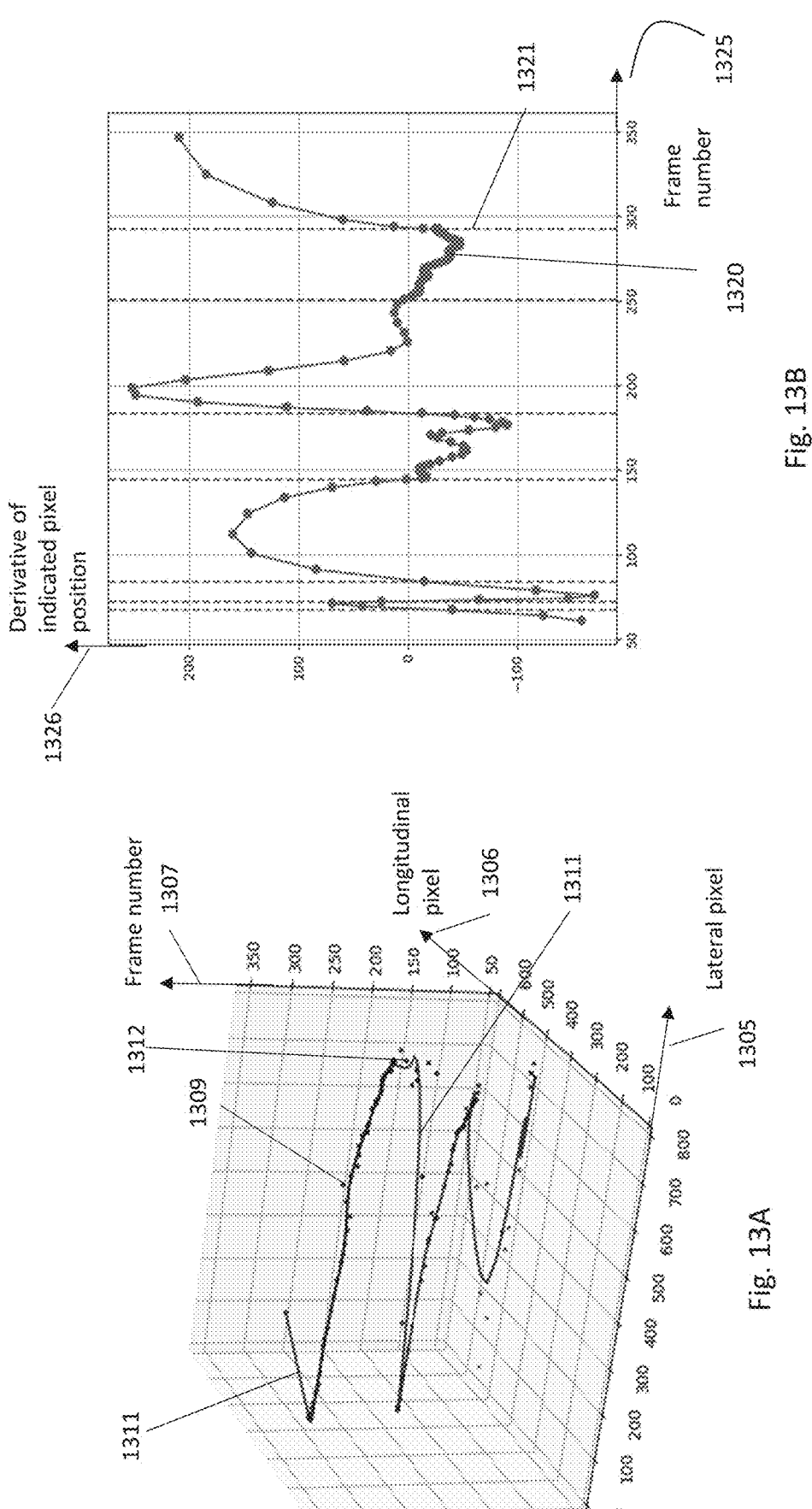
FIG. 13A shows a graphical plot representing an indication of a noise source in accordance with certain embodiments of the present technique.
FIG. 13B shows a graphical representation of a derivative of a position of an indication of a noise source with respect to time in accordance with certain embodiments of the present technique.

As mentioned above with reference to step 1202, the pixel location values not only provide a visual indication of a dominant noise source, when displayed, for example a vehicle which was the cause of the triggered events which generated the documentary evidence, but also as a way of confirming that this noise source was the cause of the trigger event. As part of the process, the path of the dominant noise source in step 1226 is extracted from the pixel location values provided with the documentary evidence. Step 1226 identifies the path of the dominant noise source in the tracking video from the noise source pixel location values by differentiating the pixel location values in at least one dimension and identifying the path of the dominant noise source between zero crossing values of the differentiated dimensions. Step 1226 and subsequent steps may be more readily understood with reference to FIGS. 13A and 13B. FIG. 13A shows a three-dimensional plot of pixel location values. The axes for the three-dimensional plot of FIG. 13A are lateral pixels in a predominantly horizontal direction 1305, longitudinal pixels in a direction predominantly into the surface 1306 i.e. away from the viewer, and frame number (as an approximation of time) in a direction predominantly vertically 1307. Points 1309 plotted on the graph of FIG. 13A may be representations of pixel locations in different images captured by a camera in accordance with above techniques. As mentioned above, in step 1224, a smoothing process is applied to the pixel location values such as a moving averaging filter and so when plotted, a moving average line such as 1311 is plotted to show a trend in the pixel locations. For example, the low pass filter may smooth an indicated region, 1309, where the moving average line 1311 changes direction sharply twice.

As mentioned above, in step 1226, a path of the pixel location values is differentiated with respect to time (or frame number) in order to separate contributions to the pixel location from different vehicles. That is, the path, which exists in two dimensions of pixels (longitudinally and laterally of a pixel array) and one dimension of image number, in some examples frame number, which may be approximated by time (assuming a constant frame rate), is differentiated with respect to image number. Process step 1226 therefore assists in extracting the path of the dominant noise source in the tracking video in step 1228. The differentiating in step 1226 separates the path in multiple images/frames into different vehicle passes at different times, since a dominant noise source will, in general, pass from one side of a viewed scene to the other side without significant change in velocity. However, two successive vehicles acting as dominant noise sources travelling in different directions will see a dominant noise source in a scene proceed in one direction to the edge of the viewed scene, and then proceed back across the viewed scene as a second vehicle acting as a dominant noise source passes before the system. Furthermore, if two vehicles act as successive dominant noise sources and travel in the same direction, then there is a handover instance where an indication of the dominant noise source swaps from one vehicle to the other, which generates a different rate of movement of the dominant noise source than produced by either vehicle. In this way the contributions of individual vehicles may be separated.

In some embodiments, the pixel location values of the noise source may be differentiated by differentiating each of the pixel location values of the noise source in a horizontal, a vertical direction/dimension, to represent a gradient of the values changing in the horizontal and vertical dimensions, and combining the differential values in the horizontal and vertical dimensions with a differential in a time dimension to form a combined differential value. The identified path of the noise source may be extracted from a sequence of the noise source pixel location values with the combined differential value between zero crossings or successive image frames between zero crossing values. In some examples, the pixel location values are used to form a time or frame number dimension by combining the horizontal and vertical components of the pixel location values with an image frame number. The differentiating the pixel location values may therefore be differentiating the horizontal, the vertical and the time dimension (frame number) with respect to the number of the image frames of the tracking video, the number of each of the frames of the tracking video being representative of time as the dominant noise source moves along a path in the tracking video. The horizontal, the vertical and the time differential values may then be combined and the path of the dominant noise source in the tracking video identified from a sequence of the noise source pixel location values corresponding to those combined differential values between zero crossing values. Differentiation in the time dimension may be more indicative of separate noise sources because not every image frame of the tracking video will include a pixel location value of the noise source. This is because different vehicles passing through the field of view of the tracking camera will be separated by periods where noise is not detected or not registered and therefore the pixel location values will have a discontinuity associated with gaps between noise within the field of view of the tracking camera. For this reason, for example, in a sequence of frames numbered 1 to 10, frame numbers 1, 2, 6, 7, 8, 9, 10 may have pixel location values whereas frames 3, 4, 5 may not. Accordingly, differentiation in the time dimension is equivalent to a rate of change of sample values between frames. Therefore, differentiating frames numbers 1 to 10 will be represented as 1, 1, 4, 1, 1, 1, 1.

In some example embodiments, the differential values (at least two of horizontal, vertical and depth or time) may be combined unequally in order to emphasise the dimensions or directions differently with respect to the others. For example, having regard to a typical position of a tracking camera when viewing a road, noise sources such as vehicles are more likely to move across the scene formed by the field of view of the tracking camera. As such a vertical component of the pixel location values is not likely to change very much because the vehicle is travelling horizontally within the field of view of the tracking camera. Therefore, a weighting value can be applied to deemphasise the vertical component in favour of the horizontal component. Furthermore, a time or depth direction is more likely to separate different noise sources as these are captured from different dominant noise source as different times and therefore a weighting value can be applied to make a greater emphasis to the time dimension. Accordingly, the differential values in the horizontal, vertical and the time dimensions are weighted with different weighting factors, the weighting factors emphasising each of the dimensions differently to identify the path of the dominant noise source. For example, the weighting factors may be 1.5 for the horizontal dimension, 0.25 for the vertical dimension, and 2 for the time dimension.

FIG. 13B shows a representation of a graph of a derivative of combined indicated pixel location values with respect to frame number in a vertical direction 1326, as an approximation of time, against frame number 1325. Points where a derivative, that is, plotted points on the graph shown in FIG. 13B and a connecting line overlaid there, cross the zero point in the vertical direction indicate a change in direction of an indication of a location of a dominant noise source in the viewed scene of the field of view of the tracking camera. In reality, this is more likely to correspond to a change in vehicle identity of a vehicle acting as the dominant noise source than a change in direction of the same vehicle consistently acting as a dominant noise source. Hence, frame numbers where the derivative value crosses zero may be thought of as boundary frames, or boundary images, between different vehicles acting as the dominant noise source in the viewed scene. Therefore in step 1228, those pixel location values corresponding to a sequence of frame numbers of the tracking video, where the combined differential values cross zero, are identified as the path of the dominant noise source and extracted. As mentioned above, it may be also apparent that not every frame has a marked dominant noise source, as can be seen by the differing density of points marked at different frame numbers. For example, separating a moving average line into contributions from different noise sources, it may be seen in FIG. 13B that between frames 140 and 180 may be considered one vehicle and between 250 and 290 a separate vehicle.

According to example embodiments therefore, in step 1228, a path of a vehicle contributing a dominant noise source is extracted. That is, a path of an indication of pixel location values representing the dominant noise source that corresponds in time to a trigger event and therefore associated with a peak of volume as identified in accordance with a process such as that described above with respect to FIG. 2C is extracted.

A more detailed explanation of the differentiation step 1226 for extraction of a path of a dominant noise source at step 1228 is provided below with reference to FIGS. 18A, 18B, 19A, 19B, 19C, 19D, 20A, 20B, 20C, and 20D.

In some example embodiments the extracted path may be bordered by a reversal in the direction of the path, as identified by a change in sign of a differential of the path with respect to time. This extracted path may overlap in time with a time resource corresponding to a peak volume, a peak value of a detected sound of the dominant noise source from the sound recording of the trigger event, which may be identified by a microphone, such as microphone 204, 312, or 802, and may overlap with at least part of the region surrounding the peak volume, although it does not necessarily include the whole region. Images and audio information corresponding to a path of the vehicle are extracted from a larger set of information, which may correspond to the region surrounding the peak of volume which may have been identified earlier. In some embodiments, a path to be extracted does not overlap in time with a time resource corresponding to a peak volume identified by a microphone, but does overlap with time resources within a region surrounding the peak volume. For example, time resources of a region surrounding a peak volume may comprise several sections, one section comprising time resources corresponding to a vehicle path and a second section comprising time resources not corresponding to a vehicle path, or a plurality of sections comprising time resources respectively corresponding to a plurality of vehicle paths. In some embodiments, the processing circuitry may perform a count of a number of time resources within each section, and determine that the path to be extracted is a path corresponding to a section comprising the largest number of time resources of any of the sections. In the example of FIG. 13B, a region surrounding a peak volume may be time resources corresponding to frames 250 to 300, and sections may be divided as a first section, which corresponds to a vehicle path, comprising time resources corresponding to frames 250 to 290, bordered visually by line 1321, and a second section, which does not correspond to a vehicle path, comprising time resources corresponding to frames 290 to 300. A count of time resources comprised within the first and second sections may result in the first section having time resources of 40 frames, whereas the second section may have time resources of 10 frames. In this way, the processing circuitry may determine that the path to be extracted corresponds to the first section, that is, frames 250 to 290, rather than frames 290 to 300. That is, the processing circuitry may determine which section of a region surrounding a peak volume corresponds to a path to be extracted.

According to example embodiments therefore, the processing circuitry may be configured to determine a time of a peak value of a detected sound of the dominant noise source from the sound recording of the trigger event, and to identify the path of the dominant noise source in the tracking video for a section of the tracking video corresponding to the peak value A summary of step 1228, extracting a vehicle path may be seen in relation to FIGS. 13A and 13B, in which a section of FIG. 13A marked as 1310 corresponds to a section of FIG. 13B marked as 1320. This may therefore increase a likelihood of the extracted pixel location values identifying a single vehicle, acting as a dominant noise source, travelling from a right side of a scene to a left side of a scene (or a left side to a right side), and for a large number of frames of a transit of this vehicle across the scene there is sufficient volume of noise produced to exceed the threshold for detection, as seen in a large number of points recorded in the corresponding sections of both FIG. 13A and FIG. 13B. This is therefore identified as a path to be extracted. Processing then passes to step 1230.

In some embodiments as a technique of increasing a likelihood that the identified path is that of the dominant noise source of the trigger event, step 1230 may be performed, in which a direction of vehicle travel is identified. This step 1230 may form part of or be related to step 1210 of FIG. 12A. In the previous step 1228, a path has been identified as a path of the dominant noise source in a viewed scene. In some example embodiments, in step 1230 pixel location values representing a change in direction of the dominant noise source may also be excluded, so that as far as possible the extracted path contains only a contribution from a single dominant noise source, and not a plurality of contributions from a plurality of different dominant noise sources. This may be performed by determining a direction of travel of an identifying feature in the one or more frames of the detection video forming part of the documentary evidence, the detection video being captured by the detection camera, comparing the direction of travel of the pixel location values from the identified path of the dominant noise source with the determined direction of travel of the identifying feature in the detection video, and rejecting the documentary evidence or rejecting those pixel location values of the dominant noise source if the direction of travel detected from the detection video and the tracking video differ. More generally, in other example embodiments the process step 1230 may be achieved by eliminating those pixel location values which represent a change of direction by determining a difference of each of horizontal and vertical positions of the pixel location values between one or more frames of that tracking video, and rejecting those samples which represent a change in direction. That is that the path is differentiated with respect to time (that is, with respect to image number, which may in some cases be a frame number and correspond to time), and a direction of travel identified for the vehicle. For example, in the scene displayed in FIG. 9, it may be that a positive travel direction is defined as being from a right hand side of the scene to a left hand side of the scene. In this way, a direction of travel may be identified by differentiating a position of a dominant noise source, for example vehicle 908, and identifying that a sign of a resulting derivative is positive, indicating the vehicle is moving from right to left. In some cases, a magnitude of the gradient denoting the speed of the vehicle is also identified. In this way the direction, and in some cases the speed, of the dominant noise source's motion may be identified. This may be calculated by determining a difference of each of horizontal and vertical positions or components of the pixel location values between each of the one or more frames in the tracking video, and comparing the difference between successive frames to a predetermined threshold. For example, the threshold may be zero, and a positive difference may indicate a dominant noise source moving to a right-hand side of the scene. Therefore, if the difference between positions of the pixel location values between successive frames is less than zero, this may indicate a reversal in the direction of travel of the dominant noise source. Accordingly, pixel location values associated with a change of direction may be eliminated from the identified path or the documentary evidence rejected. Processing then proceeds to step 1232.

In the example of FIGS. 13A and 13B, it is apparent from FIG. 13B that the derivative of indicated pixel position for the extracted path section 1320 is negative, as the derivative value is plotted below zero on the vertical axis 1326. From the definitions of axes in FIG. 13A with the lateral pixel axis 1305 as positive in a right direction, this implies that a motion of the vehicle identified in a negative direction is from right to left in the viewed scene. Moreover, this may be seen from the corresponding section of FIG. 13A, where the corresponding section 1310 rises from a right-hand side of the section to a left-hand side of the section. Since the vertical axis 1307 corresponds to frame number, and hence to time, it may be seen that the dominant noise source causing the extraction and processing of this section is moving from right to left in a viewed scene.

In some example embodiments, step 1232 is included in which further processing may be applied to the extracted path to reduce an effect of random variation on the extracted path. That is, as above, a low pass filter may be applied to the extracted path to create a smoothed version of the extracted path. In some examples, other methods of smoothing the path of an indicated pixel and reducing the effect of random variation on the extracted path may be used. Processing then proceeds to step 1234.

In some example embodiments, in step 1234, the extracted path is extended so that the path reaches the edge of the scene, in other words to the edge of a frame of the tracking video, thus creating an extended path. That is, for many reasons a camera as part of the current system may not record a full view of a vehicle acting as a dominant source of noise across the extent of a viewed scene. For example, the vehicle may be stopped in traffic, making little noise for a portion of the vehicle's transit across a scene and so a record of that portion of the vehicle's transit is not recorded, or the region around a peak volume is set to be a small region with few time resources, and the entry or exit of the vehicle is not recorded for this reason. In yet other scenarios, the vehicle itself may not proceed in a straight manner from one side of a viewed scene to the other side. In all of these scenarios and others, it is advantageous to extend to the edge of the scene the path of the vehicle identified as causing the dominant noise, and so to produce an extended path. This may be done using the gradient of the indicated pixel movement between images (as smoothed in the previous step), and continuing this to the edge of a viewed scene, although there are other methods of extending the path to the edge of the viewed scene. For example, an average gradient of a predetermined number of indicated pixels may be extended to the edge of the viewed scene, such as a last five pixels indicated, or a function such as a second order polynomial may be fitted to a predetermined number of indicated pixels such as a last five pixels.

This process as shown in FIG. 12B is an example embodiment giving greater detail as to processing steps of identifying with increased accuracy a path which corresponds to the dominant noise source in the field of view of the tracking camera. In some embodiments the steps outlined above may be altered or omitted, for example step 1224 of applying smoothing to the pixel location path may be omitted in certain scenarios.

Figure 14:
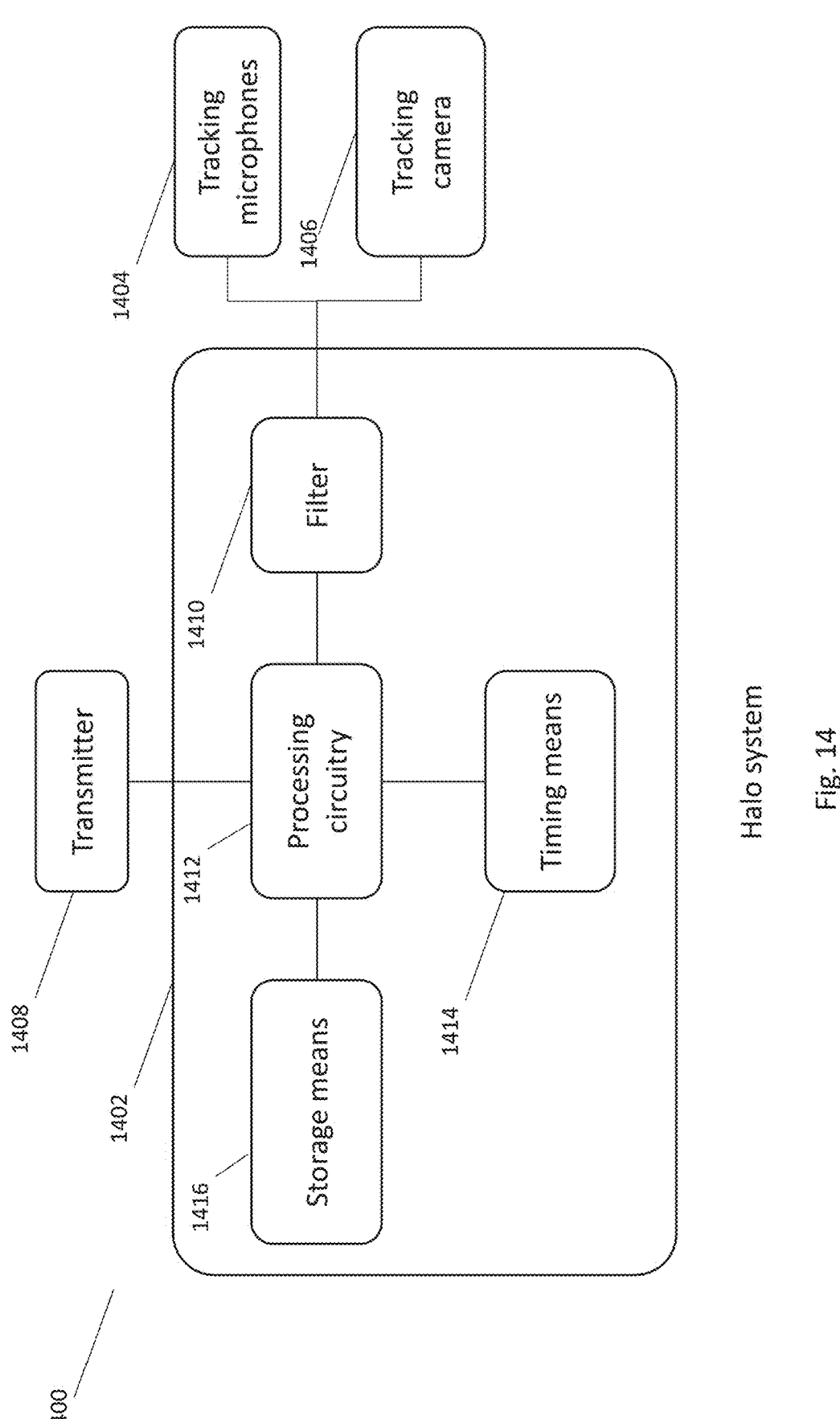
FIG. 14 shows an example apparatus suitable to implement example embodiments of the technique.

FIG. 14 shows an example apparatus in accordance with certain embodiments of the present disclosure. For example, the apparatus shown in FIG. 14 may be suitable to implement the disclosure of the method of FIG. 4. FIG. 14 shows an apparatus 1400 comprising a processing apparatus 1402, a plurality of tracking microphones (audio detectors) 1404, a tracking camera 1406, and a transmitter 1408. Processing apparatus 1402 may further comprise a filter 1410, or in some other examples a plurality of filters, processing circuitry 1412, timing means 1414, and storage means 1416. Tracking microphones 1404, tracking camera 1406, and processing circuitry 1412 may function in manners as described above. The transmitter 1408 and circuitry to control the transmitter, not shown in FIG. 14 but which may form part of processing circuitry 1412, may function such as to transmit information collected by the tracking microphones 1404 and the tracking camera 1406 to a server 114, to enable an investigating authority to review information and determine if action should be taken against a person responsible for a source of noise exceeding a predetermined threshold. Filter 1410 may function in a similar way to certain elements described above, and may in some instances be a band pass filter, a low pass filter, or the like, and may comprise more than one individual filter. Filter 1410 may be applied to an output of tracking microphones 1404, and/or tracking camera 1406. Timing means 1414 may allow processing circuitry 1412 to synchronise an internal system clock with an external clock, for example UTC time, and may enable processing circuitry 1412 further to maintain synchronicity of inputs from multiple inputs such as tracking microphones 1404 and tracking camera 1406. Storage means 1416 may enable processing circuitry 1412 to store in a semi-permanent manner information, such as that gathered by tracking microphones 1404 and tracking camera 1406, and may also enable the processing circuitry 1412 to store processed information such as video images as captured by tracking camera 1406 also comprising an indication of a dominant noise source in a field of view of tracking camera 1406. Apparatus 1400 may collectively be referred to as a Halo system, although such language is not limiting in the spatial arrangement of the various elements comprising the apparatus 1400.

Other Example Embodiments

Clock Drift Compensation

In some scenarios, the processing circuitry 102c additionally monitors clock drift concerning inputs from the microphone 102a and camera 102b. The processing circuitry 102c may also counteract clock drift in some examples. That is, the processing circuitry 102c monitors a time shift of video information received from the camera 102b with respect to a system clock of the processing circuitry 102c, and may alter a time indication attached to video information in order to keep a timing indication of the video information of the camera 102b in sync with a system clock of the processing circuitry 102c. The processing circuitry 102c may also perform similar processing on a timing indication attached to audio information received from the microphone 102a, in order to keep a timing indication of the information from the microphone 102a in sync with the system clock of the processing circuitry 102c. Furthermore, the processing circuitry 102c may compare, and alter, a value of the system clock of the processing circuitry 102c in order to align the system clock of the circuitry 102c with an external clock, for example with UTC time.

In other scenarios, the processing circuitry 330 of the microphone array 320 monitors and, in some cases, corrects for clock drift between audio information received by the microphone array 320 and the tracking camera 322. In this way, the processing circuitry 330 of the microphone array 320 is able to provide to the processing circuitry 315 of the system a single output containing information gathered by the microphone array 320 and the tracking camera 322, the information gathered from the two sources having been synchronised.

It is depicted that this transmission in FIG. 1 takes place by a wired connection but in other examples it may be performed by a wireless connection, such as via a wireless interface, and necessitate further elements of the noise camera such as an antenna and transmitter/receiver circuitry and controller circuitry. It would be apparent to the skilled person that these changes may be reflected in further elements in the server, such as receiver/transmitter circuitry, controller circuitry and at least one antenna.

Single Camera

In some embodiments, the implementation of the noise camera as described above omits certain elements of the noise camera. For example, in some embodiments the noise camera may be implemented with a tracking camera 322 but without detection cameras 313, 314. In this example, further processing of an output of the tracking camera 322 may be necessary. In other examples, the noise camera may be implemented without a detection microphone 312, and the function of the detection microphone 312 may be performed by the tracking microphones. That is, an output of each of the tracking microphones may undergo further processing which allows the tracking microphones collectively or individually to perform a role of the detection microphone 312, and the detection microphone 312 may be consequently omitted from the noise camera without impairing its function.

In some embodiments, four tracking microphones may be implemented, and consequently four audio channels generated as recorded at each of the four tracking microphones. However, the processing circuitry 330 of the microphone array 320 may have an input that does not allow for four separate input channels, in some examples only having an input of two audio channels. Therefore, it may be necessary to convert the four audio channels from the four tracking microphones into two channels to allow processing to occur.

Within the processing circuitry 330, audio data may first be converted from analogue to digital via an analogue to digital converter (ADC), which may employ the TDM protocol. The processer within the processing circuitry 330 may receive audio using the I2S protocol. Therefore, between the ADC and the processor, a microcontroller (not shown) may be implemented in order to convert data in the four audio channels into two audio channels, so that it may be received by the processor.

One example approach to this that may be taken is for the microcontroller, for each sample, to take a pair of 8 bit samples of data received within a first and second audio channel and shift this pair of samples left, before combining them with a second pair of 8-bit samples of data received from a third and fourth audio channel, creating a pair of 16-bit data samples. This data may then be transmitted as a pair of 16-bit samples over the I2S protocol to the processor. The processor may then unpack the two 16-bit samples to recover four separate 8-bit samples of data, as originally recorded by the four tracking microphones. This may further be appreciated with reference to FIG. 15. FIG. 15 shows a first pair of 8-bit samples 1501, a pair of 16-bit samples 1502 containing the first pair of 8-bit samples left shifted to occupy the most significant bits of the first pair of 16-bit samples, a second pair of 8-bit samples 1503 and an updated first pair of 16-bit samples 1504 with a second pair of 8-bit samples inserted into the 16-bit samples in place of the least significant bits of the 16-bit samples, as indicated by arrow 1505. The example shown applies to 8-bit samples combined to form 16-bit samples, but the process of shifting the sample and combining with a second sample to form a larger single sample may be applied to a sample with a different number of bits, for example 16-bit samples combined to form a 32-bit sample etc.

Calibration and Setup Procedure

A calibration process for the tracking camera 322 and microphone array 320, performed by the processing circuitry 330, may be performed once for each a specific arrangement and values for microphone separation and position, audio sample rate, and video resolution. The calibration process may be broadly thought of as the creation of one or two lookup tables; one associating time differences of arrival with incident angles, and a second associating incident angles with a pixel of a camera such as the tracking camera 322.

TDOA—Angle Lookup Table Creation

A creation process for a lookup table 331 associating a pair or group of time differences of arrival with a pair or group of incident angles will now be discussed. Three-dimensional points are created for a position of each of a number of tracking microphones (audio detectors); in the example above of FIGS. 3, 5 and 8, four tracking microphones. These positions are based on separations of the tracking microphones from each other, with a centre of the tracking microphones being defined as a coordinate origin (0,0,0). This may appear similar to the example of FIG. 6, wherein a microphone array is defined to be in the plane of x- and y-axes, with a z-axis extending toward a noise source from the microphone array 320, and a tracking camera 322 situated at the origin of the coordinate system, corresponding to a centre of the tracking microphones. Following this, arrays are generated with a range of a field of view of the tracking camera 322, specifically a horizontal-direction array and a vertical-direction array. For example, if the field of view of the tracking camera is +/−75° in a horizontal direction and +/−55° in a vertical direction, then an array is generated corresponding to a horizontal direction, with a range of −75° to +75°, and likewise an array is generated corresponding to a vertical direction, with a range of −55° to +55°. Elements of the array may be separated by a predetermined step, for example 0.50. This may be referred to as a resolution of the angles.

Figure 16:
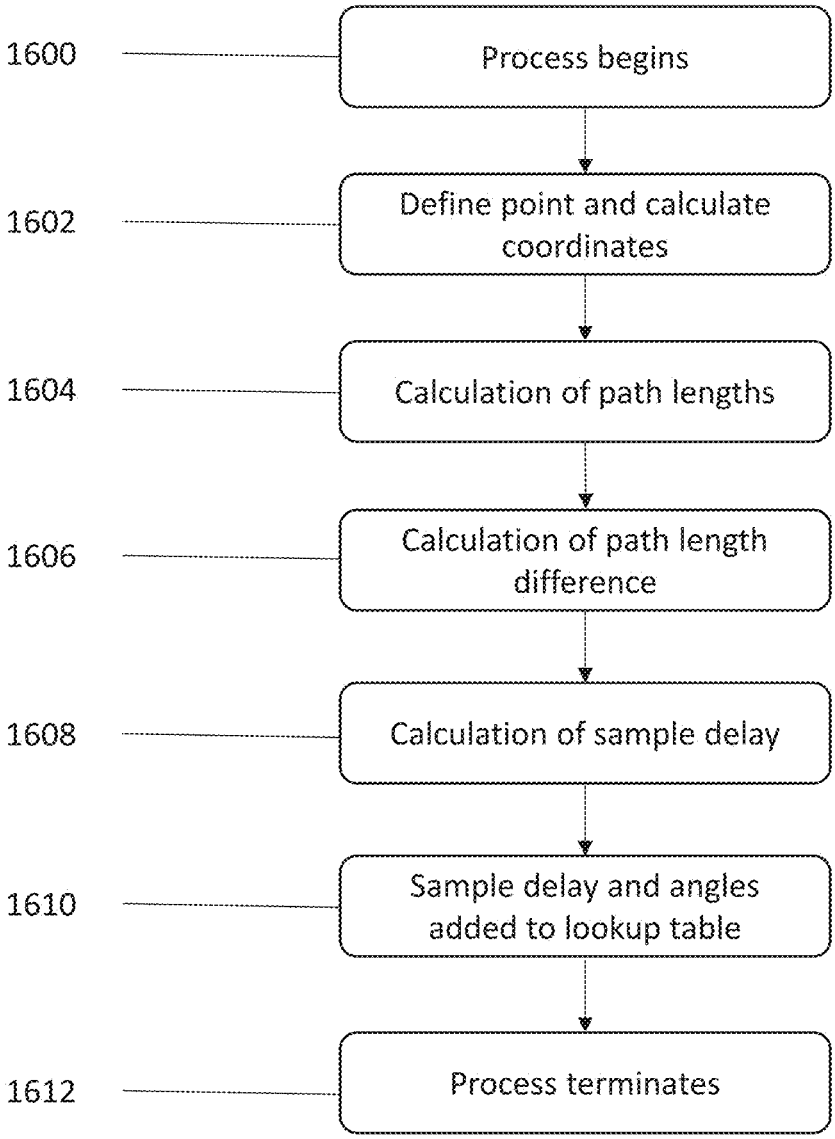
FIG. 16 shows a representation of processing steps in accordance with a calibration and setup procedure of an audio detector (microphone) array, in accordance with certain embodiments of the present technique.

For each pair of angles, one from the horizontal-direction array and one from the vertical-direction array, processing is applied to determine corresponding time differences of arrivals. This processing may proceed as follows, with reference to FIG. 16.

The process begins with step 1600, before processing passes to step 1602. In step 1602, for each pair of angles, and assuming that the coordinate system shown in FIG. 6 is adopted, a point is defined with a z-coordinate of, for example, z=6 metres, with angles such as a and p corresponding to the pair of angles. This value of a point's z-coordinate is chosen to be similar to an expected distance to a vehicle or other noise source when installed, but other z-coordinate values may be chosen. By trigonometry, x and y coordinates are then calculated to define the three coordinates of the point with respect to a set of axes centred at a centre position of the tracking microphones. Following step 1602, processing passes to step 1604.

In step 1604, a path length is calculated from the point to each of the tracking microphones, via trigonometry. That is, in the example illustration of FIG. 5, a length of each of the dashed lines 521, 522, 523, 524 are calculated. The path lengths are, for example, paths which sound emitted at the dominant noise source 510 may take to reach each of the tracking microphones. Processing then proceeds to step 1606.

In step 1606, a path length difference is calculated for a pair of tracking microphones. For example, a pair of microphones may be determined as both microphones, as in the example coordinates of FIG. 6, which have a y-coordinate of zero. Another pair of microphones may be determined as both microphones that have an x-coordinate of zero. This calculation of path length difference may be performed by subtracting a path length to one tracking microphone in the pair of tracking microphones from a path length to the other of the tracking microphones in the pair of tracking microphones. Processing then passes to step 1608.

In step 1608, a sample delay expressed as a number of samples is calculated for the pair of microphones. That is, the path length difference causes sound to reach a first tracking microphone of the pair of tracking microphones a certain number of samples later than the sound reaches a second tracking microphone of the pair of tracking microphones. This is calculated based on the path length difference, a speed of sound, and a sample rate at which the tracking microphones sample audio. In some examples, this calculation may be performed with an equation such as:

$$\text{No. of samples} = \frac{\text{path length difference} \times \text{sample rate}}{\text{speed of sound}}$$

This calculation may be performed for each of the tracking microphone pairs, that is, for a horizontally separated pair of tracking microphones and for a vertically separated pair of microphones or a combination of microphones in a different configuration as explained below. This produces an expected number of samples by which one tracking microphone will lag behind another tracking microphone in the pair of tracking microphones when recording a sound, and associated with this expected pair of samples is a pair of angles from the tracking camera indicating an incident angle of the noise. Following step 1608, processing passes to step 1610.

In step 1610, the pair or groups of sample delays and the pair of angles are added to a lookup table, such as lookup table 331, which may be consulted by processing circuitry 330 during processing of audio information recorded by the microphone array 320 and information recorded by the tracking camera 322. Processing then proceeds to step 1612, where it terminates.

Angle resolution, such as the example given above of 0.5°, may be chosen to ensure that each integer sample delay has a corresponding angle.

Angle—pixel lookup table creation

Figure 17B:
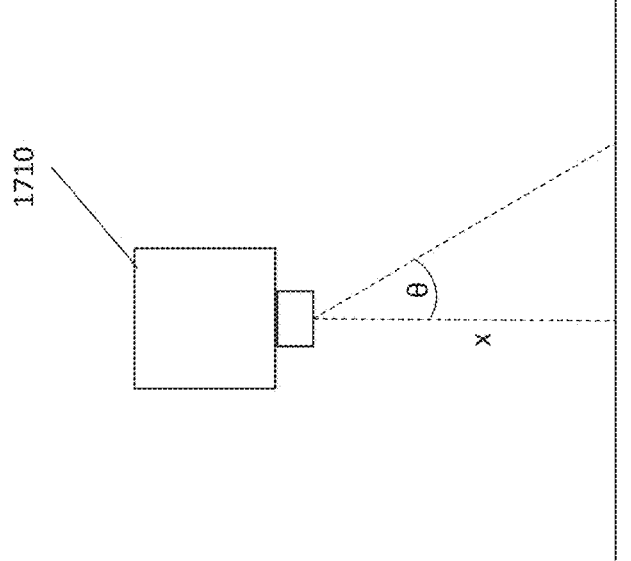
FIG. 17B shows a representation of an arrangement of a camera in a calibration and setup procedure.
Figure 17A:
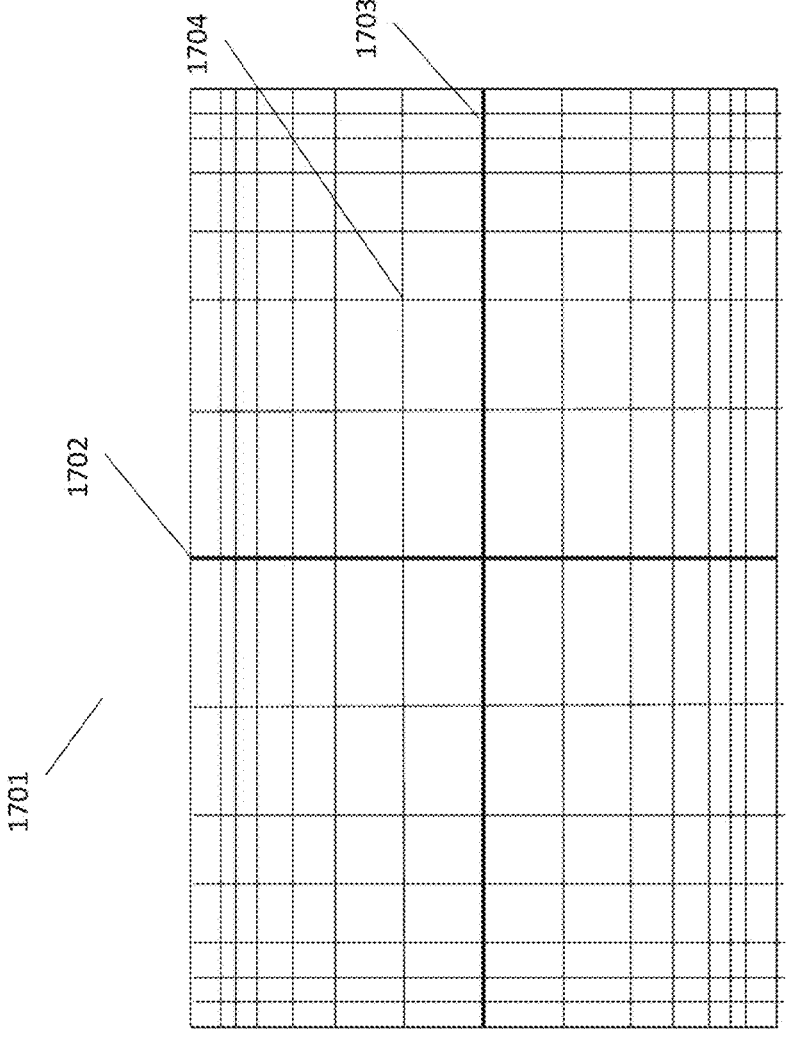
FIG. 17A shows an example image for use in a calibration and setup procedure of a noise camera in accordance with certain embodiments of the present technique.

A second stage of a calibration and setup procedure may be understood with respect to the below. This stage may be performed once per model of camera used as a tracking camera 322, and other processing circuitries 330 may be provided with a lookup table that has been determined by using a different individual camera. FIG. 17A shows an example calibration chart 1701, used to calibrate a camera such as a tracking camera 322, when used as part of a calibration process. Calibration chart 1701, with a bold central vertical line 1702 and a bold central horizontal line 1703, is placed in a field of view of a camera such as camera 1710 in a setup shown in FIG. 17B, which may in some cases be directly below the camera 1710 facing vertically downwards. In this example, calibration chart 1701 also includes grid lines parallel to the bold central vertical and horizontal lines 1702, 1703, at a separation that decreases as a distance from the central line increases. The separation and number of grid lines on the calibration chart 1701 is not limiting, and another number of grid lines or a different separation may be implemented with other examples of this process. Turning to FIG. 17B, the calibration chart 1701 is placed at a set distance, x, away from a camera 1710. In some embodiments, x is set to be 50 mm. In some examples of these embodiments where x is set to be 50 mm, and a maximum angle visible by the camera 1710 is +/−75°, a calibration chart such as 1701 may be chosen to be approximately 300×400 mm in size. Intersections of grid lines are then identified in the view of the camera 1710, and a second lookup table 332 created. That is, an identification of a particular grid line intersection and a corresponding pixel in a view of the camera allows processing circuitry to construct a second lookup table 332 associating a plurality of incident angles, for example, a vertical angle and an azimuth angle, with a pixel of the view of the camera. In the example of grid line intersection 1704 identified in FIG. 17A, an azimuth angle (pictured horizontally in FIG. 17A) may be determined to be 25 degrees from central vertical line 1702, and a vertical angle may be determined to be 10 degrees from central horizontal line 1703. These angles may be calculated by trigonometry, with knowledge of the set distance, x, and a distance of the grid line intersection 1704 from each of the central vertical line 1702 and the central horizontal line 1703. Repeating this process associating a pixel in the view of the camera with a pair of incident angles in a vertical and an azimuthal direction for each grid line intersection allows a second lookup table 332 to be created that associates a pair of incident angles with a pixel of the view of the camera for each intersection of the grid lines in the calibration chart 1701, and the second lookup table 332 to contain angles and pixel values corresponding to a majority of a field of view of the camera 1710, such as tracking camera 322.

In other embodiments a smaller or larger number of audio detectors may be used in the detector array which are arranged to detect a plurality of TDOA values.

According to the above explanation embodiments can provide a noise camera comprising a plurality of audio detectors such as microphones, which are spatially disposed with respect to a tracking camera. The plurality of audio detectors are arranged to detect a location of a noise source in a field of view of the tracking camera, thereby allowing identification of a source of noise such as a vehicle emitting noise exceeding a predetermined threshold such as a legal limit. The noise camera may comprise one or more detection cameras for identifying a noise source by techniques such as number plate recognition for the example of a vehicle. A location of a noise source in the field of view of the tracking camera is determined from a time difference of arrival of the noise from the noise source detected by a plurality of the audio detectors. The time difference of arrival indicating an angle of the noise from the tracking camera may be mapped into video captured with the field of view of the tracking camera as one or more pixel location values. Documentary evidence generated from the noise camera can include the tracking video, noise source pixel location values comprising, for each of one or more tracking images of the tracking video, an indication of a location of a pixel of a dominant noise source in the tracking video. The documentary evidence may be processed to identify a path of the dominant noise source in the tracking video from the noise source pixel location values. From the path, a detection time at which the path of the dominant noise source in the tracking video is closest to a detection point in a field of view of a detection camera is determined. The noise source such as a vehicle is identified from images from the detection camera or the tracking camera at the detection time.

Further Explanation of Differentiation/Rate-of-Change

Figure 18B:
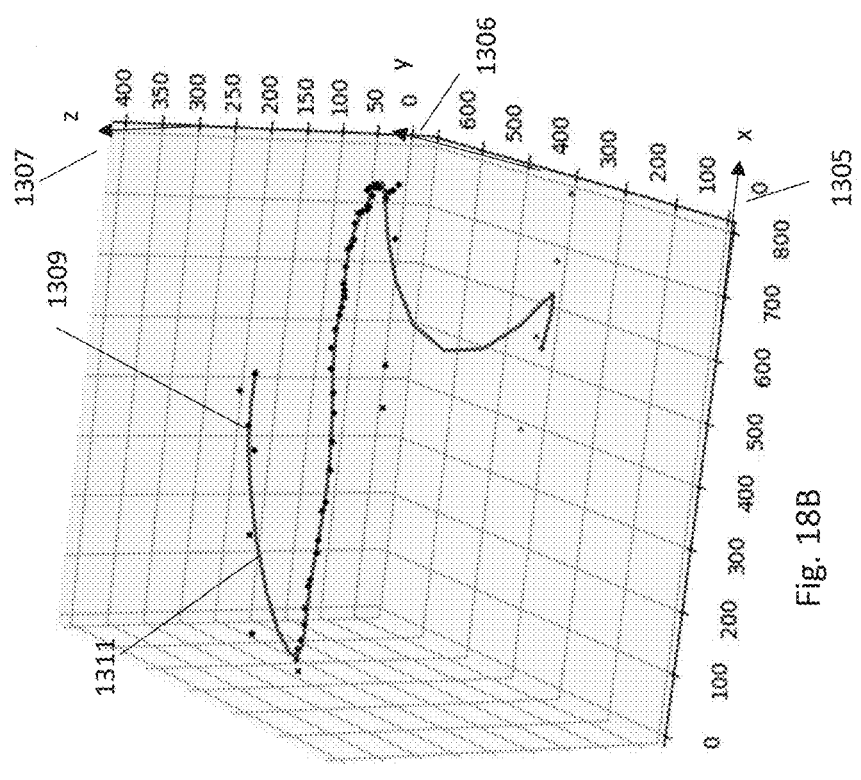
FIG. 18B shows the graphical plot representing an indication of a noise source in of FIG. 18B showing a different 3-dimensional view.
Figure 18A:
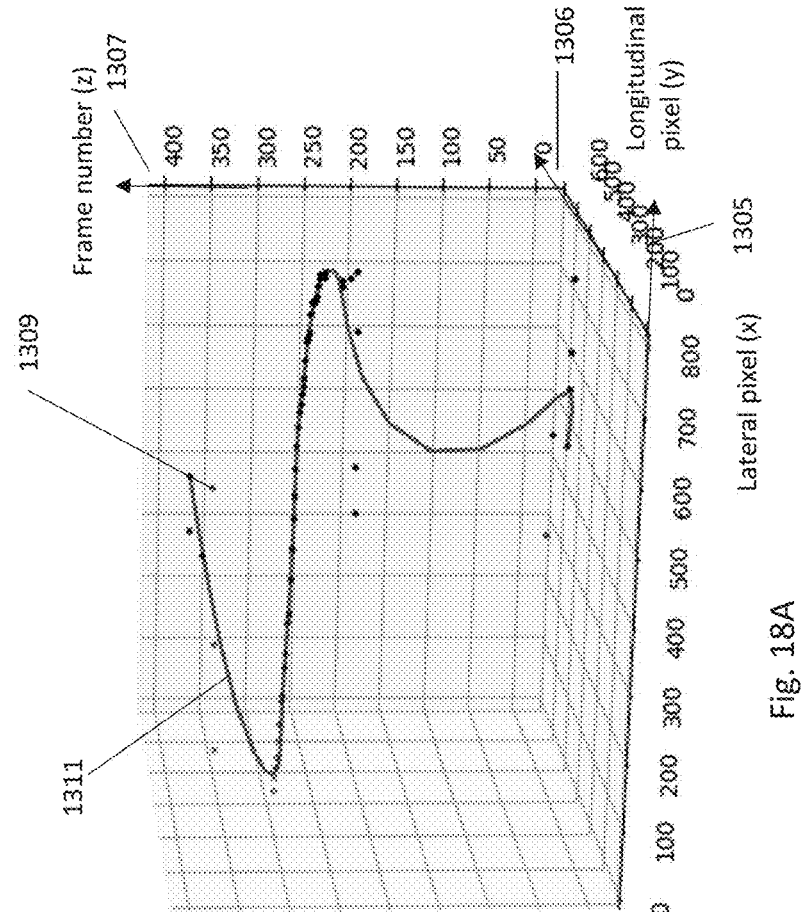
FIG. 18A shows a graphical plot representing an indication of a noise source in accordance with certain embodiments of the present technique illustrating a process in which a differentiation of pixel location values are used to assist in identifying a path of a dominant noise source.

To provide a further explanation of the operations of differentiation in step 1226 and path extraction in step 1228, which are explained above in respect of identifying a path of the dominant noise source from the pixel location values, a more detailed expiration allowing provided. FIG. 18A and FIG. 18B provide a further example of pixel location values plotted with respect to the longitudinal (y) pixel value 1306, lateral (x) pixel value 1305 and frame number 1307 which is interpreted as a pixel value z. These are labelled with the same numerical references of FIG. 13A.

The processing of the pixel location values occurs once these x, y and z values are received as part of the documentary evidence. As explained above, the x values correspond to x pixel coordinates, y values correspond to y pixel coordinates, and z values correspond to frame numbers (i.e. the number of the frame from which the coordinates were extracted). The pixel location values therefore represent three lists/arrays of numbers. As explained above with reference to step 1224 the lists of numbers are smoothed individually with a low pass filter. The example plots of FIGS. 18A and 18B show different viewing angles of the same 3D chart, with dots 1309 being the raw x, y and z values, and a solid line 1311 representing a combination of smoothed x, y and z values.

The three lists of values (x, y and z) of the pixel location values are then differentiated individually with respect to a list index. That is to say, the three lists of values (x, y and z) are differentiated individually with respect to a position of each value in the list, rather than with respect to absolute time. In this way, the three lists of values can be differentiated in the same way. The resulting three lists, which represent the rate of change of each list, are then combined using, for example, the equation below:

$$combined = 1.5x + 0.25y + 2z$$

Figures 19A, 19B, 19C, 19D:
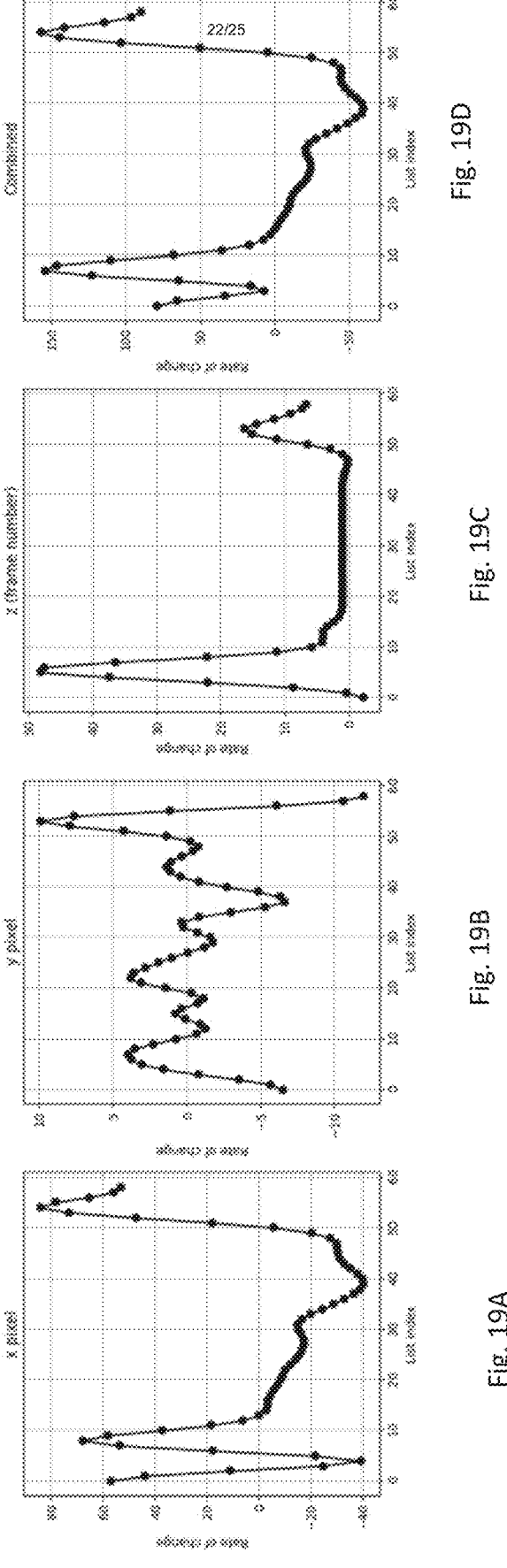
FIG. 19A shows a graphical plot representing a differential value of rate of change of x pixel values for a list of the pixel location values.
FIG. 19B shows a graphical plot representing a differential value of rate of change of y pixel values for a list of the pixel location values.
FIG. 19C shows a graphical plot representing a differential value of rate of change of z pixel values, which in this embodiment is represented by the frame number.
FIG. 19D shows a graphical plot representing a combined differential value of three components of x, y and z for the pixel location values.

This combination has an effect of suppressing the effect of changing y values, whilst emphasising the effect of changing x and z values. This can be better understood by representations of individually differentiated lists, which are presented in FIGS. 19A, 19B, 19C and 19D, which show plots of differential values (rate of change) of the x, y, z and combined values respectively. The x-axis on each chart is the index within each list. The y-axis is the rate of change within each of x, y, and z value lists. The fourth chart of FIG. 19D is the combined data (as per equation above).

It can be seen from the four subplots of FIGS. 19A to 19D that one could just take the differentiated x values and end up with a similar result (i.e. the first and fourth subplots are similar). As will be appreciated therefore, in some example embodiments only one of the components of the x, y and x values could be used to identify a path of the dominant noise source. However, including more than one component provides a greater refinement of a selected path.

Figure 20B:
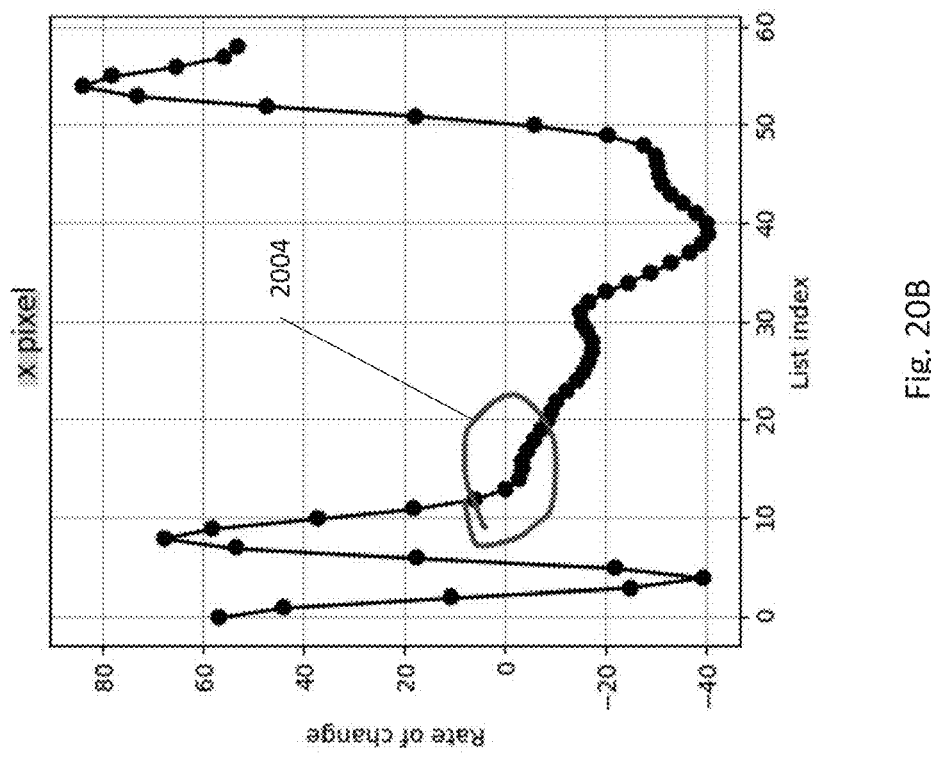
FIG. 20B shows a graphical plot representing a differential value of rate of change of x pixel values for a list of the pixel location values for the example of FIG. 20A.
Figure 20A:
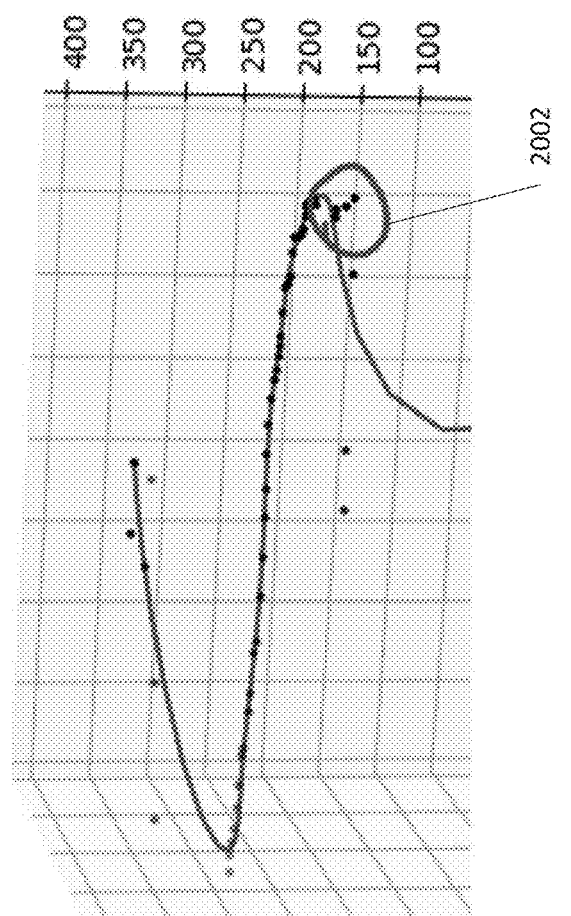
FIG. 20A shows a graphical plot representing an indication of a noise source pixel location values in x, y and z dimensions illustrating a process of eliminating extraneous values.
Figure 20D:
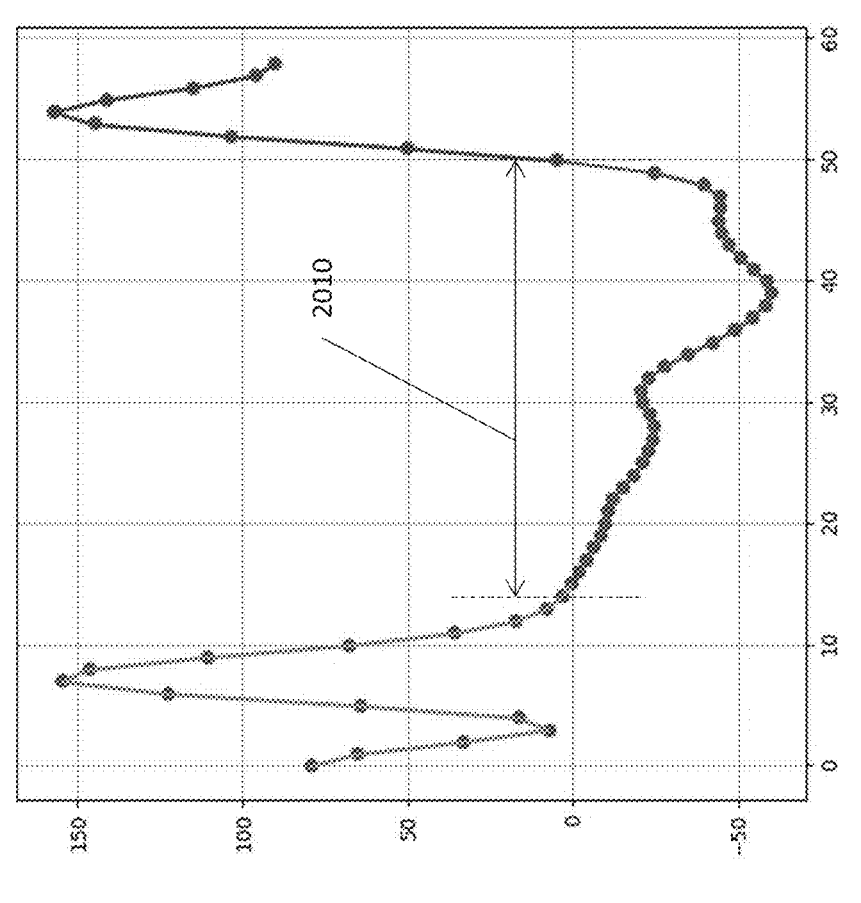
FIG. 20D shows a graphical plot representing a combined differential value of three components of x, y and z for the pixel location values in which a path of the dominant noise source is extracted at zero crossing values, corresponding to the example of FIG. 13B.
Figure 20C:
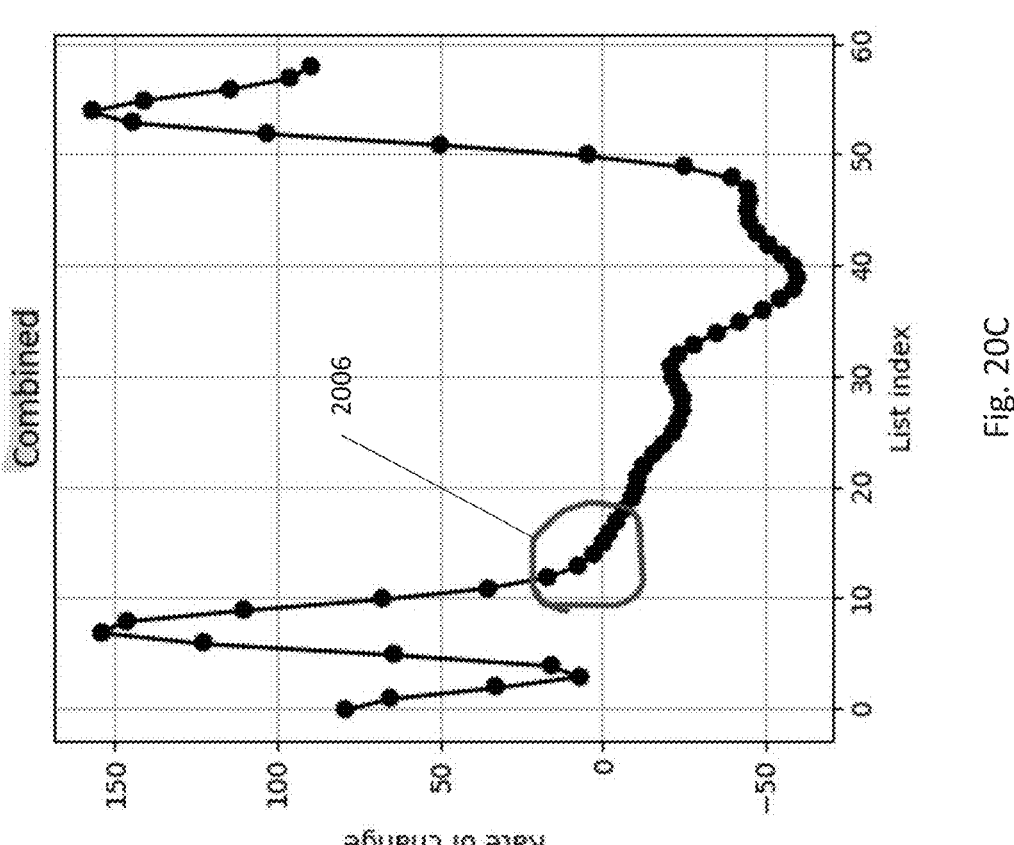
FIG. 20C shows a graphical plot representing a combined differential value of three components of x, y and z for the pixel location values for the example of FIG. 20A.
Figure 21:
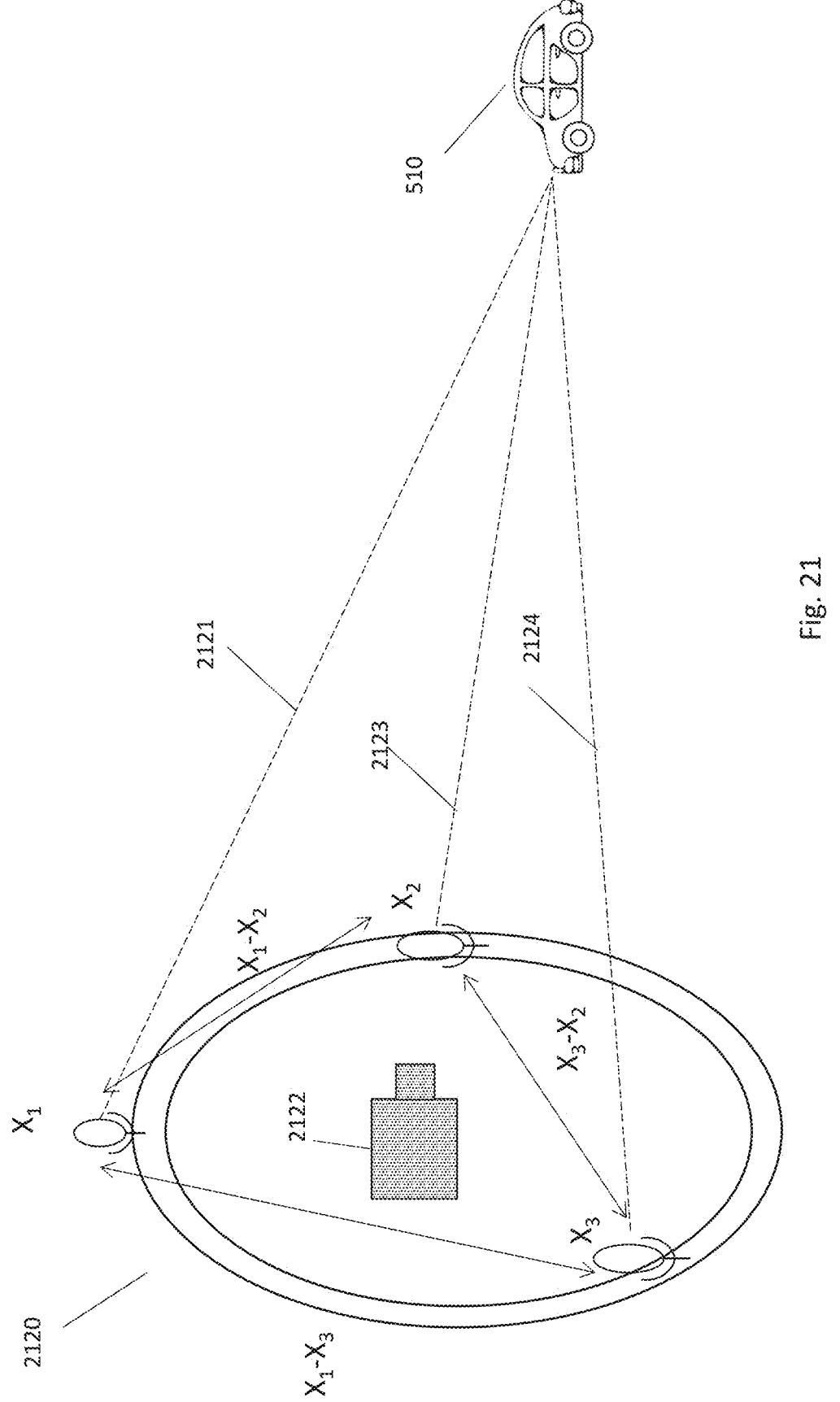
FIG. 21 is an example embodiment of the noise camera according to example embodiments.

For the example values of FIGS. 18A and 18B, there are some points where the x rate of change (differential value) is low. These are circled 2002, 2004, 2006, in extract data from FIGS. 18A and 18B as shown in FIG. 20A, for the x values in FIG. 20B, and the combined values if FIG. 20C, although these circled points do form part of a path of a dominant noise source. By adding the z component, these points 2002, 2004, 2006 are excluded from the selected path in the combined plot shown in FIG. 20D, which is apparent around list indices 11-15. This difference can be subtle and may not affect a selection of the identified path. As explained above in step 1228, the combined chart of FIG. 20D is then split by the zero-crossings as represented by an arrow 2010. Noise Cameras with Different Number of Tracking Audio Detectors As mentioned above, a noise camera may have an audio detector array, which has a different number of tracking audio detectors than the example above and shown in FIGS. 3 to 8 in which two pairs of tracking audio detectors are used. FIG. 21 shows another example noise camera 2120, in which the tracking array contains three audio detectors each of which is arranged to detect noise from the noise source 510 received along respective paths 2121, 2123, 2124. In this example, the processing circuitry of the noise camera maps a location of the noise source into one or more pixel values of image frames of tracking video capture by the camera 2122, using a time difference of arrival of the signals detected at the respective audio detectors along the paths 2121, 2123, 2124. Thus, the processing circuitry calculates a time difference of arrival between respective pairs of the three audio detectors, that is $X_1$-$X_2$, $X_1$-$X_3$ and $X_3$-$X_2$. From these values, the processing circuitry is able to map the pixel location values of the noise source into one more image frames of the tracking video. In some embodiments a look-up table may be used, which includes for each of a plurality of combinations of different time difference of arrivals of the noise signal at respective groups or pairs of audio detectors, for this example $X_1$-$X_2$, $X_1$-$X_3$ and $X_3$-$X_2$, a location of one or more pixels in the field of view of the tracking camera. In other embodiments the processing circuitry may calculate the location of the one or more pixels in the field of view of the tracking camera from a combination of time difference of arrival values.

Further example embodiments are presented in the following numbered paragraphs:

Paragraph 1. A noise camera for a noise monitoring system, comprising a tracking camera for recording images and/or video within a field of view of the tracking camera, an audio detector array comprising a plurality of tracking audio detectors, each of the plurality of tracking audio detectors being spatially separately disposed with respect to the tracking camera and each being configured to detect noise from a noise source within a field of view of the tracking camera and to generate a signal representative of the detected noise, and a processing circuitry configured to receive the signals representative of the detected noise from each of the tracking audio detectors of the audio detector array, and to determine based on a time difference of arrival of the noise detected by each of the tracking audio detectors, from the received signals representative of the detected noise, a location of the noise source within the field of view of the tracking camera from which the noise source can be identified.

Paragraph 2. A noise camera of paragraph 1, wherein the processing circuitry is configured to determine the location of the noise source within the field of view of the tracking camera, by identifying one or more pixel location values of the noise source in one or more tracking images captured within the field of view of the tracking camera.

Paragraph 3. A noise camera of paragraph 2, wherein the processing circuitry is configured to identify the one or more pixel location values of the noise source in the one or more tracking images within the field of view of the tracking camera by calculating the one or more pixel location values from the time difference of arrival of the noise determined from the signals representative of the noise detected by the plurality of tracking audio detectors.

Paragraph 4. A noise camera of paragraph 2, wherein the processing circuitry is configured to identify the one or more pixel location values of the noise source in the one or more tracking images captured within the field of view of the tracking camera by mapping the time difference of arrival values of the noise determined from the signals representative of the noise detected by the plurality of tracking audio detectors to the one or more pixel location values.

Paragraph 5. A noise camera of any of paragraphs 1 to 4, wherein a plurality of the tracking audio detectors are configured to detect the noise from the noise source in a first plane and a plurality of the tracking audio detectors are configured to detect the noise from the noise source in a second plane.

Paragraph 6. A noise camera of paragraph 3 or 4, wherein a plurality of the tracking audio detectors are configured to detect the noise from the noise source in a first plane and a plurality of the tracking audio detectors are configured to detect the noise signals from the noise source in a second plane, and the processing circuitry is configured, for each of the one or more tracking images, to determine a first angle of the noise source in the first plane from a time difference of arrival of the noise from the noise source detected by the plurality of the audio detectors spatially separately mounted in the first plane, to determine a second angle of the noise source in the second plane from a time difference of arrival of the noise from the noise source detected by the plurality of the audio detectors spatially separately mounted in the second plane, and to determine the one or more pixel location values of the noise source in the tracking image from the first angle and the second angle.

Paragraph 7. A noise camera of paragraph 6, comprising a look-up table containing an angle for each time difference of arrival of the noise from the noise source detected by the audio detectors in the first plane, and an angle for each time difference of arrival of the noise from the noise source detected by the audio detectors in the second plane, the processing circuitry being configured to determine the first angle and the second angle by mapping the time difference of arrival values to the first and second angles.

Paragraph 8. A noise camera of paragraph 7, wherein the look-up table contains one or more pixel location values of an image captured from the field of view of the tracking camera for each a plurality of sets of the first and the second angles, the processing circuitry being configured to determine the one or more pixel location values for the one or more tracking images by mapping the first and second angles to the noise source pixel location values using the look-up table.

Paragraph 9. A noise camera of paragraph 4, comprising a look-up table containing one or more pixel location values of an image captured from the field of view of the tracking camera for each combination of a time difference of arrival values of the noise from the noise source detected by the plurality of audio detectors, the processing circuitry being configured to determine the one or more pixel location values by applying the time difference of arrival of the noise from the noise source detected by the plurality of the audio detectors to the look-up table.

Paragraph 10. A noise of any of paragraphs 6 to 9, wherein the one or more pixel location values are determined for each of the time difference of arrival values, by calibrating a test image of a plurality of discrete sets of horizontal and vertical lines within a field of view of the tracking camera.

Paragraph 11. A noise camera of any of paragraphs 1 to 10, comprising one or more detection cameras disposed to capture one or more detection images captured within a field of view of the one or more detection cameras including at least part of the field of view of the tracking camera.

Paragraph 12. A noise camera of paragraph 11, comprising a detection microphone configured to detect noise from the noise source, wherein the processing circuitry is configured to receive signals representative of the detected noise of the noise source from the detection microphone and to identify a trigger event in which noise from the noise source exceeds a predetermined threshold, and in response to the trigger event to record the one or more detection images from the one or more detection cameras and the one or more tracking images from the tracking camera and to form documentary evidence from which a location of the noise source in the field of view of the tracking camera and the detection camera can be determined as a dominant noise source.

Paragraph 13. A noise camera of paragraph 11 or 12, wherein the one or more detection images are one or more image frames of detection video captured by the detection camera.

Paragraph 14. A noise camera of any of paragraphs 1 to 13, wherein the one or more tracking images are one or more image frames of tracking video captured by the tracking camera when the noise source is within the field of view of the tracking camera.

Paragraph 15. A noise camera of any of paragraphs 1 to 14, wherein the first plane is orthogonal to the second plane.

Paragraph 16. A noise camera of paragraph 15, wherein the first plane is horizontal and the second plane is vertical.

Paragraph 17. A server for processing documentary evidence from a noise camera, the server comprising processing circuitry having program code, which when executed causes the processing circuitry to receive the documentary evidence from the noise camera following a trigger event, the documentary evidence comprising tracking video, noise source pixel location values comprising, for each of one or more image frames of the tracking video, an indication of a location of at least one pixel of a dominant noise source in the image frame of the tracking video, and a sound recording of sound associated with the trigger event, to identify a path of a dominant noise source in the tracking video from the noise source pixel location values, to determine a detection time at which the path of the dominant noise source in the tracking video is closest to a detection point in the tracking video, and to identify the dominant noise source from one or more image frames corresponding to the detection time.

Paragraph 18. A server of paragraph 17, wherein the program code when executed causes the processing circuitry to identify the path of the dominant noise source in the tracking video from the noise source pixel location values by differentiating each of the pixel location values of the noise source in at least one dimension, and identifying the path of the dominant noise source in the tracking video from a sequence of the noise source pixel location values identifying the noise source in a corresponding sequence of image frames of the tracking video corresponding to a sequence of the differential values between values crossing zero.

Paragraph 19. A server of paragraph 18, wherein the pixel location values comprise a vertical component value and horizontal component value indicating the location of the noise source in the tracking video, and the program code when executed causes the processing circuitry to differentiate each of the pixel location values of the noise source in a horizontal and a vertical dimension to represent a gradient of the values changing in the horizontal and vertical dimensions, to differentiate a number of the image frames of the tracking video, the number of each of the frames of the tracking video being representative of time as the dominant noise source moves along a path in the tracking video, to combine the differential values in the horizontal, the vertical and the time dimensions to form a combined differential value, and to identify the path of the dominant noise source in the tracking video from a sequence of the noise source pixel location values of the combined differential value crossing zero.

Paragraph 20. A server of paragraph 19, wherein the program code when executed causes the processing circuitry to combine the differential values by weighting the differential values with different weighting factors, the weighting factors emphasising the each of the dimensions differently to identify the path of the dominant noise source.

Paragraph 21. A server of any of paragraphs 18 to 20, wherein the program code when executed causes the processing circuitry to smooth at least the horizontal and the vertical component values of the pixel locations values before differentiating the horizontal and the vertical values.

Paragraph 22. A server of paragraph 21, wherein the program code when executed causes the processing circuitry to smooth the horizontal and the vertical component values of the pixel locations values before differentiating the horizontal and the vertical values by low pass filtering the horizontal and the vertical component values before differentiating.

Paragraph 23. A server of any of paragraphs 17 to 22 wherein the program code when executed causes the processing circuitry to identify the path of the dominant noise source in the tracking video from the noise source pixel location values by determining a time of a peak value of a detected sound of the dominant noise source from the sound recording of the trigger event, and identifying the path of the dominant noise source in the tracking video for a section of the tracking video corresponding to the peak value.

Paragraph 24. A server of any of paragraphs 17 to 23, wherein the program code when executed causes the processing circuitry to extend in one or more frames of the tracking video the identified path of the dominant noise source in the tracking video for the section of the tracking video corresponding to the peak value to an edge of a frame of the tracking video.

Paragraph 25. A server of any of paragraphs 17 to 24, wherein the tracking video is captured by a tracking camera and the one or more image frames for identifying the dominant noise source form part of detection video captured by a detection camera, the detection point being within a field of view of the detection camera and within a field of view of the tracking camera.

Paragraph 26. A server of paragraph 25, wherein the program code when executed causes the processing circuitry to determine a direction of travel of an identifying feature in the one or more frames of the detection video forming part of the documentary evidence, the detection video being captured by the detection camera, to compare the direction of travel of the pixel location values from the identified path of the dominant noise source with the determined direction of travel of the identifying feature in the detection video, and to reject the documentary evidence if the direction of travel detected from the detection video and the tracking video differ, or to reject the pixel location values for image frames which represent a change of direction.

Paragraph 27. A server of any of paragraphs 17 to 26, wherein the identifying the dominant noise source from one or more image frames corresponding to the detection time comprises performing computer vision processing on one or more image frames of the detection video to identify an identifying feature of the dominant noise source at the detection time.

Paragraph 28. A server of paragraph 27, wherein the dominant noise source is a vehicle having a license plate, the detecting the identifying feature at the detection time being performing automatic number plate recognition of the license plate at or near the detection point at the detection time.

Paragraph 29. A server of paragraph 28, wherein the performing automatic number plate recognition of the license plate is by performing optical character recognition, OCR.

Paragraph 30. A noise monitoring system comprising one or more noise cameras and a server for processing documentary evidence from the one or more noise cameras, the server comprising processing circuitry having program code, which when executed causes the processing circuitry, to receive the documentary evidence from one of the one or more noise cameras following a trigger event, the documentary evidence comprising tracking video, noise source pixel location values comprising, for each of one or more image frames of the tracking video, an indication of a location of at least one pixel of a dominant noise source in the image frame of the tracking video, and a sound recording of sound associated with the trigger event, to identify a path of a dominant noise source in the tracking video from the noise source pixel location values, to determine a detection time at which the path of the dominant noise source in the tracking video is closest to a detection point in the tracking video, and to identify the dominant noise source from one or more image frames corresponding to the detection time.

Paragraph 31. A system of paragraph 30, wherein the program code when executed causes the processing circuitry to identify the path of the dominant noise source in the tracking video from the noise source pixel location values by differentiating each of the pixel location values of the noise source in at least one direction, and identifying the path of the dominant noise source in the tracking video from a sequence of the noise source pixel location values identifying the noise source in a corresponding sequence of image frames of the tracking video corresponding to a sequence of the differential values between values crossing zero.

Paragraph 32. A system of paragraph 31, wherein the pixel location values comprise a vertical component value and horizontal component value indicating the location of the noise source in the tracking video, and the program code when executed causes the processing circuitry to differentiate each of the pixel location values of the noise source in a horizontal and a vertical direction to represent a gradient of the values changing in the horizontal and vertical dimensions, to differentiate a number of the image frames of the tracking video, the number of each of the frames of the tracking video being representative of time as the dominant noise source moves along a path in the tracking video, to combine the differential values in the horizontal, the vertical and the time dimensions to form a combined differential value, and to identify the path of the dominant noise source in the tracking video from a sequence of the noise source pixel location values of the combined differential value crossing zero.

Paragraph 33. A system of paragraph 32, wherein the program code when executed causes the processing circuitry to combine the differential values by weighting the differential values with different weighting factors, the weighting factors emphasising the each of the dimensions differently to identify the path of the dominant noise source.

Paragraph 34. A system of any of paragraphs 31 to 33, wherein the program code when executed causes the processing circuitry to smooth at least the horizontal and the vertical component values of the pixel locations values before differentiating the horizontal and the vertical values.

Paragraph 35. A system of paragraph 34, wherein the program code when executed causes the processing circuitry to smooth the horizontal and the vertical component values of the pixel locations values before differentiating the horizontal and the vertical values by low pass filtering the horizontal and the vertical component values before differentiating.

Paragraph 36. A system of any of paragraphs 30 to 35, wherein the program code when executed causes the processing circuitry to identify the path of the dominant noise source in the tracking video from the noise source pixel location values by determining a time of a peak value of a detected sound of the dominant noise source from the sound recording of the trigger event, and identifying the path of the dominant noise source in the tracking video for a section of the tracking video corresponding to the peak value.

Paragraph 37. A system of any of paragraphs 30 to 36, wherein the program code when executed causes the processing circuitry to extend in one or more frames of the tracking video the identified path of the dominant noise source in the tracking video for the section of the tracking video corresponding to the peak value to an edge of a frame of the tracking video.

Paragraph 38. A system of any of paragraphs 30 to 37, wherein the tracking video is captured by a tracking camera and the one or more image frames for identifying the dominant noise source form part of detection video captured by a detection camera, the detection point being within a field of view of the detection camera and within a field of view of the tracking camera.

Paragraph 39. A system of paragraph 38, wherein the program code when executed causes the processing circuitry to determine a direction of travel of an identifying feature in the one or more frames of the detection video forming part of the documentary evidence, the detection video being captured by the detection camera, to compare the direction of travel of the pixel location values from the identified path of the dominant noise source with the determined direction of travel of the identifying feature in the detection video, and to reject the documentary evidence if the direction of travel detected from the detection video and the tracking video differ.

Paragraph 40. A system of any of paragraphs 30 to 39, wherein the identifying the dominant noise source from one or more image frames corresponding to the detection time comprises performing computer vision processing on one or more image frames of the detection video to identify an identifying feature of the dominant noise source at the detection time.

Paragraph 41. A system of paragraph 40, wherein the dominant noise source is a vehicle having a license plate, the detecting the identifying feature at the detection time being performing automatic number plate recognition of the license plate at or near the detection point at the detection time.

Paragraph 42. A system of paragraph 41, wherein the performing automatic number plate recognition of the license plate is by performing optical character recognition, OCR.

Paragraph 43. A method of processing documentary evidence from a noise camera comprising receiving the documentary evidence from the noise camera following a trigger event, the documentary evidence comprising tracking video, noise source pixel location values comprising, for each of one or more image frames of the tracking video, an indication of a location of at least one pixel of a dominant noise source in the image frame of the tracking video, and a sound recording of sound associated with the trigger event, identifying a path of a dominant noise source in the tracking video from the noise source pixel location values, determining a detection time at which the path of the dominant noise source in the tracking video is closest to a detection point in the tracking video, and identifying the dominant noise source from one or more image frames corresponding to the detection time.

Paragraph 44. A method of paragraph 43, wherein the identifying the path of the dominant noise source in the tracking video from the noise source pixel location values comprises differentiating each of the pixel location values of the noise source in at least one direction, and identifying the path of the dominant noise source in the tracking video from a sequence of the noise source pixel location values identifying the noise source in a corresponding sequence of image frames of the tracking video corresponding to a sequence of the differential values between values crossing zero.

Paragraph 45. A method of paragraph 44, wherein the method comprises differentiating a number of the image frames of the tracking video, the number of each of the frames of the tracking video being representative of time as the dominant noise source moves along a path in the tracking video, and combining the differential values in the horizontal, the vertical and the time dimensions to form a second combined differential value, and identifying the path of the dominant noise source in the tracking video from a sequence of the noise source pixel location values of the second combined differential value crossing zero.

Paragraph 46. A method of paragraph 45, wherein the method comprises combining the differential values by weighting the differential values with different weighting factors, the weighting factors emphasising the each of the dimensions differently to identify the path of the dominant noise source.

Paragraph 47. A method of any of paragraphs 43 to 46, wherein the method comprises smoothing at least the horizontal and the vertical component values of the pixel locations values before differentiating the horizontal and the vertical values.

Paragraph 48. A method of paragraph 47, wherein the method comprises smoothing the horizontal and the vertical component values of the pixel locations values before differentiating the horizontal and the vertical values by low pass filtering the horizontal and the vertical component values before differentiating.

Paragraph 49. A method of any of paragraphs 43 to 48, wherein the identifying the path of the dominant noise source in the tracking video from the noise source pixel location values comprises determining a time of a peak value of a detected sound of the dominant noise source from the sound recording of the trigger event, and identifying the path of the dominant noise source in the tracking video for a section of the tracking video corresponding to the peak value.

Paragraph 50. A method of any of paragraphs 43 to 49, wherein the method comprises extending in one or more frames of the tracking video the identified path of the dominant noise source in the tracking video for the section of the tracking video corresponding to the peak value to an edge of a frame of the tracking video.

Paragraph 51. A method of any of paragraphs 43 to 50, wherein the tracking video is captured by a tracking camera and the one or more image frames for identifying the dominant noise source form part of detection video captured by a detection camera, the detection point being within a field of view of the detection camera and within a field of view of the tracking camera.

Paragraph 52. A method of paragraph 51, wherein the method comprises determining a direction of travel of an identifying feature in the one or more frames of the detection video forming part of the documentary evidence, the detection video being captured by the detection camera, comparing the direction of travel of the pixel location values from the identified path of the dominant noise source with the determined direction of travel of the identifying feature in the detection video, and rejecting the documentary evidence if the direction of travel detected from the detection video and the tracking video differ.

Paragraph 53. A method of any of paragraphs 43 to 52, wherein the identifying the dominant noise source from one or more image frames corresponding to the detection time comprises performing computer vision processing on one or more image frames of the detection video to identify an identifying feature of the dominant noise source at the detection time.

Paragraph 54. A method of paragraph 53, wherein the dominant noise source is a vehicle having a license plate, the detecting the identifying feature at the detection time being performing automatic number plate recognition of the license plate at or near the detection point at the detection time.

Paragraph 55. A method of paragraph 54, wherein the performing automatic number plate recognition of the license plate is by performing optical character recognition, OCR.

Paragraph 56. A method of operating a noise camera for a noise monitoring system, the method comprising recording images and/or video within a field of view of a tracking camera, detecting noise from a noise source within a field of view of the tracking camera using an audio detector array, the audio detector array comprising a plurality of tracking audio detectors, each of the plurality of tracking audio detectors being spatially separately disposed with respect to the tracking camera, generating, from each of the plurality of tracking audio detectors a signal representative of the noise, receiving signals representative of the detected noise from each of the tracking audio detectors of the audio detector array, and determining, based on a time difference of arrival of the noise detected by each of the tracking audio detectors, from the received signals representative of the detected noise, a location of the noise source within the field of view of the tracking camera from which the noise source can be identified.

Paragraph 57. A method of paragraph 56, wherein the determining the location of the noise source within the field of view of the tracking camera comprises identifying one or more pixel location values of the noise source in one or more tracking images captured within the field of view of the tracking camera.

Paragraph 58. A method of paragraph 57, wherein the identifying one or more pixel location values of the noise source in the one or more tracking images captured within the field of view of the tracking camera comprises calculating the one or more pixel location values from the time difference of arrival of the noise determined from the signals representative of the noise detected by the plurality of tracking audio detectors.

Paragraph 59. A method of paragraph 57, wherein the identifying the one or more pixel location values of the noise source in the one or more tracking images captured within the field of view of the tracking camera comprises mapping the time difference of arrival values of the noise determined from the signals representative of the noise detected by the plurality of tracking audio detectors to the one or more pixel location values.

Paragraph 60. A method of any of paragraphs 56 to 59, wherein the detecting the noise within the field of view of the tracking camera using the audio detector array comprising the plurality of the tracking audio detectors comprises detecting the noise from the noise source in a first plane using a plurality of the audio detectors, and detecting the noise from the noise source in a second place using a plurality of the tracking audio detectors.

Paragraph 61. A method of paragraph 59, wherein the detecting the noise from the noise source within the field of view of the tracking camera using the audio detector array comprising a plurality of the tracking audio detectors comprises detecting the noise from the noise source in a first plane using a plurality of the audio detectors arranged in the first plane, and determining a first angle of the noise source in the first plane from a time difference of arrival of the noise from the noise source detected by the plurality of the audio detectors spatially separately mounted in the first plane, detecting the noise from the noise source in a second plane using a plurality of the tracking audio detectors arranged in the second plane, determining a second angle of the noise source in the second plane from a time difference of arrival of the noise from the noise source detected by the plurality of the audio detectors spatially separately mounted in the second plane, and determining the one or more pixel location values of the noise source in the tracking image from the first angle and the second angle.

Paragraph 62. A method of paragraph 61, the method comprising determining the first angle and the second angle by mapping the time difference of arrival values to the first and second angles using a look-up table containing an angle for each time difference of arrival of the noise from the noise source detected by the audio detectors in the first plane, and an angle for each time difference of arrival of the noise from the noise source detected by the audio detectors in the second plane.

Paragraph 63. A method of paragraph 62, wherein the look-up table contains one or more pixel location values of an image captured from the field of view of the tracking camera for each a plurality of sets of the first and the second angles, and the method comprises determining the one or more pixel location values for the one or more tracking images by mapping the first and second angles to the noise source pixel location values using the look-up table.

Paragraph 64. A method of paragraphs 62 or 63, comprising a look-up table containing one or more pixel location values of an image captured from the field of view of the tracking camera for each combination of a time difference of arrival values of the noise from the noise source detected by the plurality of audio detectors, and determining the one or more pixel location values by applying the time difference of arrival of the noise from the noise source detected by the plurality of the audio detectors to the look-up table.

Paragraph 65. A method of any of paragraphs 61 to 64, wherein the one or more pixel location values are determined for each of the time difference of arrival by calibrating a test image of a plurality of discrete sets of horizontal and vertical lines within a field of view of the tracking camera.

Paragraph 66. A method of any of paragraphs 56 to 65, comprising capturing one or more detection images captured within a field of view of one or more detection cameras, the field of view of the one or more detection cameras including at least part of the field of view of the tracking camera.

Paragraph 67. A method of paragraph 66, comprising detecting noise from the noise source by a detection microphone, wherein the method comprises receiving signals representative of detected noise of the noise source from the detection microphone and identifying a trigger event in which noise from the noise source exceeds a predetermined threshold, recording, in response to the trigger event, the one or more detection images from the one or more detection cameras and the one or more tracking images from the tracking camera and forming documentary evidence from which a location of the noise source in the field of view of the tracking camera and the detection camera can be determined as a dominant noise source.

Paragraph 68. A method of paragraph 67, wherein the one or more detection images are one or more image frames of detection video captured by the detection camera.

Paragraph 69. A method of any of paragraphs 56 to 68, wherein the one or more tracking images are one or more image frames of tracking video captured by the tracking camera when the noise source is within the field of view of the tracking camera.

Paragraph 70. A method of any of paragraphs 56 to 69, wherein the first plane is orthogonal to the second plane.

Paragraph 71. A method of paragraph 70, wherein the first plane is horizontal and the second plane is vertical.

Paragraph 72. A method of calibrating a tracking camera forming part of a noise camera in a noise camera system, the method comprising positioning a calibration chart within a field of view of the tracking camera, the calibration chart including a plurality of parallel horizontal and vertical lines, each of the parallel lines being displaced with respect to each other in the horizontal and vertical directions so as to form a grid of intersecting lines, identifying for each of the intersections of the grid of lines one or more corresponding pixels in an image of the calibration chart within the field of view of the tracking camera, identifying for each of the intersections of the grid of lines a value of a first angle in a horizontal direction from a centre line of the vertical lines, identifying for each of the intersections of the grid of lines a value of a second angle in a vertical direction from a centre line of the horizontal lines, mapping for each of the intersections of the grid of lines a value of the first angle and a value of the second angle to the one or more corresponding pixels identified for the intersection of the grid of lines, and storing for each of the intersections of the grid of lines a pair of the first and the second angles with the one or more pixels identified for the intersection of the grid of lines.

Paragraph 73. A method of paragraph 72, wherein the plurality of horizontal and vertical parallel lines of the calibration chart are displaced with respect to each other in the horizontal and vertical directions so that each of the pairs of first and second angles for each of the intersections of the grid of lines differ from one another by a predetermined amount.

Paragraph 74. A method of paragraph 73, wherein the predetermined amount by which the first and the second angles differ is the same amount.

Paragraph 75. A method of paragraph 72, 73 or 74, wherein the storing comprises storing the one or more identified pixel values with each of the pairs of values for the first and second angles in a look-up table.

Paragraph 76. A computer program comprising executable instructions which when executed by processing circuitry performs the method of any of paragraphs 43 to 75.

Paragraph 77. A computer readable storage medium storing the computer program of paragraph 76.

Paragraph 78. A signal representing the computer program of paragraph 77.

The invention claimed is:

1. A noise camera for a noise monitoring system comprising the noise camera and a server for processing documentary evidence received from the noise camera, the noise camera comprising:

a tracking camera having a wide angle lens for recording tracking video images within a field of view of the tracking camera, the field of view of the tracking camera capturing a scene viewed through the wide angle lens;

an audio detector array comprising a plurality of tracking audio detectors, each of the plurality of tracking audio detectors being spatially separately disposed with respect to the tracking camera and each being configured to detect noise from a noise source within the field of view of the tracking camera and to generate a signal representative of the detected noise;

a detection camera disposed to capture one or more detection images within a field of view of the detection camera, the field of view of the detection camera being narrower than the field of view of the tracking camera, the field of view of the detection camera including part of the field of view of the tracking camera which includes a detection point in the scene, the tracking video images and the one or more detection images both capturing the detection point in the scene; and a processing circuitry configured:

to receive the signals representative of the detected noise from each of the tracking audio detectors of the audio detector array;

to determine, from the received signals representative of the detected noise, one or more pixel location values of the noise source in each of a plurality of the tracking video images captured within the field of view of the tracking camera from a time difference of arrival of the noise detected by the plurality of tracking audio detectors, the one or more pixel location values of the noise source in the plurality of tracking video images being for identifying a path of the noise source in the scene; and in response to a trigger event, to form the documentary evidence comprising the one or more detection images from the detection camera of the detection point, the one or more pixel location values and the plurality of tracking video images from the field of view of the tracking camera when the noise source is within the field of view of the tracking camera, from which a location of the noise source in the fields of view of the tracking camera and the detection camera can be determined as a dominant noise source, wherein the detection camera is positioned and configured with respect to the tracking camera to capture the one or more detection images within the field of view of the detection camera at a detection time when the path of the dominant noise source in the tracking video images is at the detection point in the field of view of the tracking camera, one or more of the plurality of tracking video images including one or more of the pixel location values of the dominant noise source within the scene at the detection time.

2. The noise camera of claim 1, wherein the processing circuitry is configured to transmit the documentary evidence following the trigger event to the server for processing the documentary evidence.

3. The noise camera of claim 1, wherein the processing circuitry is configured to determine the one or more pixel location values of the noise source in each of the plurality of tracking video images within the field of view of the tracking camera by calculating the one or more pixel location values from the time difference of arrival of the noise determined from the signals representative of the noise detected by the plurality of tracking audio detectors.

4. The noise camera of claim 1, wherein the processing circuitry is configured to determine the one or more pixel location values of the noise source in the plurality of tracking images captured within the field of view of the tracking camera by mapping the time difference of arrival values of the noise determined from the signals representative of the noise detected by the plurality of tracking audio detectors to the one or more pixel location values.

5. The noise camera of claim 4, wherein a plurality of the tracking audio detectors are configured to detect the noise from the noise source in a first plane and a plurality of the tracking audio detectors are configured to detect the noise signals from the noise source in a second plane, and the processing circuitry is configured, for each of the plurality of tracking video images, to determine a first angle of the noise source in the first plane from a time difference of arrival of the noise from the noise source detected by the plurality of the audio detectors, to determine a second angle of the noise source in the second plane from a time difference of arrival of the noise from the noise source detected by the plurality of the audio detectors, and to determine the one or more pixel location values of the noise source in the tracking video images from the first angle and the second angle.

6. The noise camera of claim 5, comprising a look-up table containing an angle for each time difference of arrival of the noise from the noise source detected by the audio detectors in the first plane, and an angle for each time difference of arrival of the noise from the noise source detected by the audio detectors in the second plane, the processing circuitry being configured to determine the first angle and the second angle by mapping the time difference of arrival values to the first and second angles.

7. The noise camera of claim 6, wherein the look-up table contains one or more pixel location values of an image captured from the field of view of the tracking camera for each a plurality of sets of the first and the second angles, the processing circuitry being configured to determine the one or more pixel location values for the plurality of tracking video images by mapping the first and second angles to the noise source pixel location values using the look-up table.

8. The noise camera of claim 5, comprising a look-up table containing one or more pixel location values of an image captured from the field of view of the tracking camera for each combination of a time difference of arrival values of the noise from the noise source detected by the plurality of audio detectors, the processing circuitry being configured to determine the one or more pixel location values by applying the time difference of arrival of the noise from the noise source detected by the plurality of the audio detectors to the look-up table.

9. The noise camera of claim 1, comprising:
a detection microphone configured to detect noise from the noise source, wherein the processing circuitry is configured to receive signals representative of the detected noise of the noise source from the detection microphone and to identify the trigger event in which noise from the noise source exceeds a predetermined threshold, and in response to the trigger event, to record the one or more detection images from the detection camera and the tracking video images from the tracking camera and to form the documentary evidence from which a location of the noise source in the field of view of the tracking camera and the detection camera can be determined as a dominant noise source.

10. The noise camera of claim 5, wherein the first plane is horizontal and the second plane is vertical.

11. A method of operating a noise camera for a noise monitoring system comprising a noise camera and a server for processing documentary evidence received from the noise camera, the method comprising:
recording tracking video images within a field of view of a tracking camera having a wide angle lens, the field of view of the tracking camera capturing a scene viewed through the wide angle lens;
detecting noise from a noise source within the field of view of the tracking camera using an audio detector array, the audio detector array comprising a plurality of tracking audio detectors, each of the plurality of tracking audio detectors being spatially separately disposed with respect to the tracking camera and each being configured to detect noise from a noise source within the field of view of the tracking camera and to generate a signal representative of the detected noise;
capturing one or more detection images within a field of view of a detection camera, the field of view of the detection camera being narrower than the field of view of the tracking camera, the field of view of the detection camera including part of the field of view of the tracking camera which includes a detection point in the scene, the tracking video images and the one or more detection images both capturing the detection point in the scene;
receiving signals representative of the detected noise from each of the tracking audio detectors of the audio detector array;
determining, based on a time difference of arrival of the noise detected by each of the tracking audio detectors, from the received signals representative of the detected noise, one or more pixel location values of the noise source in each of a plurality of tracking images captured within the field of view of the tracking camera from a time difference of arrival of the noise detected by the plurality of tracking audio detectors, the one or more pixel location values of the noise source in the plurality of tracking video images being for identifying a path of the noise source in the scene; and
in response to a trigger event, forming the documentary evidence comprising the one or more detection images from the detection camera of the detection point, the one or more pixel location values and the plurality of tracking video images from the field of view of the tracking camera when the noise source is within the field of view of the tracking camera, from which a location of the noise source in the fields of view of the tracking camera and the detection camera can be determined as a dominant noise source, wherein the detection camera is positioned and configured with respect to the tracking camera to capture the one or more detection images within the field of view of the detection camera at a detection time when the path of the dominant noise source in the tracking video images is at the detection point in the field of view of the tracking camera, one or more of the plurality of tracking video images including one or more of the pixel location values of the dominant noise source within the scene at the detection time.

12. The method of claim 11, comprising transmitting the documentary evidence following the trigger event to the server for processing the documentary evidence.

\* \* \* \* \*